US009087413B2

(12) United States Patent
Kramer et al.

(10) Patent No.: US 9,087,413 B2
(45) Date of Patent: *Jul. 21, 2015

(54) SYSTEM FOR DELIVERING AND ENABLING INTERACTIVITY WITH IMAGES

(71) Applicant: Engram Networking LLC, Wilmington, DE (US)

(72) Inventors: Gary Kramer, Los Angeles, CA (US); Adam Rubin, Miami Beach, FL (US)

(73) Assignee: ENGRAM NETWORKING LLC, Wilmington, DE (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/853,256

(22) Filed: Mar. 29, 2013

(65) Prior Publication Data

US 2014/0035947 A1 Feb. 6, 2014

Related U.S. Application Data

(63) Continuation of application No. 13/154,881, filed on Jun. 7, 2011, now Pat. No. 8,411,109, which is a continuation of application No. 12/834,844, filed on Jul. 12, 2010, now Pat. No. 7,956,872, which is a
(Continued)

(51) Int. Cl.
*G06T 11/60* (2006.01)
*G06F 3/0484* (2013.01)
(Continued)

(52) U.S. Cl.
CPC ............ *G06T 11/60* (2013.01); *G06F 3/04845* (2013.01); *G06F 3/14* (2013.01);
(Continued)

(58) Field of Classification Search
CPC .................. G06T 19/00; G06T 2207/10012; G06T 2207/10021; G06F 3/04845; G06F 3/0485; G09G 2340/045; G09G 2370/027
USPC .......................... 345/419, 649, 653, 619, 629
See application file for complete search history.

(56) References Cited

U.S. PATENT DOCUMENTS 4,669,812 A 6/1987 Hoebing
(Continued)

FOREIGN PATENT DOCUMENTS

WO 9416404 7/1994

OTHER PUBLICATIONS

360 Promo: "Product Tours"; from website http://web.archive.org/web/20030812042854/http://www.360promo.com/product- tours.html; Aug. 12, 2003.
(Continued)

*Primary Examiner* — Michelle L Sams
(74) *Attorney, Agent, or Firm* — Brundidge & Stanger, P.C.

(57) ABSTRACT

A system, including apparatuses, software and methods, is disclosed for capturing and delivering images as to which various interactive functions are enabled for a user. The images introduced to the system can come from any one of a variety of sources, including from a digital camera. A graphical user interface permits a user to customize a set of interactive functions to be enabled for a given set of images. The interactively enabled images can be delivered via a webpage to a user, for example, via email, the Internet or downloaded from a disk or from disk drive on a computer on which the webpage is stored. Each image is delivered to a user in its own layer of software, which permits complex sets of images of relatively high resolution to be delivered to users without any appreciable delay associated with the delivery or the need for the user to have additional software, such as a plug-in to receive images and enable interactive functions with respect to the images. Whenever an interactive function is being carried out, a viewer perceives only one image layer at a given time, but the currently viewable image layer can be changed rapidly, so that the user can perceive the illusion of motion, including virtual rotation of an object depicted in a set of images.

17 Claims, 41 Drawing Sheets

Related U.S. Application Data continuation of application No. 12/476,179, filed on Jun. 1, 2009, now Pat. No. 7,755,643, which is a continuation of application No. 10/884,240, filed on Jul. 2, 2004, now Pat. No. 7,542,050, which is a continuation-in-part of application No. 10/791,965, filed on Mar. 3, 2004, now Pat. No. 7,262,783.

(51) Int. Cl.
*G06F 3/14* (2006.01)
*G06Q 30/06* (2012.01)
*G09G 3/00* (2006.01)
*H04N 13/00* (2006.01)
*G06T 19/20* (2011.01)

(52) U.S. Cl.
CPC ........... *G06Q 30/0601* (2013.01); *G06T 19/20* (2013.01); *G09G 3/003* (2013.01); *H04N 13/007* (2013.01); *H04N 13/0048* (2013.01); *H04N 13/0059* (2013.01); *G06T 2200/24* (2013.01); *G06T 2219/2016* (2013.01); *G09G 2340/045* (2013.01); *G09G 2370/027* (2013.01)

(56) References Cited

U.S. PATENT DOCUMENTS

| | | | |
|---|---|---|---|
| 4,870,485 | A | 9/1989 | Downing et al. |
| 5,117,296 | A | 5/1992 | Hoebing |
| 5,227,898 | A | 7/1993 | Iavecchia et al. |
| 5,682,196 | A | 10/1997 | Freeman |
| 5,740,267 | A | 4/1998 | Echerer et al. |
| 5,808,613 | A | 9/1998 | Marrin et al. |
| 5,818,420 | A | 10/1998 | Mitsumine et al. |
| 5,968,120 | A | 10/1999 | Guedalia |
| 5,977,979 | A | 11/1999 | Clough et al. |
| 6,009,188 | A | 12/1999 | Cohen et al. |
| 6,023,523 | A | 2/2000 | Cohen et al. |
| 6,031,519 | A | 2/2000 | O'Brien |
| 6,049,622 | A | 4/2000 | Robb et al. |
| 6,061,083 | A | 5/2000 | Aritake et al. |
| 6,097,389 | A | 8/2000 | Morris et al. |
| 6,121,963 | A | 9/2000 | Ange |
| 6,157,747 | A | 12/2000 | Szeliski et al. |
| 6,167,151 | A | 12/2000 | Albeck et al. |
| 6,211,848 | B1 | 4/2001 | Plesniak et al. |
| 6,219,057 | B1 | 4/2001 | Carey et al. |
| 6,222,937 | B1 | 4/2001 | Cohen et al. |
| 6,262,734 | B1 | 7/2001 | Ishikawa |
| 6,323,856 | B1 | 11/2001 | Smilansky et al. |
| 6,330,523 | B1 | 12/2001 | Kacyra et al. |
| 6,377,277 | B1 | 4/2002 | Yamamoto |
| 6,396,500 | B1 | 5/2002 | Qureshi et al. |
| 6,445,807 | B1 | 9/2002 | Katayama et al. |
| 6,512,518 | B2 | 1/2003 | Dimsdale |
| 6,512,993 | B2 | 1/2003 | Kacyra et al. |
| 6,556,201 | B1 | 4/2003 | Maehara et al. |
| 6,563,498 | B1 | 5/2003 | Hirata et al. |
| 6,618,051 | B1 | 9/2003 | Edwards et al. |
| 6,628,279 | B1 | 9/2003 | Schell et al. |
| 6,628,283 | B1 | 9/2003 | Gardner |
| 6,631,016 | B1 | 10/2003 | Klug et al. |
| 6,633,326 | B2 | 10/2003 | Fukumoto et al. |
| 6,665,577 | B2 | 12/2003 | Onyshkevych et al. |
| 6,681,056 | B1 | 1/2004 | Tseng et al. |
| 6,803,923 | B1 | 10/2004 | Hamburg |
| 6,993,726 | B2 | 1/2006 | Rosenholtz et al. |
| 7,034,821 | B2 | 4/2006 | Baumberg |
| 7,069,506 | B2 | 6/2006 | Rosenholtz et al. |
| 7,134,088 | B2 | 11/2006 | Larsen |
| 7,352,368 | B2 | 4/2008 | Frazelle et al. |
| 7,559,034 | B1 | 7/2009 | Paperny et al. |
| 2001/0029829 | A1 | 10/2001 | Moe |
| 2002/0006234 | A1 | 1/2002 | Horiuchi |
| 2002/0057270 | A1 | 5/2002 | Hao-Yu |
| 2002/0060686 | A1 | 5/2002 | Matsumoto et al. |
| 2002/0085219 | A1 | 7/2002 | Ramamoorthy |
| 2002/0103822 | A1 | 8/2002 | Miller |
| 2002/0103830 | A1 | 8/2002 | Hamaide et al. |
| 2002/0191867 | A1 | 12/2002 | Le et al. |
| 2003/0065590 | A1 | 4/2003 | Haeberli |
| 2003/0095177 | A1 | 5/2003 | Yun et al. |
| 2003/0187744 | A1 | 10/2003 | Goodridge |
| 2003/0206653 | A1 | 11/2003 | Katayama et al. |
| 2004/0143796 | A1 | 7/2004 | Lerner et al. |
| 2004/0227751 | A1 | 11/2004 | Anders |
| 2005/0172219 | A1 | 8/2005 | Hintermeister et al. |
| 2005/0283371 | A1 | 12/2005 | Tiramani |

OTHER PUBLICATIONS

Webpage at www.Liveframe.org, 2001.
Xu, et al., A Web-Based Product Modelling Tool—A Preliminary Development, International Journal of Advanced Manufacturing, 2003, pp. 669-677 (abstract only).
"Beginners Guide to DHTML", http://javascriptkit.com/howto/dhtmlguide3.shtml. Feb. 10, 2004.
Blumberg, R.; Hughes, P., Visual Realism and Interactivity for the Internet, Compcon '97, Proceedings, Feb. 23-26, 1997, pp. 269-273.
Komlodi, A. and Marchionini, G., Key frame preview techniques for video browsing, Proceedings of the Third ACM Conference on Digital Libraries, 1998, pp. 118-125, Pittsburgh, PA, USA.
Mathews, G.J., Visualization Blackboard—Visualizing Space Science Data in 3D, IEEE Computer Graphics and Applications, vol. 16, Iss. 6, Nov. 1996, pp. 6-9.
"Microsoft Computer Dictionary", Microsoft Press, 2002, p. 182.
Microsoft Word 2003, 1983-2003.
Ogawa, T. and Tsukamoto, M., Tools for Constructing Pseudo-3D Space on the WWW Using Images, New Generation Computing, 2000, pp. 391-407 (abstract only).
Powell, M.W. and Goldof, D., Software Toolkit for Teaching Image Processing, International Journal of Pattern Recognition and Artificial Intelligence, Aug. 2001 (abstract only).
Richmond, Alan, "Dynamic HTML", http://www.wdvl.com/Style/DHTML/. Feb. 10, 2003.
Samarin, M.;Tuominen, J., Delivering Web Lessons with Media Rich Content, Conference on Advanced Learning Technologies, 2004, Proceedings IEEE International, Aug. 30, 2004, pp. 860-861.
Soomro, T.R., et al., HTML and Multimedia Web Gis, Third International Conference on Computational Intelligence and Multimedia Applications, 1999, pp. 371-382.
Sugumaran, R., et al., High Resolution Digital Elevation Model and a Web-Based Client-Server Application for Improved Flood Plain Management, International Geoscience and Remote Sensing Symposium Proceedings, 2000, vol. 1, pp. 334-335.
Sweeney, M., Interactive Graphics for Web Based Applications, Proceedings of the First International Conference on Web Information Systems Engineering, vol. 1, 2000, pp. 409-413.
Teraoka, T.; Maruyama, M., Adaptive Information Visualization Based on the User's Multiple Viewpoints—Interactive 3D Visualization of the WWW, Information Visualization, Oct. 21, 1997, pp. 25-28.
Zhao, L and Yamamoto, H., A Simple Rendering System for Web Presentation, The 6th International Conference on Advanced Communication Technology, vol. 2, 2004, pp. 627-631.
Webpage at www.geocities.com/code/stratos/3yam, 2002.
Animation course, at https://www.courses.psu.edu/ist/ist250__fja100/ist250online/Content/AnimationT7L1.htm, Nov. 2, 2003.
Dreamweaver: Show/Hide Layers, at http://web.archive.org/web/20021215081854/ http:/www.cbtcafe.com/dreamweaver/showhidelayers/index.html, Dec. 15, 2002.
JavaScript and AJAX Forum, at http://www.webmasterworld.com/forum91/441.htm, Jun. 2003.
RE: [xslt] whitespace around IMG tag, at http://mail.gnome.org/archives/ xslt/2003-June/msg00004.html, Jun. 4, 2003.

HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE
HELLO, THIS IS TEXT ON THE LEFT HAND SIDE OF THE PAGE

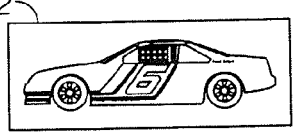

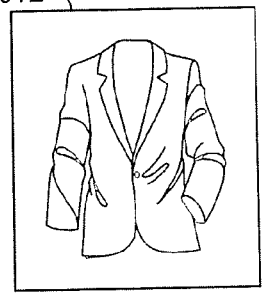

HELLO, THIS IS THE TEXT ON THE MIDDLE OF THE PAGE
HELLO, THIS IS THE TEXT ON THE MIDDLE OF THE PAGE
HELLO, THIS IS THE TEXT ON THE MIDDLE OF THE PAGE
HELLO, THIS IS THE TEXT ON THE MIDDLE OF THE PAGE
HELLO, THIS IS THE TEXT ON THE MIDDLE OF THE PAGE

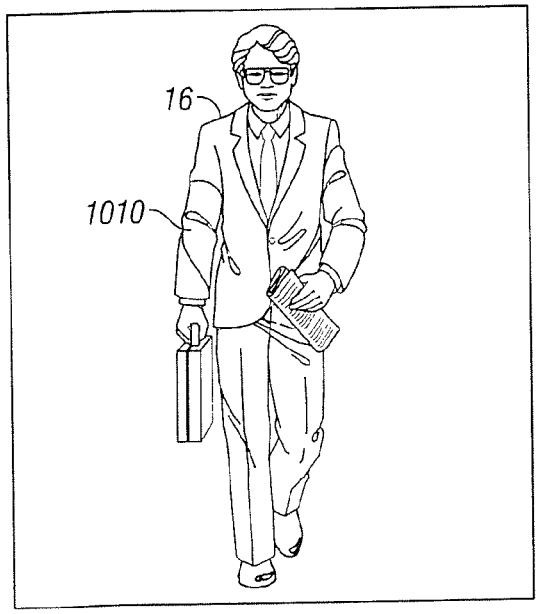

FIG. 17

SYSTEM FOR DELIVERING AND ENABLING INTERACTIVITY WITH IMAGES

RELATED APPLICATIONS

This application is a continuation of application Ser. No. 13/154,881, filed Jun. 7, 2011; which is a continuation of application Ser. No. 12/834,844, filed Jul. 12, 2010, now U.S. Pat. No. 7,956,872; which is a continuation of application Ser. No. 12/476,179, filed Jun. 1, 2009, now U.S. Pat. No. 7,755, 643; which is a continuation of application Ser. No. 10/884, 240, filed Jul. 2, 2004, now U.S. Pat. No. 7,542,050; which is a continuation-in-part of application Ser. No. 10/791,965, filed Mar. 3, 2004, now U.S. Pat. No. 7,262,783, the disclosures of which are hereby incorporated by reference.

BACKGROUND OF THE INVENTION

1. Field of the Invention

This invention relates generally to systems, including apparatuses and methods, for capturing, processing and displaying images and, more particularly, to systems for capturing, processing and displaying or otherwise outputting images so that a user or viewer can manipulate or otherwise interact with the display/output in one or more ways, such as to give the appearance of two-dimensional (2-D) or three-dimensional (3-D) motion.

2. The Prior Art

There is a demand in the art for systems, including apparatuses and methods, whereby images, either displayed via a computer screen, some other display device, or stored or rendered in some other medium, can be manipulated or interacted with by a user in some fashion, for example, to impart the illusion of movement in two dimensions or three dimensions to an object depicted in an image or images.

Systems and methods are known in which images can be downloaded on web pages to a user's browser through an Internet Service Provider (ISP), stored in the cache memory of the user's computer hard drive, and displayed to the user where thereafter the user is provided with certain options with respect to the images which, when exercised, give the user the perception of interaction with the images in some fashion.

For example, a retailer might maintain a website with an on-line catalog feature. A user can access the website from his or her computer, select an item in the catalog, and the web page corresponding to that item will be sent to the user's computer in response to the request. The web page consists of software that determines what will be displayed to the user (typically, the software is written in accordance with a standardized protocol, such as HTML ("Hypertext Markup Language") or XML ("Extensible Hypertext Markup Language").

Upon delivery to the user, the web page typically is stored in cache memory on the hard drive of the user's computer. If the web page is configured to permit some form of interactivity with the image(s) by the user, the user may be able, for example, to view an item in the catalog, such, as a sweater, that is originally presented in the color black, in alternative colors such as white or pink. To engage in this type of interactivity, the user might be prompted to click with his or her mouse on a color chart or some other icon so that the color of the sweater changes from black to white or from black to pink, to see what the item would look like in a different color. Similarly, the user might be able to click on the image or on some other icon to see an enlarged view of an item, e.g., a "zoom" of the item.

With such prior art systems, however, the more complex the content of the web page, generally the longer it takes to deliver the web page to the user and to ready image(s) for display or interactivity. For example, a file that corresponds to a single, relatively high-resolution image (e.g., an image with a resolution of 1024×768 pixels) is larger than, and therefore will take longer to deliver than, a lower resolution image (e.g., an image with a resolution of 320×240 pixels). Thus, prior art systems might offer users lower resolution images in order to avoid the extended delivery time that would be perceived by the user if higher resolution images were to be offered. The lower resolution of the delivered images leads to a disadvantage in prior art systems in which one of the possible interactive functions is a "zoom" function. That is, the quality of an image when it is zoomed in on, depends in part on the resolution of an image. The higher the resolution of an image, generally the longer it takes to deliver the image to a user. Thus, maximum resolution of a zoomed-in-on image often must be sacrificed in favor of faster image delivery times in these systems. Consequently, prior art systems typically start by delivering images of lower resolution (e.g., 320×240 pixels) to a user, such that when a zoom interactive function is later initiated, the zoomed-in-on image appears less clear or less sharp than the original image (i.e., the non-zoomed-in-on image), or even becomes distorted (e.g., pixelated) upon zooming. Thus, there is a need for a system that allows delivery of, and subsequent interactivity with, an image or images that will have quality resolution even upon zooming. The present invention satisfies this need.

Moreover, when prior art systems offer users the option of an interactive function with respect to images that results in the illusion of a virtual 3-D effect, such as, the illusion of rotation of an object through three dimensions, multiple images of the object are required to achieve the effect. Typically, a set of images of the object are taken through 360 degrees in a particular plane. The greater the number of images, the smoother the rotation effect will be when the interactive function is later carried out. In order to deliver the multiple images to the user, however, prior art systems first combine the multiple images into a single file and then deliver that file to the user. The more the images, the larger the file. The larger the file, the longer the images take to be delivered. In these systems, therefore, tradeoffs might have to be made that disadvantageously affect the quality of the interactive functions that a user can carry out with respect to the images, in order to avoid lengthy delivery times. Alternatively, the user will just have to accept long delivery times in order to view images using the prior art systems.

Accordingly, web pages containing images with which a user has some limited opportunity to interact can take too long, from the perspective of the user, between the time a request is made for the web page and the time the image(s) on the web pages are first perceptible to the user and then made available for any interactivity.

Further, prior art systems that provide a user with the opportunity to carry out more sophisticated interactive functions with respect to an image or images on a web page, such as obtaining different perspective views of an object in an image (e.g., front, back and side views), 360-degree views (e.g., a panoramic view of a piece of real estate or of the inside of a hotel room), or zooming in on an object in an image, often require supplemental software or software in addition to that contained on the web page in order to enable these interactive functions. Such additional software commonly is provided in the form of a "plug-in," a software program that the user either already must possess on his or her local computer's hard drive or which must be downloaded to the user's local computer before any higher level interactive functions may be initiated. The necessity for a plug-in as a prerequisite to interactivity is an added level of complexity that it would be desirable to eliminate. The plug-in also may be associated with a fee or some other commitment the user would rather avoid, may require a separate, time-consuming procedure to download and install and, may generally detract from a user's enjoyment of, or willingness to use, a particular website.

Software protocols have been developed, for example, DHTML ("Dynamic Hypertext Markup Language"), which are designed to allow programmers to construct web pages that have the capacity for a higher degree of user interactivity. To date, however, no software has been developed that advantageously: (1) provides a user with the ability to rapidly perceive images on a web page, howsoever complex, after the request for the web page is processed; and (2) permits a sophisticated level of interactivity and a broad range of interactive options with respect to images, once the web page has been delivered. Thus, there is a need in the art for an improved system for rapidly delivering images to a user with which a user can initiate a broad range of advanced interactive functions. The present invention satisfies these needs.

SUMMARY OF THE INVENTION

Briefly, and in general terms, the system according to the invention delivers a set of images to a user in a form with which the user can undertake a variety of interactive functions, so as, for example, to allow a user to view an object in virtual 3-D or to interact with it in two dimensions. Where only a 2-D effect is desired, the set of images need only comprise a single image for the interactive functions to be enabled.

Optionally, images are edited as to features such as background color, unwanted extraneous artifacts, etc., prior to being introduced to the software of the system and delivered to a user.

In one aspect on the invention, features are provided that have the effect of optimizing the speed with which a user perceives a set of images to be delivered in response to a user's request for the set of images, whereby the set of images is delivered via software implemented through or embedded on a web page that permits each of the set of images to be provided in image layers according to the layering feature available in software protocols such as, but not limited to, DHTML. Only one of the images in the set of images is viewable or perceivable by the user at any one time, and, at the moment of delivery, the user is able to immediately perceive a selected one of the images while the remainder of the images comprising the set of images are delivered after it. Where only one image is needed in order to carry out an interactive function, e.g., zooming in on an image of an object taken at just one angle, the set of images will only comprise a single image, and the same layering technique can be applied to deliver, for example, a single image with relatively high resolution to the user without the user's perceiving any appreciable delay associated with the delivery process.

Optionally, and in accordance with another aspect of the invention, each image in a given set of images can be split via software into multiple parts, prior to commencement of delivery of the images (e.g., during editing), such that if the connection over which delivery takes place is interrupted for some reason during the delivery process, those parts of the image for which delivery has been completed do not need to be re-sent when the connection is reestablished.

According to still another aspect of the invention, in addition to the image layers corresponding to a set of images that are delivered to a user in response to the request for the image(s), a tool bar layer is provided with a tool bar that is made viewable to the user along with a currently viewable image layer. Optionally, the tool bar can be provided directly in the currently viewable image layer, as opposed to in a dedicated tool bar layer.

In still another aspect of the invention, a transparent layer is provided in which commands from a mouse (or other device capable of delivering commands comparable to those deliverable by a mouse) can be interpreted by the system and carried out such that, for example, when the transparent layer is moved, each of the image layers is moved along with it. The transparent layer is invisible to the user, but in terms of the configuration of the display, the transparent layer is preferably disposed between the tool bar layer and the currently viewable image layer. Optionally, the transparent layer can be eliminated, and the commands from a mouse can be interpreted by the system from the currently viewable image layer.

In a further aspect of the invention, both a first transparent layer and a second transparent layer are provided, where the second transparent layer remains fixed with respect to the first transparent layer, so that when a mouse is dragged to move the first transparent layer from a first set of coordinates to a second set of coordinates, a line corresponding to the distance the mouse has been dragged by a user can be drawn on the second transparent layer. Optionally, the second transparent layer can be eliminated, and a line corresponding to the distance the mouse has been dragged by a user can be drawn directly on the currently viewable image layer.

The interactive functions can include: (1) permitting a user to move the tool bar around on the display, for example, to move it out of the way of the currently viewable image layer; (2) zooming in or out of an object depicted in the currently viewable image layer; (3) resetting the currently viewable image layer, together with any tool bar layer and transparent layer that might be provided, to the condition the layers were in at the point of delivery of the set of images to the user; (4) measuring an object depicted in a set of images and obtaining information corresponding to the actual physical dimensions of the object; (5) causing an object depicted in a set of images to appear as if the object were automatically rotating to the right or, alternatively, to the left, to a degree and within a period of time automatically controlled by the system ("autorotate"); and (6) causing an object depicted in a set of images to appear as if the object is rotating to the right or to the left, to a degree and within a period of time controlled by the user via user commands delivered to the system by, for example, a mouse ("manual rotate").

In a still further aspect of the invention, multiple sets of images that are enabled for interactivity and with which a user can view and interact are provided on a single downloaded webpage. By selecting and deselecting among these sets of images, a user can carry out various interactive functions on the user's display with respect each one of the different sets of images on the webpage.

In another aspect of the invention, an enhanced zoom interactive function is provided in the case where an object or scene depicted in a set of images has a height greater than its width, whereby whichever image in whatever state a user is currently viewing stays proportionately within the user's field of view, for example, when a user zooms out of an image that of an object has a height greater than its width, and then zooms back into the image, the zoomed-out-of image remains in the viewable area of the user's display.

In another aspect of the invention, another enhanced zoom interactive function is provided that allows a user to focus a zoom operation on a particular area of an image, whereby the zoomed-in-on image is positionally adjusted to appear centered about a desired x, y point on the user's display, such as about the center of the user's display.

In a still further aspect of the invention, sets of images are provided with pre-defined highlighted areas that can be selected by a user to view supplemental information about the object(s) or scene(s) depicted in the sets of images, such as technical specifications and the like. The location of the highlighted areas relative to the image to which they pertain remains constant, even if an interactive function carried out with respect to an image in a set of images, e.g., a zoom interactive function.

In yet another aspect of the invention, sets of images are associated with a menu options feature that allows the user to choose from among several options that are provided in a menu with respect to an object or objects or scene depicted in a particular set of images, such as price, available sizes, available accessories and the like.

In another aspect of the invention, sets of images are associated with an appearance modifying feature that allows the user to modify the appearance of the object(s) or scene(s) depicted in a set of images, for example, to change the colors of the object(s) or scene(s) or to swap out one object for another.

In another aspect of the invention, sets of images are associated with a feature that, when invoked by a user, has the effect of transporting the user from the webpage on which the sets of images are associated to some other place, such as a page on a third party provider's website used by the third party provider for assisting a user in purchasing an item, etc.

In a still further aspect of the invention, a feature allows a user to display information about a transaction, complete a transaction, or provide information that is useful or necessary in ultimately completing a transaction on the same webpage as are provided the sets of images.

In another aspect of the invention, an enhanced tool bar is provided which is characterized by aesthetically-pleasing smoothness as a user moves from one tool bar button or icon to the next, for example by scrolling over the tool bar button with a mouse or clicking on it, whereby tool bar buttons are highlighted for the user and a label or description of what the tool bar button is for appear or pop-up without excessively distorting any of the tool bar buttons or without the appearance of tool bar buttons popping up with their associated labels or description in a manner that is out of sync with the other tool bar buttons.

In yet another aspect of the invention, webpages with sets of images characterized by software code that both enables various interactive functions as described herein and allows those interactive functions to be carried out, are deliverable to a user via email without risk that the content of the email and/or the configuration or location of the images will prevent the user from carrying out the available interactive functions upon receipt of the email.

In a further aspect of the invention, a graphical user interface is provided that allows a user to configure a set of images so that the set of images will enabled for various interactive functions as described herein, when provided on a webpage that allows the interactive functions to be carried out, for example, by prompting a user to provide parameters concerning the images in a set of images corresponding to the parameters necessary to enable and allow to be carried out the interactive functions of zooming or focus zooming, measuring, calling up supplemental information about an object, selecting from various menu options concerning an image, modifying the appearance (e.g., color) of an object in an image, repositioning a tool bar, etc.

Other features and advantages of the present invention will become apparent from the following detailed description, taken in conjunction with the accompanying drawings, which illustrate by way of example, the features of the present invention.

BRIEF DESCRIPTION OF THE DRAWING FIGURES

FIG. 17 is a schematic illustration of the possible content of a display of a system according to the invention wherein a user may carry out interactive functions with respect to multiple images on a single webpage.

FIG. 25 is a perspective view of a display of a system in which the position of a zoomed-in on image shifts off the display when the height of the image is greater than the width and the image is zoomed back in on.

FIG. 34b is another schematic view of the display of the system of FIG. 34a.

is a schematic view of a display of the system of one preferred embodiment of the invention illustrating the menu options interactive function.

Figure 35A:
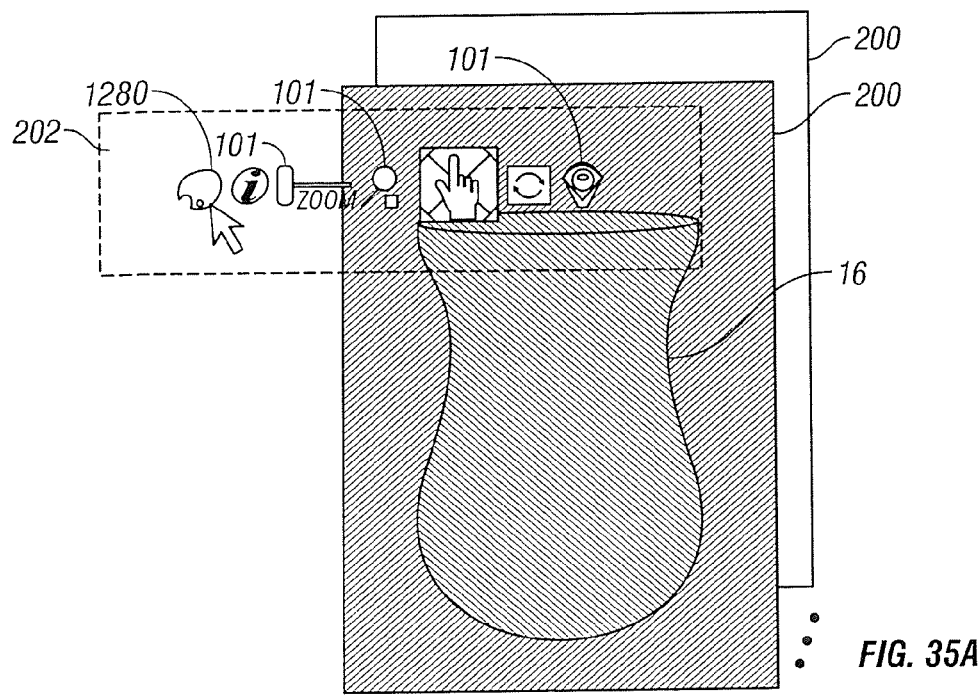

FIG. 35a is a schematic view of a display of the system of one preferred embodiment of the invention illustrating the appearance modifying interactive function.

Figure 35B:
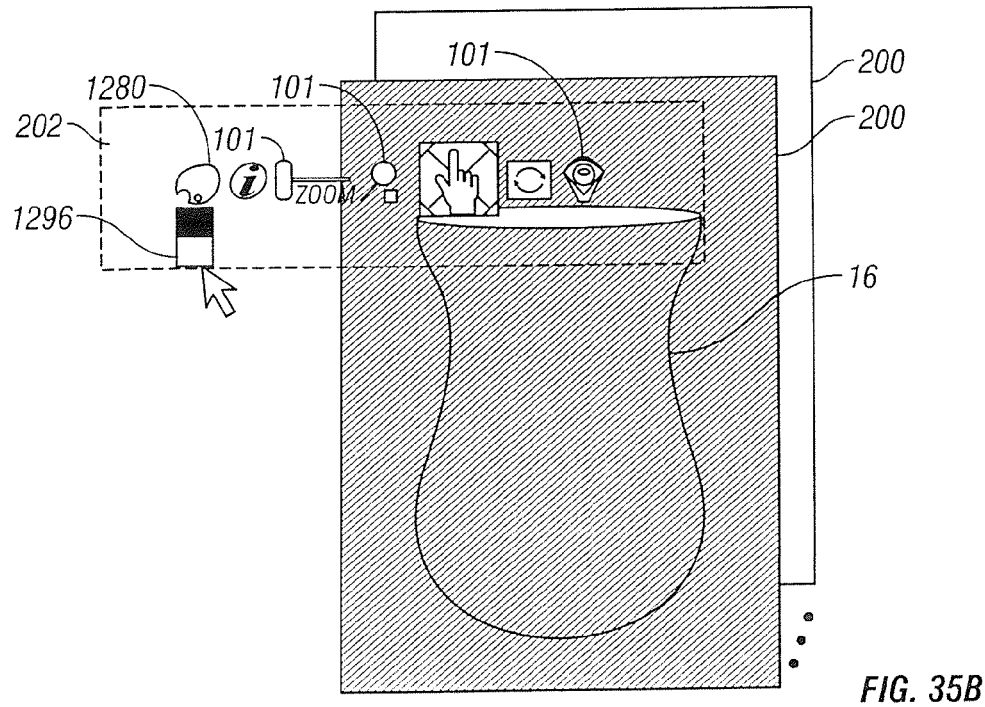

FIG. 35b is another schematic view of the display of the system of FIG. 35a.

Figure 36A:
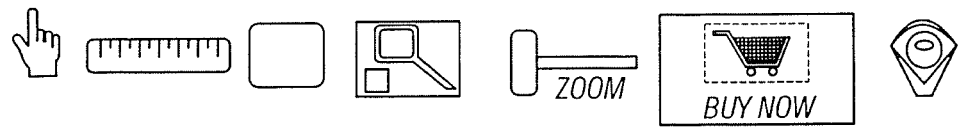

FIG. 36a is a perspective view of a tool bar of the system according to one preferred embodiment of the invention showing various tool bar buttons, including a tool bar button for invoking the transport interactive function.

Figure 36B:
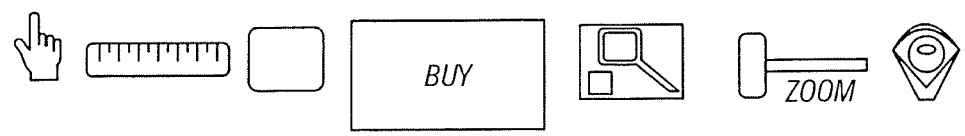

FIG. 36b is a perspective view of an alternative tool bar of the tool bar illustrated in FIG. 36a.

Figure 36C:
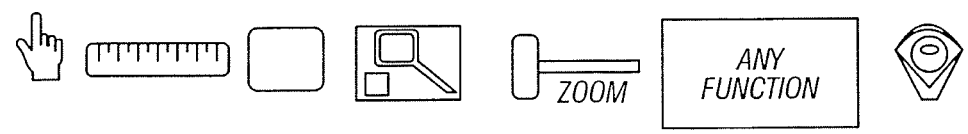

FIG. 36c is a perspective view of an alternative tool bar of the tool bar illustrated in FIG. 36a.

Figure 37:
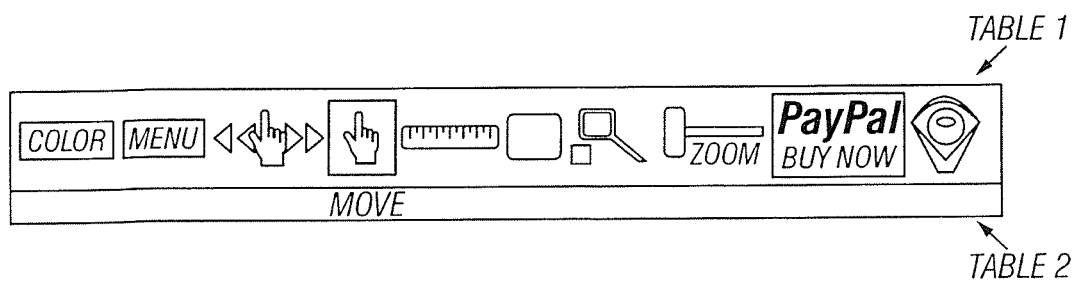

FIG. 37 is a schematic view of a tool bar of one preferred embodiment of the system of the invention, showing the tool bar buttons in one table in the descriptive information about the tool bar buttons in another table.

Figure 38:
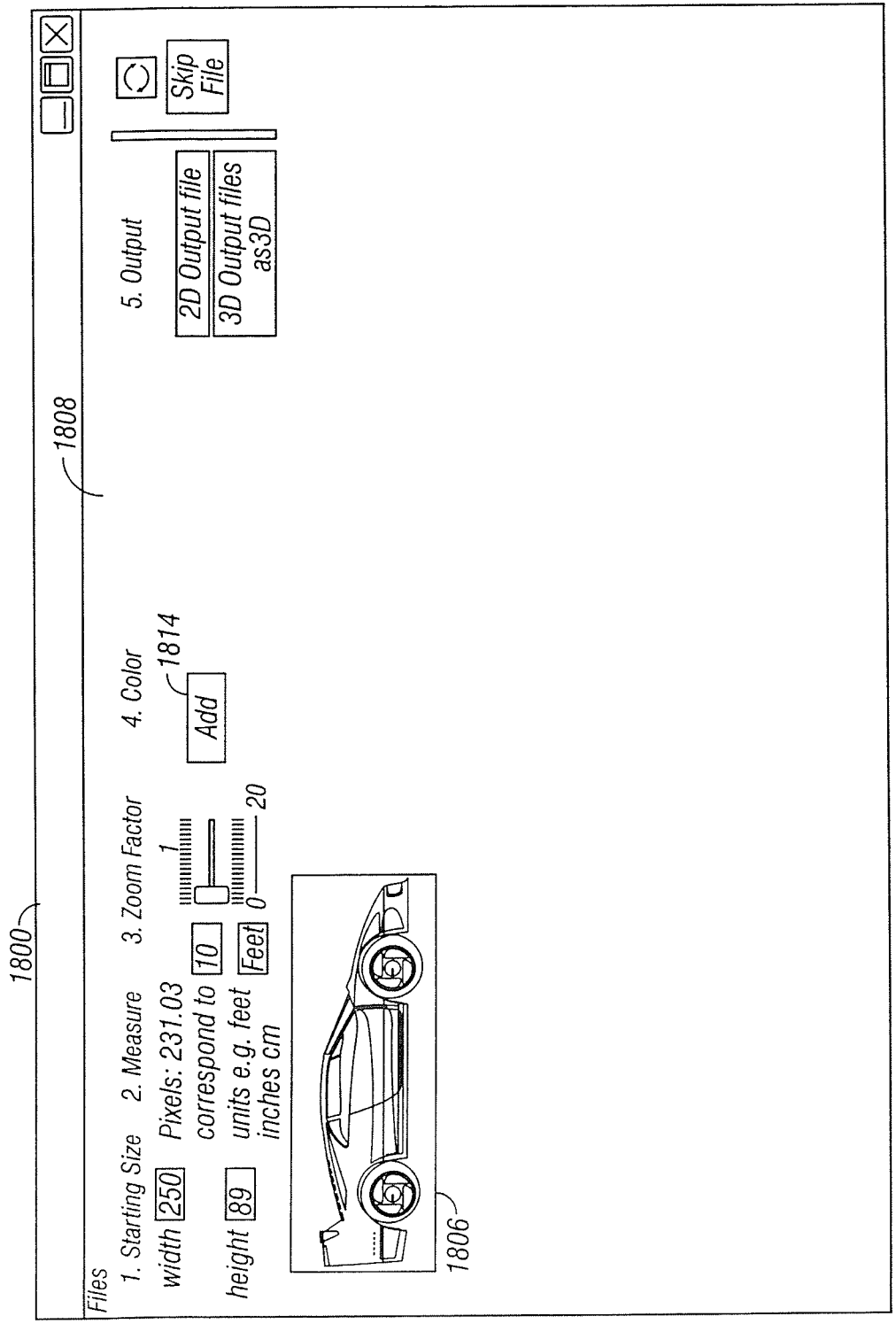

FIG. 38 is a perspective view of a graphical user interface according to one preferred embodiment of the system of the invention.

Figure 39:
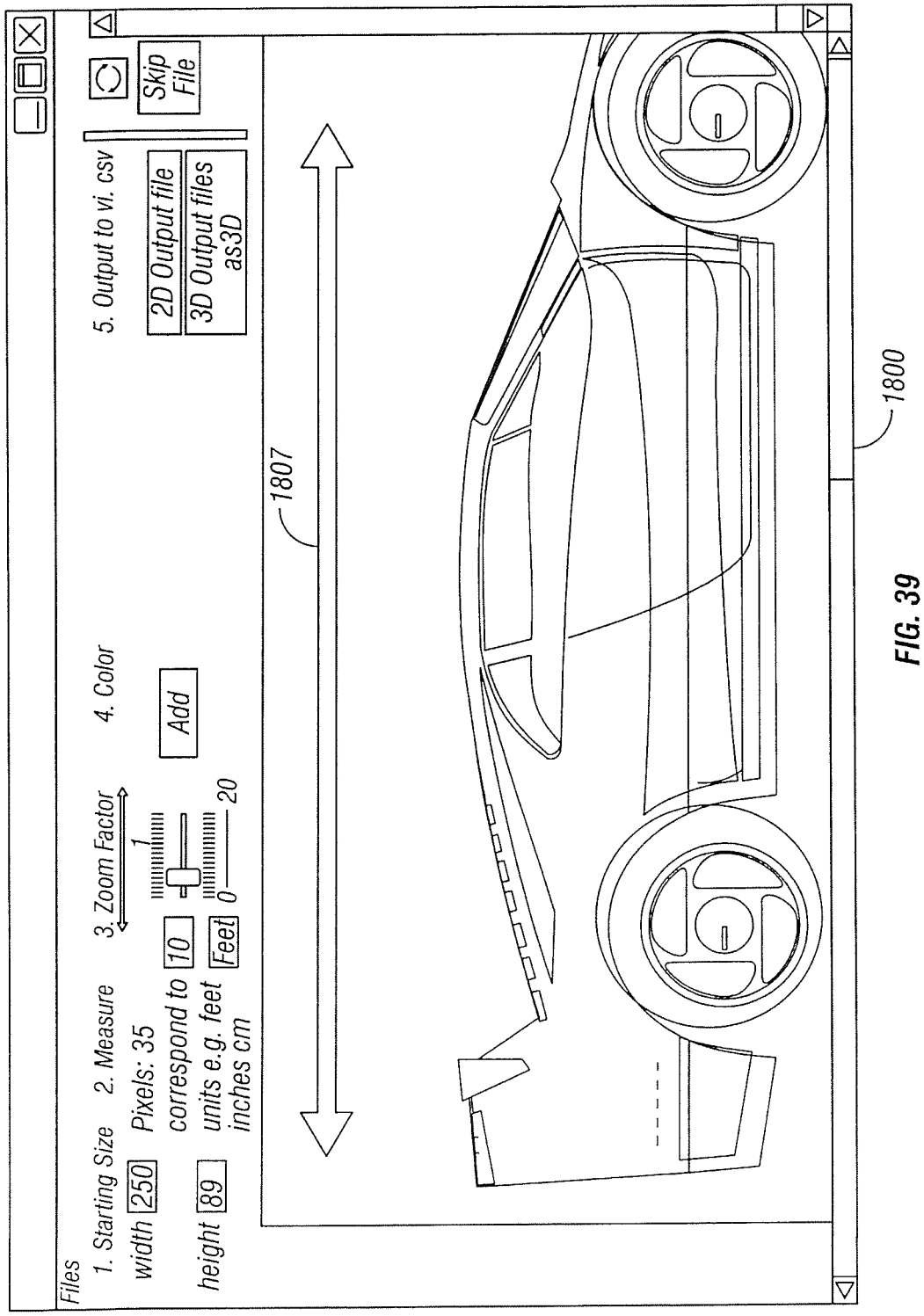

FIG. 39 is another perspective view of the graphical user interface of FIG. 38.

Figure 40:
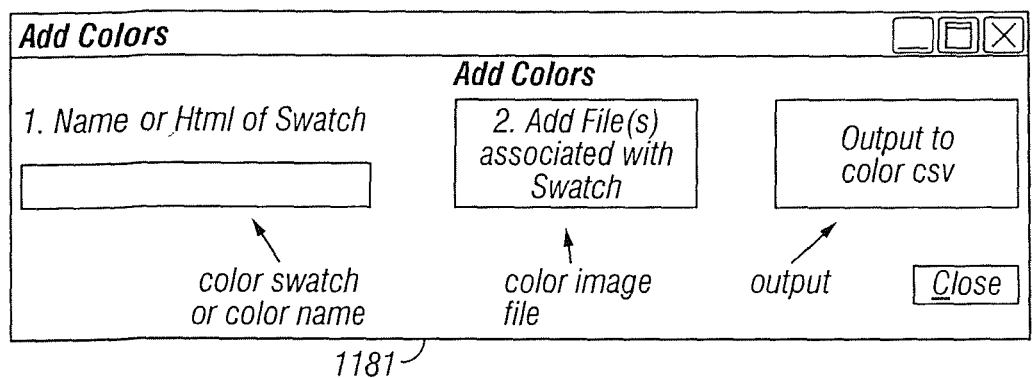

FIG. 40 is another perspective view of the graphical user interface of FIG. 38.

DETAILED DESCRIPTION OF THE PREFERRED EMBODIMENTS

Persons with ordinary skill in the art will appreciate that the following description of the present invention is illustrative only and not in any way limiting. Other embodiments of the invention will readily be suggested to such skilled persons having the benefit of this disclosure.

Figure 1:
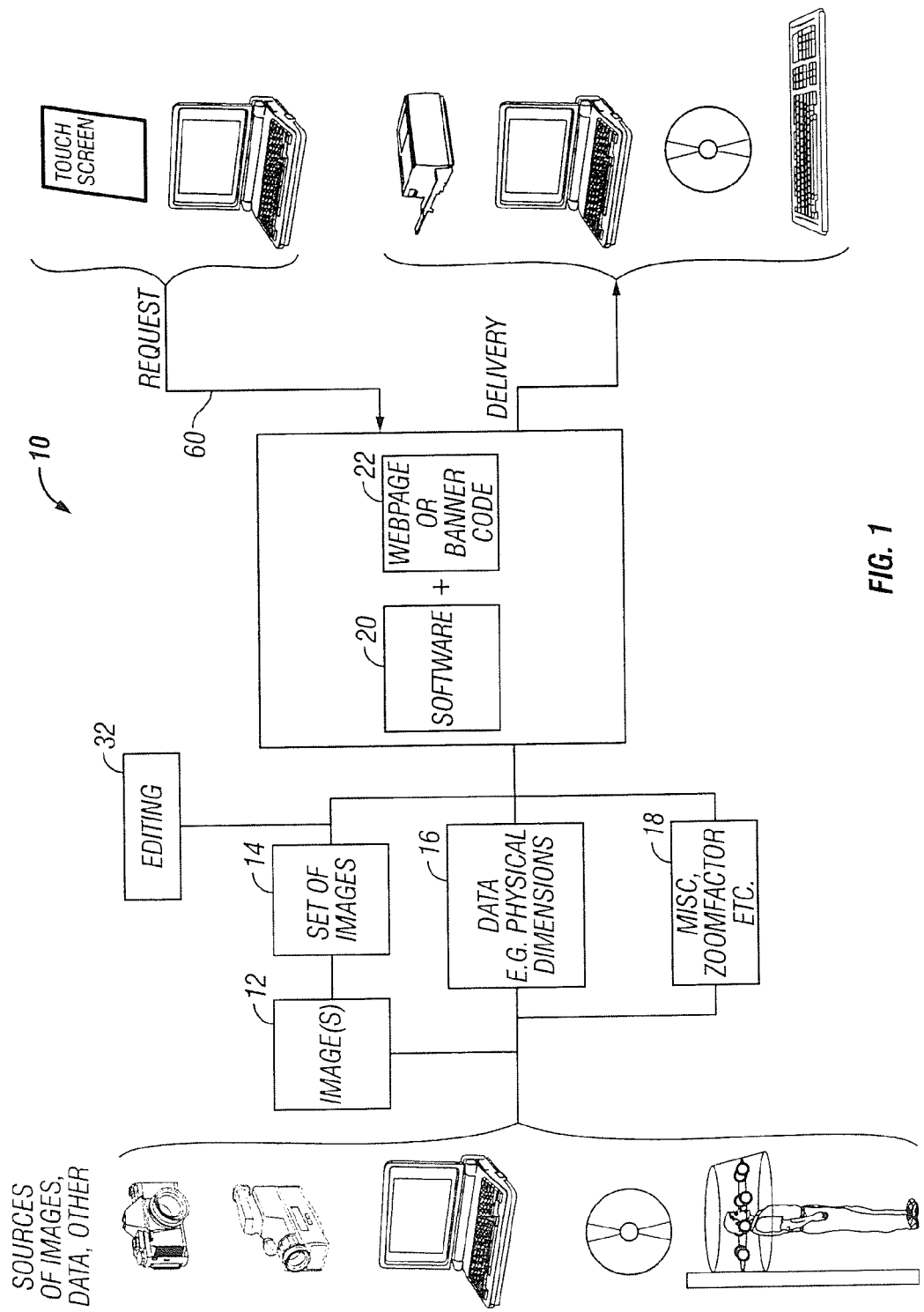
FIG. 1 is a schematic view of a system according to a preferred embodiment of the present invention.

Referring now to the drawings, wherein like reference numerals denote like or corresponding parts throughout the drawings, and more particularly, to FIG. 1, there is shown a presently preferred embodiment of a system 10 according to the invention. One or more images 12 comprising a set of images 14 are introduced to the system 10 for further processing, in order to make available certain interactive functions with respect to the set of images 14.

The number of images 12 in a set of images 14 depends, in part, on the level of sophistication of the interactive functions that are to be enabled for that set of images 14. For example, when the interactive functions to be carried out do not require a 3-D effect, only one image 12 may be necessary for such interactive functions to be accomplished, accordingly, the set of images 14 may contain only a single image 12. However, if the user is to be able to interact with a set of images 14 in order to perceive the illusion of 3-D, then more than one image 12 will be necessary than if only a 2-D effect for the user is desired.

Figure 2:
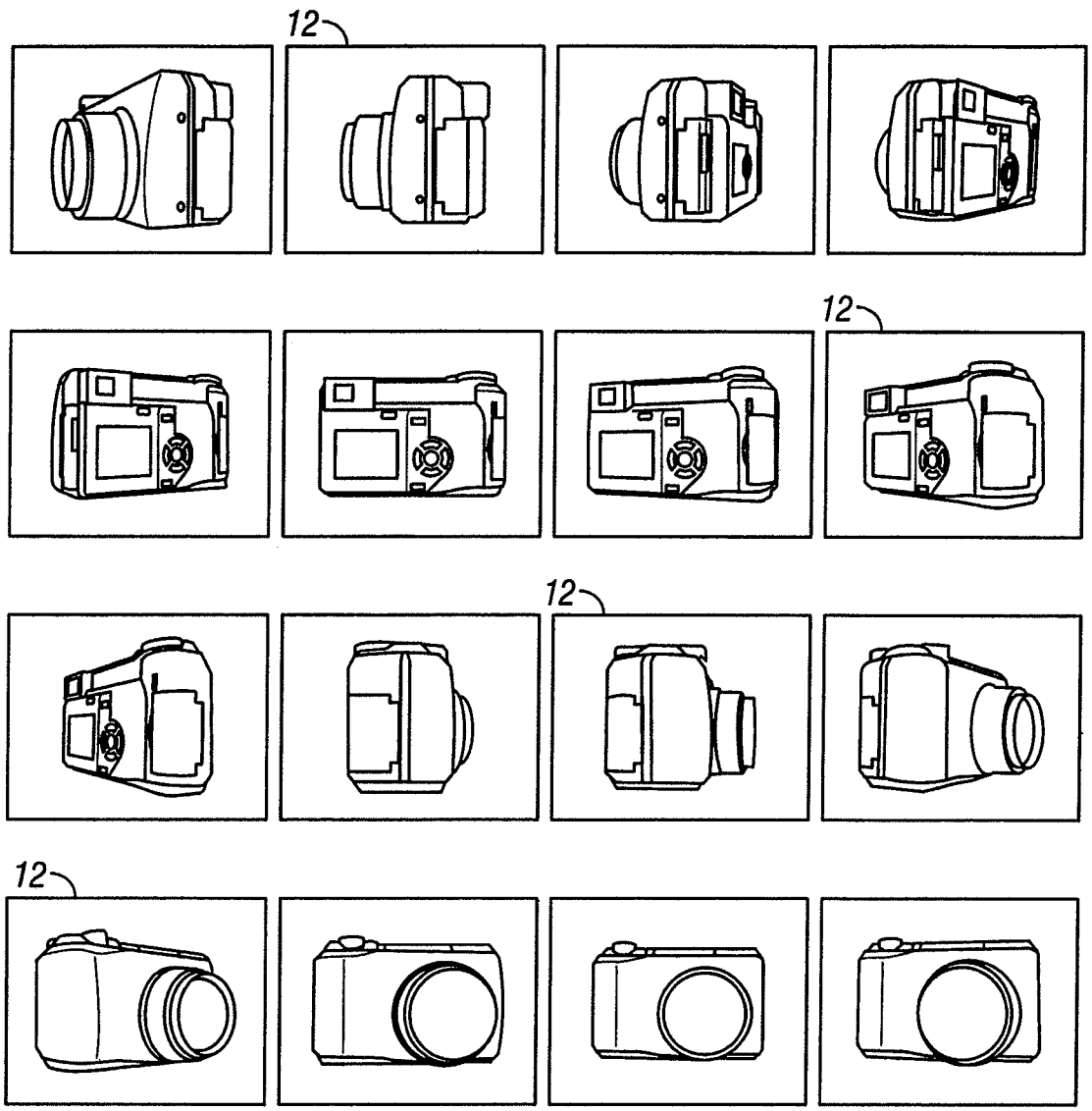
FIG. 2 is a schematic view of a set of images to be introduced into a preferred embodiment of a system according to the present invention.

For a basic virtual 3-D image, the set of images 14 typically comprises sixteen images 12 of the object 16, where each image 12 of a target object or scene is taken from a different angle, while desirably keeping the target object or scene at the same focal point for whatever device is used to capture the images 12. For example, with reference to FIG. 2, a set of images 14 is shown that comprises sixteen images 12 of an object 16, which happens to be a camera, that were captured by a digital camera.

Figure 3:
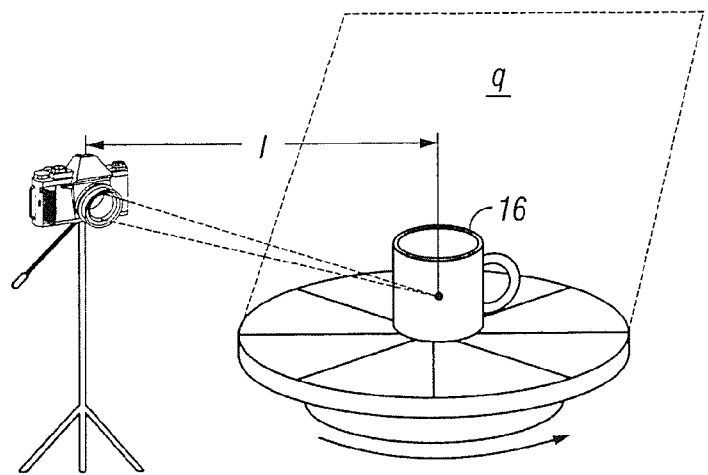
FIG. 3 is a perspective view of one method of acquiring a set of images to be introduced into a preferred embodiment of a system according to the invention.

Referring now to FIG. 3, each image 12 shown was shot or taken from a different incremental angle about 360 degrees in certain plane of the object 16, for example, every 22.5 degrees in the plane q of the object 16, but the object 16 was kept at the same focal length from the digital camera that was used to take the pictures. Thus, it can be appreciated that if the sixteen images 12 were viewed in sequence and in rapid succession, then the viewer would effectively perceive a 360-degree view in a particular plane q of the object 16.

If the level of interactivity to be enabled is more sophisticated, such as allowing a user to virtually rotate an object in an image through a first 360 degrees in a first plane and a second 360 degrees in a second plane (i.e., to virtually spin an object in an image about two axes), then some multiple of sixteen images of the object 16 likely would be required, such as thirty-two images. A gyroscopic effect, i.e., wherein an object appears to be capable of rotating in any plane, can be achieved if sufficient images in those planes are acquired. Although in the foregoing examples the numbers of images happen to be sixteen and a multiple of sixteen, virtually any odd or even number of images could be employed in keeping with the present invention.

In a preferred embodiment of the system 10 according to the invention, if the images 12 comprising a set of images 14 are not originally in digital form, the images 12 are converted from the original form into digital form by any of several methods well known to those of ordinary skill in the art before being the images 12 are introduced to the system 10. It is contemplated, however, that in other embodiments of the system 10 of the invention, the images 12 could be introduced to the system 10 in any non-digital form, without the need for conversion to digital form if the original form is not digital.

Optionally, an editing facility or feature 32 is provided in which the images 12 in the sets of images 14 can be edited before being submitted for processing. In cases where a set of images 14 comprises a set of images of an object or scene taken from multiple angles, during the optional editing feature 32, the discrete images can be combined into a single image file, which subsequently can be edited with respect to such features as background color, contrast, brightness, grey scale, or any other number of editable aspects of a digital photograph, such as made available by several commercial editing programs.

For example, if the images 12 are a set of images 14 that has been acquired by a digital camera then the set of images can be combined, either vertically or horizontally, to create a single image file. There are several commercially available software packages with which such combination and editing can be combined, such as the packages sold under the trade name PHOTOSHOP by Adobe Systems, Inc. As will be obvious to one with ordinary skill in the art pertaining to this invention, other editing software programs exist or can be developed which allow various editing functions to be performed on combined sets of images.

Once combined in such an editing program, the images can be edited quickly and efficiently, because any changes made will be made to all of the images in the combined file (e.g., changing the background color will change the background color for all of the images comprising the input). Alternatively, the editing functions provided in the editing facility 32 can include functions that operate on single images, or less than all of the images in the set of images that comprise a set of images 14.

The set of images 14 is introduced into the system 10 where the set of images 14 is processed by software 20 that is implemented or is executable on a suitable computer or processor. Optionally, along with the set of images 14, other information relating to the set of images 14 also can be introduced into the system 10, such as information concerning the actual physical dimensions of an object 16 depicted in a set of images 14 (e.g., the height, width, and/or depth of the object in inches, feet, etc.), and information that controls certain aspects of the interactive functions that are enabled for the set of images 14 (e.g., a zoom factor that determines the maximum degree to which an image can be zoomed in on). Alternatively, the software 20 may calculate the actual physical dimensions of an object 16 depicted in a set of images 14, based on information concerning the actual physical dimensions of the location at which the images 12 were captured, together with information concerning the focal length, of the camera with respect to the object 16, etc. Similarly, the software 20 may apply default values if information that optionally can be introduced is not, in fact, introduced, such as a default value for the zoom factor.

The software 20 both controls the manner in which the set of images 14 is delivered to a user in response to the user's request 60 and, once the set of images 14 is delivered, permits the user to initiate and carry out a variety of interactive functions with respect to the set of images 14. Depending upon the application, these interactive functions may include providing the user with the illusion of moving an object 16 in two dimensions (e.g., vertically or horizontally), zooming in on an object 16, or rotating an object 16 to obtain a 3-D effect.

The software 20 advantageously can be added to the HTML or XML code 23 that already exists on a third party provider's webpages (either as developed by the website provider or as contained in a banner advertiser's content for the website provider), so as to provide the third party website provider or banner advertiser with the ability to offer users (1) the perception of fast image download or delivery time; and (2) 2-D or virtual 3-D viewing without the necessity of the user either already having or having to download plug-ins to enable the interactivity; and (3) enhanced image quality when a zoom in function is carried out.

In a presently preferred embodiment of the system 10 according to the invention, the software 20 is written in the language corresponding to the software protocol known as DHTML or "Dynamic Hypertext Markup Language," and advantageously uses the layering feature available in the protocol. However, as would be apparent to one with skill in the art, the system 10 could be implemented by using any other protocol or language, suitable for web-based use or non-web use, that permits apportionment of sets of images for fast delivery to a user with which the user can initiate interactive functions such as those described herein. That is, in a preferred embodiment of the system 10 according to the invention, the software 20 is written in a language that is specifically used in connection with web pages that are intended to be viewed using a browser, i.e., a "client" software program that allows a user to view web pages and which usually is used to search for and view web pages from a website accessible over the Internet. (A browser can also be used to view web pages that are stored on a suitable device such as a CD-ROM or a local computer hard drive, without the need for an Internet connection.) However, the basic functionality of the software 20, e.g., the results achieved by apportioning each of multiple images of an object into discrete layers and making only one of the multiple images viewable to the user at a given time, can also be implemented in other languages, such as C, where the intended use of the system 10 is a use not related to the Internet.

Figure 4:
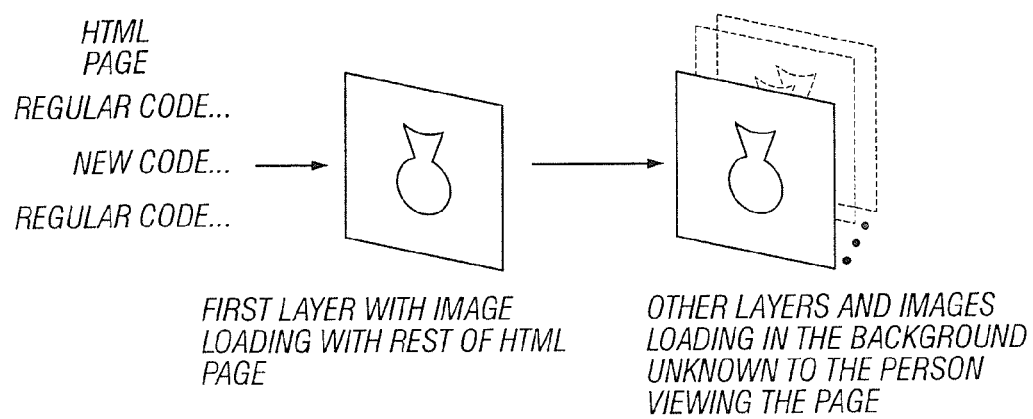
FIG. 4 is a schematic diagram of certain processing steps according to a preferred embodiment of a system according to the invention.

The functionality of the software 20 can be described as follows: When the system 10 according to the invention detects a request 60 for a certain set of images 14 that are present on a third party website, the requested set of images 14 is delivered to the user by taking advantage of the layering features that are available in the DHTML software protocol. Specifically, by example and with reference to FIGS. 4-5, if the user sends a request related to an object 16 that is viewable to the user on a third party provider's website, the system 10 according to the invention will couple or add the software 20 with the code on the web page that the third party website provider otherwise would deliver to the user in response to his or her request. So coupled, and upon delivery to the user, the software 20 will instantaneously create a DHTML layer 200 for each file that corresponds to the set of images 14 that are requested. If the set of images 14 associated with the object comprises sixteen images 12, then sixteen layers 200a-200p will be created. Each of the image layers 200 is originally sized to have approximately the same dimensions in terms of height and width (although the dimensions of each image layer 200a-200p can change when certain interactive functions, such as the zoom function, are performed). Importantly, the first layer 200a created for a predetermined one of the images 12 (i.e., whichever image 12 the user is intended to see first) will be immediately perceptible or viewable by the user upon delivery in a viewable area defined by a border on the user's display. Thus, upon the website's processing of the user's request 60 for the pertinent web page, the user will immediately perceive one of the multiple images associated with the request. From the perspective of the user, therefore, there is virtually no delay between the time the request for the web page is processed and the time the first image is viewable.

While the user is perceiving the image file disposed in the first layer 200a, the other fifteen layers 200b-200p are being created after it, but are not yet made visible to the viewer. In the system 10 according to the invention, only one image layer 200 is made perceptible or visible to a user at any given time. Whichever image layer is perceptible or visible is the currently viewable image layer.

Typically, then, and dependent upon the speed with which the user can obtain the set of images 14 associated with his or her request (i.e., speed dependent upon the nature of the connection, e.g., dial-up or the higher speed DSL or T1 connections), the user will perceive an image corresponding to his or her request almost immediately, and will not have to wait for all of the images 12 in the set of images 14 to be delivered to his or her computer's cache memory or hard drive. Similarly, the user can view the set of images 14 without any delay as typically would be incurred when images are delivered using JAVA (the object-oriented programming language developed by Sun Microsystems, Inc.), and without the necessity of any additional software, such as that provided in a plug-in. (While additional software such as that commonly contained in a plug-in is not necessary for a user to use the system 10 according to the present invention, it is contemplated that the software 20 of the system 10 might be provided to enable delivery of sets of images 14 and interactivity with sets of images other than via a web page, such as in an application program that is made available to users separately from the sets of images 14 and web pages, for example, by being downloaded from a website or provided on a CD-ROM.)

As mentioned above, the system 10 according to the invention can be used advantageously to deliver sets of images 14 that are part of the primary content of a website, or alternatively, in connection with banner advertisements. For example, the sets of images 14 could be delivered as part of a banner advertisement that a third party advertiser has arranged with the website provider to deliver on certain web pages that are requested by a user.

Figure 6:
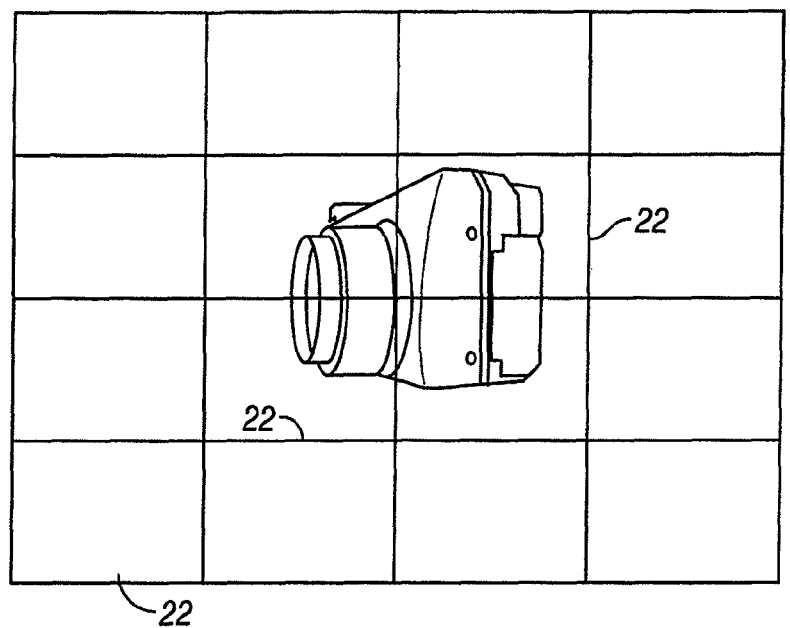
FIG. 6 is a schematic view of an image that has been "split" into sixteen parts according to one embodiment of a system according to the present invention.

With regard to the nature of the connection the user has with respect to the website from which the requested set of images 14 are delivered, when the connection is a relatively slow connection, such as a dial-up modem connection, one embodiment of the system 10 according to the invention further apportions each of the images 12 in the set of images 14 for delivery into a grid of multiple parts or "splits" 22 for delivery. An example of an image 12 that has been "split" into sixteen parts is illustrated schematically in FIG. 6. If the dial-up connection is corrupted or lost in the middle of delivery of a web page, the splits 22 that made it to the user's cache memory or hard drive before the connection was lost do not have to be re-sent when the connection is reestablished. Once delivery of all of the splits 22 corresponding to an image 12 have been delivered to a user, a single image layer 200 is created for that image 12 and the splits are not perceptible to the user. In a currently preferred system 10 according to the present invention, the number of splits 22 that each image file is apportioned into for delivery is sixteen or thirty-two, but any odd or even number of splits can be accomplished.

Figure 5:
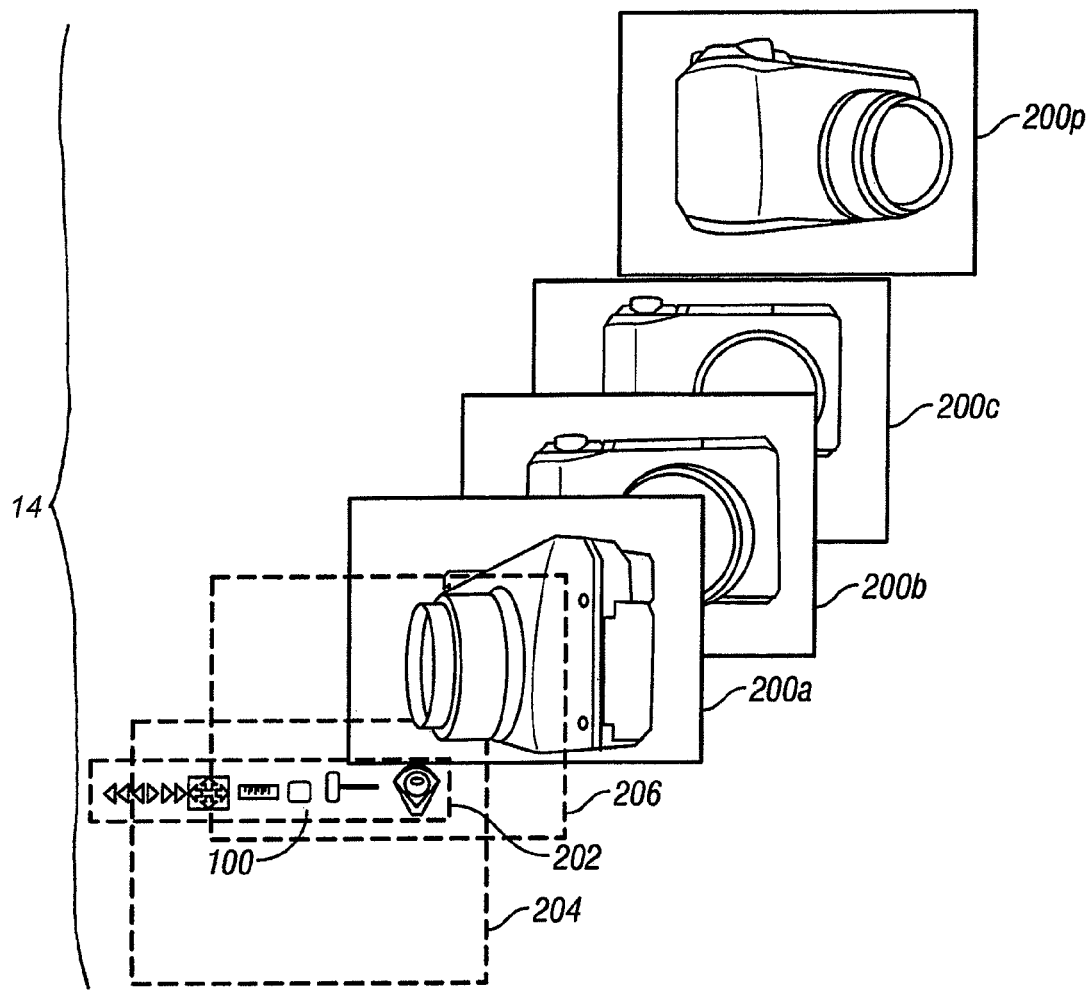
FIG. 5 is a schematic view of a layering technique used in one embodiment of a system according to the present invention.

In a presently preferred embodiment of the system 10 according to the invention, and with reference again to FIG. 5, three additional layers are created upon delivery of the set of images 14 in addition to the layers 200 with the image files as are described below. A tool bar layer 202 is created that contains a tool bar 100 which is also made viewable to the user along with the predetermined one of the image layers 200a at the time of initial delivery of the set of images 14. With reference to FIG. 5, it will be appreciated that the tool bar layer 202 has at least one dimension that is generally less than the corresponding dimension of the image layers 200, for example, the tool bar layer 202 might have approximately the same width as the image layers 200 but a height that is substantially less than the height of the image layers 200, so that whichever image layer 200 is currently viewable to the user can be clearly seen despite the presence of the tool bar 100.

Underneath or behind the tool bar layer 202, and on top of or in front of the image layers 200, a first transparent layer 204 is provided. Unlike the tool bar layer 202, the first transparent layer 204 is sized to have dimensions that approximate the dimensions of the image layers 200, both in terms of height and width. Whenever the currently viewable image layer 200 is caused to change in size, e.g., during a zoom interactive function, the first transparent layer 204 adjusts in size to match that of the currently viewable image layer 200. Further, preferably, whenever the first transparent layer 204 is moved along the x- and y-axes of the user's display, such as might be initiated by a user's clicking on the first transparent layer 204 with a mouse and dragging from point a on the x- and y-axes (e.g., $x_a$, $y_a$) to point b on the x- and y-axes (e.g., $x_b$, $y_b$), the first transparent layer 204 is associated in the software 20 such that the image layers 200 are moved to the same position along the x- and y-axes as the first transparent layer 204.

The first transparent layer 204 is especially useful in carrying out certain of the interactive functions with respect to the set of images 14, i.e., the manual rotate function and the measuring function as described hereinbelow. The transparent layer 204 also allows other of the interactive functions to be carried out efficiently, such as the pan or move function, because movement of the first transparent layer 204 causes all of the image layers 200 to move along with it. (Under some circumstances, the first transparent layer 204 may afford the additional advantage of limiting the degree to which a user may copy the currently viewable image in the image layers 200, as the copy function may result in the copying of no more than the first transparent layer 204 and/or the first transparent layer 204 and the tool bar layer 202.)

Underneath or behind, from the perspective of the display, the first transparent layer 204 is provided a second transparent layer 206, which primarily is used in connection with the measuring function described hereinbelow. Preferably, the second transparent layer 206 remains at fixed coordinates along the x- and y-axes even if other of the layers are moved with respect to the x- and y-axes.

Figure 7:
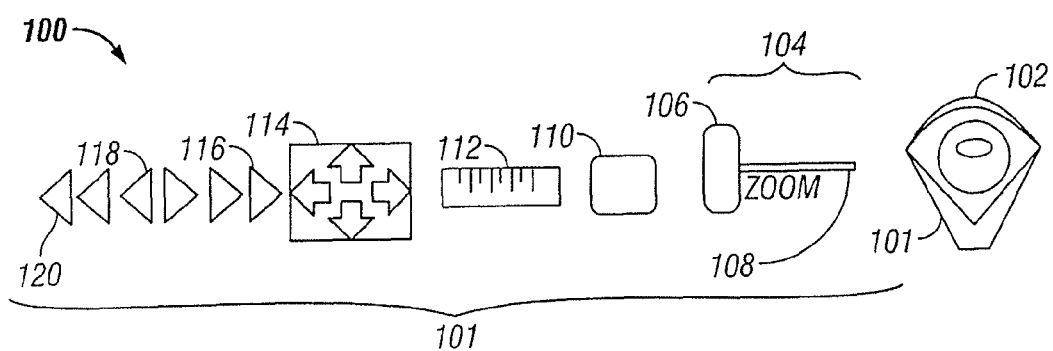
FIG. 7 is a perspective view of a tool bar in accordance with one embodiment of a system according to the present invention.
Figure 8:
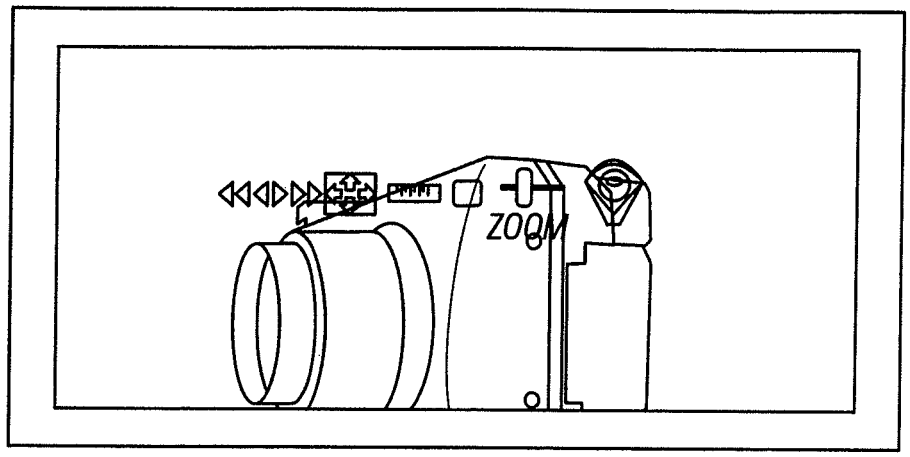
FIG. 8 is a perspective view of a display according to one embodiment of a system according to the invention before a tool bar has been moved.

Some presently contemplated interactive functions according to the system 10 of the invention will now be described more particularly with reference to FIGS. 7-15. Referring now to FIGS. 7 and 8, one possible implementation of a tool bar 100 according to the present invention is shown. In a presently preferred embodiment of the system 10, "buttons" or icons 101 on the tool bar 100 are provided, some of which merely enable certain interactive functions and others of which both enable interactive functions and control, to some degree, how the interactive functions are carried out with respect to the set of images 14.

Tool Bar

As one skilled in the art will appreciate, commands can be conveyed to a system by a variety of means, such as via a mouse or a similar device such as a touch screen (e.g., sending commands by moving a finger from point to point on a touch screen display). Commands can be associated with various positions or states of a mouse with respect to a display. For example, commands can be associated with the positions or states of "mouse over" and "mouse click," and, in some systems such as the preferred embodiments of the system according to the present invention, with the positions or states of "mouse up," "mouse down," and "mouse out." The software 20 can be configured such that each one of these commands initiates some corresponding action with respect to the buttons in a tool bar 100.

With reference now to FIG. 7, a tool bar according to a preferred embodiment of the system 10 of the invention is illustrated. From right to left, the buttons 101 on the tool bar 100 illustrated in FIG. 7 allow a user to invoke the following interactive functions: (1) the button 102, which can be in the form of a logo (as shown in FIG. 7) (such as, the logo of the provider of the system 10 or the logo of the provider of the web pages), enables the user to use a mouse, or other object that similarly can be used to provide x- and y-coordinates to the system 10 that correspond to locations on the display, to move the tool bar around on the viewable portion of his or her display screen; (2) the button 104, which is comprised of a thumb or knob 106 and a horizontally disposed track 108, enables the user to zoom in on or zoom out of an image 12; (3) the "reset" button 110, which enables the user to return to the whatever first predetermined or selected image layer 200 was originally delivered to the user and in the form in which it was originally delivered (e.g., not zoomed in on); (4) the "measure" button 112, enables the user to use a mouse or similar device to first identify a certain dimension of an object in an image and then to obtain information concerning an actual physical dimension corresponding to that certain dimension; (5) the "pan or move" button 114, which enables the user to use his or her mouse or similar device to pan or move the transparent layer 204, the image layers 200 and, optionally, the tool bar layer 202 from one position to another on the display screen, in any of the horizontal, vertical or diagonal directions; (6) the "rotate right" button 116, which enables the user to cause the currently viewable image layer to change sequentially from among the possible image layers 200a-200p, in order to give the user the illusion of rotational movement in the right direction; (7) the "manual rotate" button 118, which the user to perceive a rotational effect by clicking and dragging a mouse, in one of at least two possible directions (e.g., left or right), over the currently viewable image layer, user to cause the currently viewable image layer to change sequentially from among the possible image layers 200a-200p; and (8) the "rotate left" button 120, which enables the user to cause the currently viewable image layer to change sequentially from among the possible image layers 200a-200p, in order to give the user the illusion of rotational movement in the left direction. Other tool bar buttons 101 can be provided as are described with reference to other interactive functions set forth hereinbelow, such as a focus zoom button 1104, the menu options button 1254, the appearance modifying button 1280, etc., as well as for any other interactive function that might be enabled for a given set of images 14.

In order to provide the user with a description of the interactive functions with which the buttons on the tool bar correspond, in a preferred embodiment of the system 10 according to the invention, whenever the user clicks on a button or icon on the tool bar 100, a description of how the user can interact with the requested set of images 14 using that button—i.e., the icon's functionality—appears or "pops up" on the display, as is shown in the text boxes of FIG. 7.

Alternatively, when a user first begins use of the system according to the invention, the user might be presented with a look-up table, help menu or other information which describes each of the buttons on the tool bar, so that no prompting of the user is necessary when the "manual rotate" button (or any other button) is activated. Although providing the tool bar to enable the user to initiate the various interactive functions with a requested image is desirable, one of ordinary skill in the art will readily appreciate that other means of enabling a user to commence interactive functions are possible, such as using various combinations of keystrokes on a keyboard coupled to the display, using voice commands coupled to the display, or other signals corresponding to commands coupled to the display.

In still a further alternative embodiment, the tool bar layer 202 as well as all of the image layers 200 except the currently viewable image layer 200 might be kept hidden from view upon delivery of a set of images 14. Instead of immediately displaying the tool bar to the user, another different layer might be made visible together with the currently viewable layer 200 that contains an icon or other symbol that can invoke the tool bar layer 202. That is, when a user moves his or her mouse over the symbol or icon in this tool-bar-invoking layer, the user's action causes the system 10 to make visible the tool bar layer 202 along with the currently viewable layer 200. Alternatively, the tool-bar-invoking layer will be hidden when the tool bar layer 202 and the currently viewable image layer 200 are made visible. Preferably, the tool-bar-invoking layer is sized so as to be smaller than the image layers 200, for example, one tenth of the height and width of the image layers 200, so that the tool-bar-invoking layer, when visible to the user, would not interfere to any significant degree with the user's perception of the object(s) 16 or the scene 17 depicted in the currently viewable image layer 200.

Similarly, a feature might be provided in the system 10 according to the invention where the tool bar 100 in the tool bar layer 202 has a button or icon 101 which, when activated by the user by some action such as a mouse over, click, or the like, will cause the tool bar layer 202 to become hidden from the user's field of view and replaced by the tool-bar-invoking layer, such that the user will again perceive only the tool-bar-invoking layer and the currently viewable image layer 200 in his or her field of view at one time. In one presently preferred embodiment of the system 10 according to the invention, where the set of images 14 are delivered and interacted with in conjunction with a banner advertisement on a webpage, the "reset" button 110 on the tool bar is used to hide the tool bar from view, such that only the currently viewable layer 200 and a tool-bar-invoking icon in the tool-bar-invoking layer are perceptible by the user. Features such as described above allow users who are familiar with the various interactive functions of the system 10 to hide the tool bar 100 altogether when desired, in order to eliminate the tool bar 100 as a possible distraction on the users' display, while the users are perceiving the currently viewable image layer 200.

Some of the interactive functions that are available as options on the tool bar 100 are entirely carried out when the pertinent button or icon on the tool bar is activated or invoked by a user, for example, when the user clicks on the button and holds the mouse button down on the autorotate left or autorotate right buttons, the system 10 will cause the currently viewable image layer to cycle through image layer 200a through 200p or through image layer 200a and then through image layers 200p, 200o, etc., respectively. With regard to other of the interactive functions, moving the mouse over, pressing down on the mouse button, or clicking on the button causes the system 10 to be placed in that particular interactive function mode, and the user has to move the mouse with respect to the currently viewable image layer 200 in order to carry out the interactive function, whereby the function performed responds to commands from the mouse corresponding to the coordinates of the mouse on the first transparent layer 204 or on the currently viewable image layer 200. For example, clicking on the "manual rotate" button on the tool bar puts the system 10 in "manual rotate" mode, but in order for the user to perform the manual rotate interactive function, the user has to click on the first transparent layer 204 (which, from the perspective of the z-axis relative to the user's display, is on top of or above the currently viewable image layer 200), and drag the mouse in the direction in which the rotational effect is desired (e.g., to the left or to the right).

Figure 9:
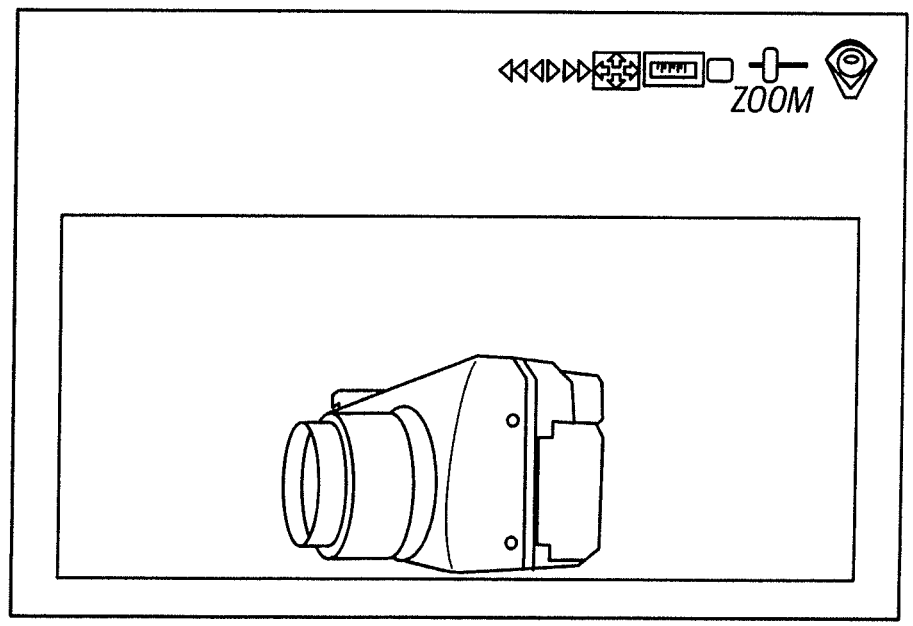
FIG. 9 is a perspective view of a display according to one embodiment of a system according to the invention after a tool bar has been moved.

With regard to the tool bar 100 itself, the system 10 has a feature whereby the user can change the orientation of the tool bar 100 on the user's display. That is, by pressing down a mouse button and/or clicking on a mouse while the mouse is positioned anywhere within the tool bar layer 202, the user can cause the tool bar 100 to be moved anywhere on the user's display, either to a position somewhere within the viewable area in which the currently viewable image layer 200 is being displayed, or completely outside of that viewable area (e.g., beyond the border of that viewable area) so that the tool bar 100 does not interfere with user's ability to perceive the entirety of the currently viewable image layer 200. That is, when the user moves a mouse anywhere within the boundaries of the tool bar layer 202 and presses down on the mouse button and/or clicks using the mouse at coordinates corresponding to $x_1$ and $y_1$, and then drags his or her mouse to another location on the display corresponding to coordinates $x_2$ and $y_2$, the tool bar 100 will be moved from $x_1$, $y_1$ to $x_2$, $y_2$. With reference to FIGS. 8-9, and based upon the difference between $x_1$ and $x_2$, on the one hand, and the difference between $y_1$ and $y_2$, on the other hand, the tool bar 100 will be moved on the display, for example, outside of the field of view of the currently viewable image layer 200 altogether. A button or icon 101 on the tool bar layer might provide a visual cue to a user for the move toolbar function, such as, the button 102, which in the figure happens to be the logo of a provider of the system 10.

Zoom Interactive Function (Standard)

The zoom interactive function of the system 10 according to the invention, in particular, reflects several significant advantages over zoom interactive functions of prior art systems. More particularly, the zoom interactive function of the system 10 according to the invention allows a user to perceive a smoothly executed zoom, wherein the size of the viewable area within which the zoom is being performed increases to accommodate the enlarged image, and the dimensions of the currently viewable image layer 200 that is being zoomed in on are adjusted proportionally as the zoom is carried out. Moreover, the resolution of the image 12 in the currently viewable image layer 200 after the zoom remains high, because high resolution images can be delivered to a user with the system 10 according to the invention without any appreciable delay caused by the large amount of data that is associated with the high resolution images.

Figure 10:
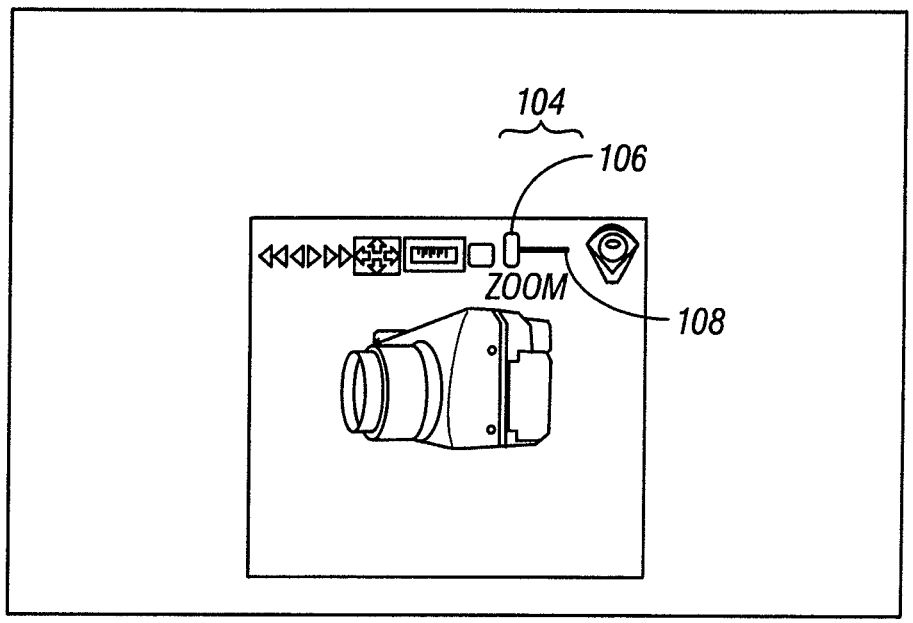
FIG. 10 is a perspective view of a display according to one embodiment of a system according to the invention before a zoom-in function has been performed.
Figure 11:
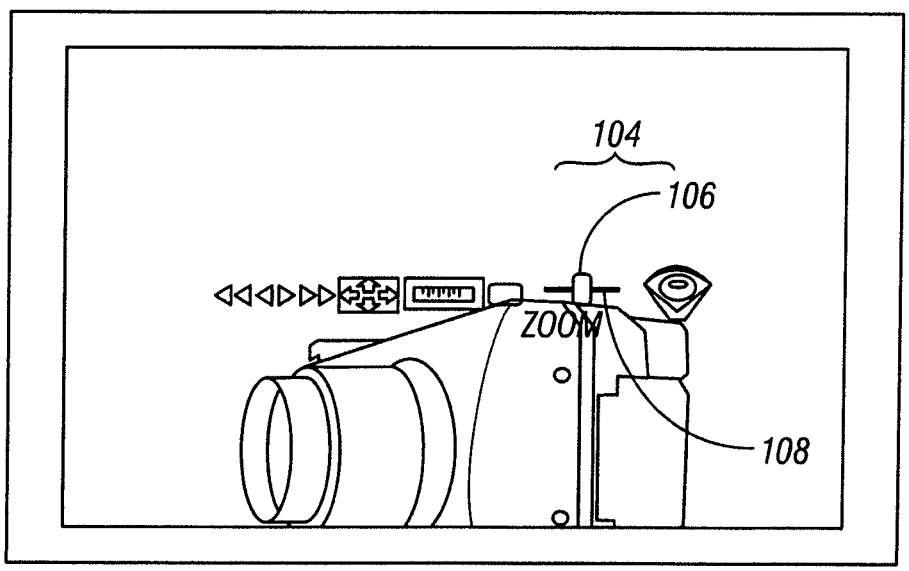
FIG. 11 is a perspective view of a display according to one embodiment of a system according to the invention after a zoom-in function has been performed.
Figure 12:
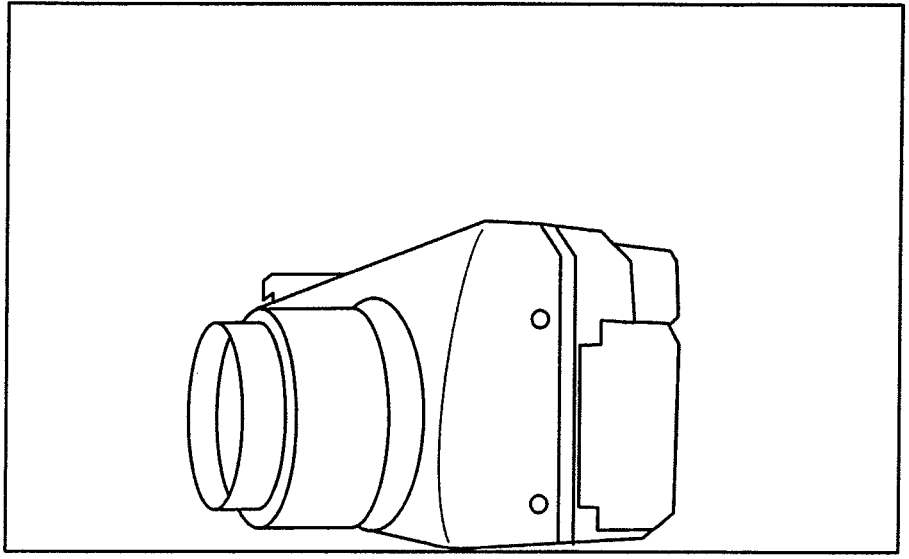
FIG. 12 is a perspective view of a display according to one embodiment of a system according to the invention before a reset function has been performed.

With reference to FIGS. 10-11, the system 10 enables and performs the zoom interactive function according to the following. A predefined zoom factor, z, for a given set of images is associated with the set of images 14 by the software 20. The zoom factor represents and corresponds in the software 20 to a limit on the degree to which a particular set of images 14 can be zoomed in on or, alternatively, a limit as to how big an object 16 or scene 17 in a set of images 14 can get. Generally, the particular value of the zoom factor, z, is selected so as to optimize the appearance of an object in a set of images 14 when it is zoomed in on, with regard to such factors as how smoothly the zoom function will appear to be carried out from the perspective of a user (if the image gets too large too quickly, the appearance of the zoom may not be smooth), and how to fix the maximum zoom-in to a level that will not excessively distort the images. The zoom factor, z, might be introduced at the time the set of images 14 is introduced to the system 10, or at some later point (e.g., if the set of images 14 is being managed by the webmaster of a third party provider's web site, the webmaster may be able to adjust the zoom factor, z, at any time.) Alternatively, the software 20 may contain a default value for the zoom factor, z, in the event no value for that parameter is otherwise specified by the user (or webmaster). In addition, the software 20 may contain an algorithm for calculating one or more zoom factors, z, for a given set of images 14, for example, using the default dimensions of an image in a currently viewable image layer 200 (e.g., the default width) and the intended dimensions of an image after a zoom operation has been performed (e.g., the zoomed-in-on width).

The zoom interactive function of the system 10 advantageously allows a high resolution image to be perceived by a user upon zooming in on the image. If the set of images 14 consists of only one image 12, for example, in the case where only interactive functions in two dimensions are to be enabled and only with respect to a single image of an object, the image 12 can be delivered rapidly to a user regardless of how high the image resolution is, because no delays will be incurred as might be incurred if the images were delivered using a language such as JAVA (which is typically associated with long delivery times) or additional software such as provided in a plug in.

In cases where the number of images 12 in a set of images 14 is greater than one, for example, when interactive functions are to be enabled in two dimensions for images taken at more than one angle of an object or virtual 3-D interactive functions such as rotation are to be enabled, the quality of the zoom interactive function is not at all compromised by the number of images 12 that compromise the set of images 14. The images 12 in the set of images 14 do not have to be assembled into a single large image file as a precondition to making the images available to the user. Rather, each image 12 in the set of images 14 is provided in its own image layer 200 by the software 20, the resolution of the images being delivered does not have to be sacrificed in order to keep the delivery time to a minimum. Therefore, and since the user perceives the image 12 provided in the predetermined or selected first image layer 200 at the instant of delivery, the user will perceive no delay in delivery time when multiple images, each with relatively high resolution, e.g., 1024×768 pixels, are being delivered. If the maximum available resolution is 1024×768 for any given one of the images 12 in a set of images 14, the original images made viewable to the user (i.e., the non-zoomed-in-on images), can be presented at a resolution of, for example, 320×240 pixels. When a zoom-in interactive function is commanded, and according to the zoom factor, z, the software 20 will reveal more of the available pixels to the viewer as the image is zoomed in on, up to a maximum of 1024×768 pixels in this example. Accordingly, the quality of an image 12 is not compromised at all when a zoom-in interactive function is carried out.

The zoom factor, z, typically is an arbitrary number, such as five. With reference to FIGS. 10-11, when a user causes the thumb 106 to move from the left to the right along the track 108, the number of pixels the thumb has moved is multiplied by the relevant zoom factor, z, and the image size might increase two-fold or four-fold, depending upon the significance to the software 20 of the relevant zoom factor, z. When a zoom operation is performed, the zoom interactive function of the system 10 according to the invention not only expands the entire currently viewable image layer 200, but also expands the viewable area within which the currently viewable image layer is displayed to the user. Thus, the user can continue to view the entirety of an object depicted in an image 12 as the currently viewable image layer 200 is enlarged.

In a preferred embodiment of the system 10 according to the invention, when the zoom interactive function is carried out, an associated algorithm adjusts the direction in which the size increase occurs, so as to give the user the illusion that when an object in an image is zoomed in on, it increases in size in all directions equally or proportionately. That is, without such an adjustment, when a zoom in operation is carried out with respect to an image, the image will appear to move down and to the right on the display as it increases in size (i.e., as the height of the image increases the image will increase in size downwardly, and as the width of the image increases the image will move increase in size to the right). With the adjustment of the system 10 according to the invention, as the height of the image increases in size downwardly, the image is immediately shifted back in the opposite direction by half of the increase in height and, similarly, as the width of the image increases in size to the right, the image is immediately shifted back in the opposite direction by half of the increase in width. In this manner, the image appears to increase in size equally in both the directions of height and width.

Reset Interactive Function

Figure 13:
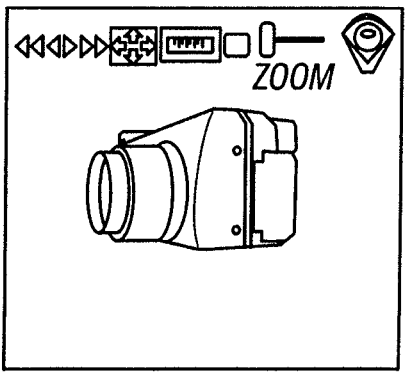
FIG. 13 is a perspective view of a display according to one embodiment of a system according to the invention after a reset function has been performed.

The reset interactive function is carried out entirely when the reset button 110 on the tool bar 100 is clicked on with a mouse or otherwise activated. The reset function causes all of the layers (the image layers 200, the tool bar layer 202, the transparent layers 204, 206 and any tool-bar-invoking layer) to be restored to their original positions, i.e., the positions that all of the layers were in at the time the set of images 14 was first delivered to the user (i.e., the default position). In the example shown in FIG. 12, the display is illustrated after a tool bar move function has been carried out, such that the tool bar layer 202 is located outside of the field of view of the first transparent layer 204 and the currently viewable image layer 200. With reference to FIG. 13, when the reset interactive function is enabled, and the user clicks anywhere on the object 16 in the currently viewable image layer 200, all of the layers are returned to the position the layers were in at the point of delivery of the set of images 14 to the user, e.g., the image layer 200$a$ will be the currently viewable image layer.

Measuring Interactive Function/Measuring Tool

Figure 14:
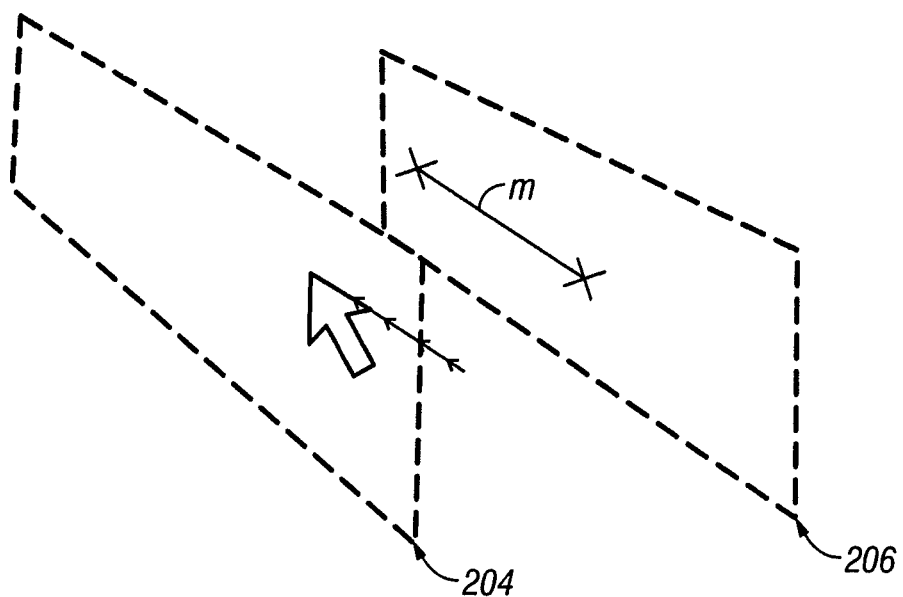
FIG. 14 is a schematic illustration of the relative movement of first and second transparent layers according to one embodiment of the invention, while a measuring function is being performed.
Figure 15:
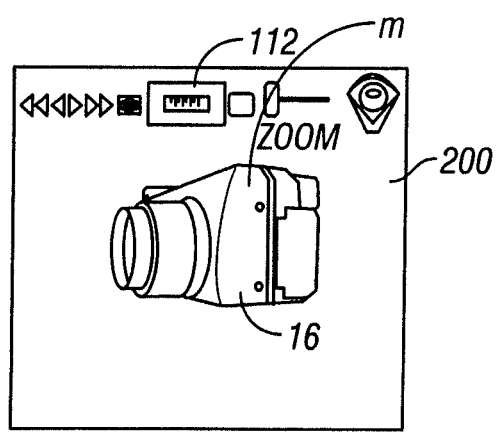
FIG. 15 is a perspective view of a display of a system according to the invention after a measuring function has been performed.

The measuring interactive function, wherein the second transparent layer 206 has special significance in a presently preferred embodiment of the system 10 according to the invention, will now be described with reference to FIGS. 14 and 15. The system 10 will be put into measuring mode when the user presses down on the mouse button and/or clicks on the button 112 on the tool bar 100 that corresponds to the measuring interactive function. When the user clicks and drags the mouse over one of the dimensions, e.g., height or width, of an object 16 or scene 17 depicted in the currently viewable image layer 200, the first transparent layer 204 will move over the second transparent layer 206, which remains fixed. (When the system 10 according to the invention is in measuring mode, only the first transparent layer 204 will be movable with respect to all of the other layers.) A line, m, will be drawn on the second transparent layer 206 which corresponds to the distance the first transparent layer 204 has moved relative to the second transparent layer 206, i.e., a line corresponding to the coordinates of the mouse position before and after the mouse is dragged, e.g., the starting point when the mouse began to be dragged, $x_1$, $y_1$, and the ending point when the dragging of the mouse is stopped, e.g., $x_2$, $y_2$. The actual physical value corresponding to the dimension the user measures with the measuring tool can be calculated based on the number of pixels comprising the line m and information about the actual physical dimensions of the object 16 that is known by the system 10. Information about the physical dimensions of the object 16 may be known by the system 10 by reason of the fact such information was input to the system 10 at some point prior to use of the measuring tool, e.g., at the time the set of images 14 was introduced to the system 10. Alternatively, information about the physical dimensions of the object 16 may be known by the system 10 by reason of the fact that information about the dimensions of the space surrounding the object 16 in the images 12 when the images 12 were captured is known to the system 10. For example, if the images 12 are acquired in an environment in which the physical dimensions of the environment along the x- and y-axes are known relative to the physical dimensions of the object or objects 16 when the images are first captured, information relating to the physical dimensions of the object or objects 16 can be extrapolated via an appropriate algorithm provided in the system 10.

Pan or Move Interactive Function

Figure 16:
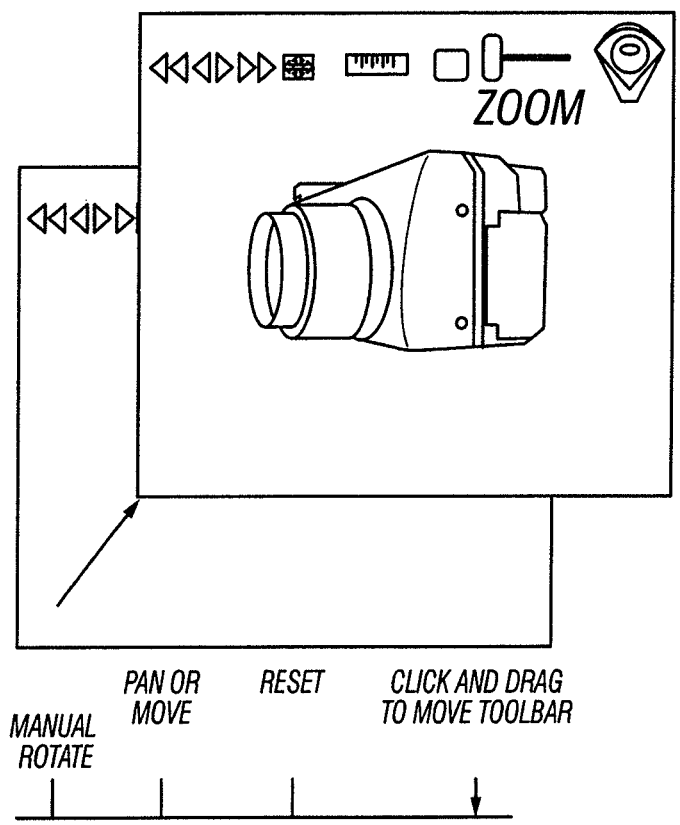
FIG. 16 is a perspective view of a display of a system according to the invention illustrating the display before and after a move function has been performed.

With regard to the "pan or move" interactive function, in a preferred embodiment this function is carried out, once enabled, according to the difference between a first position of a user's mouse (or similar device providing x and y coordinate information) and a second position of a user's mouse as the mouse is dragged from the first position to the second position. For example, in the coordinates of the mouse on the transparent layer 204 in a first position are $x_1$, $y_1$ and the user drags the mouse from the first position through a line to a second position $x_2$, $y_2$, then the transparent layer 204 together with all of the image layers 200 and, optionally, the tool bar layer 202, will move from the first position to the second position along the line defined by the distance from $x_1$, $y_1$ to $x_2$, $y_2$. For example, and with reference to FIG. 16, if the line corresponds to a diagonal line across the display, then the transparent layer 204 and the image layers 200 will move diagonally. Similarly, if the line corresponds to a horizontal line across the display, then the layers will move horizontally, if the line corresponds to a vertical line across the display, then the layers will move vertically, etc.

Autorotate and Manual Rotate Interactive Functions

With regard to the rotate functions, three options are currently contemplated in the system 10 according to the that which will now be described as follows:

A user can cause an object depicted in a set of images 14 to appear to rotate enabling one of two "autorotate" functions and/or a "manual rotate" function. With reference to the tool bar 100 shown in FIG. 7, a user may enable an autorotate function in one of two directions, i.e., right or left, by clicking on the appropriate button or icon 116, 120. In the autorotate mode, whichever image layers 200 in the set of images 14 that corresponds to a 360-degree view of an object in a particular plane, q, will be successively, and for a selected increment of time, be made the currently viewable layer. With reference to the example where the object 16 of interest is a camera, there might be sixteen images 12 taken at increments of 22.2 degrees in a particular plane, q, that comprise the set of images 14 for the camera. When the "rotate left" autorotate function is enabled by clicking on the appropriate tool bar button or icon 120, the currently viewable image layer, e.g., the first image layer 200*a*, will be hidden and the next sequential image layer, e.g., second image layer 200*b*, will be made the currently viewable image layer. The image layers are cycled through in this fashion, with each respective image layer 200*a*-200*p* being made visible to, and subsequently hidden from, the user, at a predetermined or selected increment of time. The image layers 200 will continue to be displayed to the user sequentially, with one of the image layers 200*a*-200*p* after another being made the currently viewable image layer and then hidden, until the user disengages the autorotate interactive function (e.g., by letting up on the mouse button over the autorotate button on the tool bar).

Of course, if one of the two autorotate interactive functions (i.e., "autorotate left" or "autorotate right") is engaged by clicking on the appropriate autorotate button 116, 120 on the tool bar 100 at a time when the currently viewable image layer is other than the first image layer 200*a*, e.g., when the currently viewable image layer happens to be image layer 200*h*, that currently viewable image layer 200*h* will be the starting point for the rotational effect. Similarly, if the user disengages the autorotate function (i.e., takes the system 10 out of the autorotate mode, when the currently viewable image layer is somewhere in the middle of the image layers 200 (e.g., on a middle image layer 200*g*) for the set of images 14, the currently viewable image layer 200 will remain as that middle image layer 200*g* when the autorotate function is disengaged.

If an autorotation in the opposite direction is desired by the user, then the image layers 200 might be cycled through in the opposite direction, e.g., from the first image layer 200*a*, to the last image layer 200*p*, to the next to last image layer 200*o*, etc.

In other preferred embodiments of the system 10 according to the present invention, a user may be able to command rotation of an object 16 depicted in a set of images 14 about 360 degrees in more than one plane, depending on the nature and type of the images 12 that have been acquired for the object 16. For example, if there is a sufficient number of images 12 in a set of images 14, the user could achieve the effect of rotating in a vertical direction (e.g., "rotate top" or "rotate bottom") in addition to the horizontal directions (i.e., "rotate left" or "rotate right").

The "manual rotate" is an alternative to the "autorotate" function for the user to perceive a virtual 3-D effect of an object. Rather than initiating the illusion of rotation by clicking on, or holding the mouse button down on top of, one of the "autorotate" icons on the tool bar, the "manual rotate" function is carried out by a user by first clicking on the "manual rotate" icon 118 on the tool bar 100, and then moving the mouse to a point somewhere in the currently viewable image layer 200. The user next presses down on the mouse button and drags the mouse in the direction the rotational effect is desired. If the rotational effect is only available about one axis or plane of the object, which is generally the case, then the user might drag the mouse to the right to initiate rotation in that direction, and to the left to initiate rotation of the object to the left. The degree of rotation, i.e., the number of image layers 200 in the set of image layers 200*a*-200*p* that sequentially will be made the currently viewable image layer and then hidden, will depend in part on how far the user drags the mouse across the image. The speed at which the relevant ones of the image layers 200*a*-200*p* are made currently viewable to, and then hidden from the user, will depend in part on how fast the user drags the mouse across the image. Thus, the user has a greater degree of control over how the rotation interactive function is executed by the system 10 than when an autorotate interactive function is performed. If there are enough images 12 that have been acquired in enough of the possible planes of rotation of the object 16, the manual rotate function could be used to provide a gyroscopic virtual 3-D effect with respect to the object, by causing the object 16 to appear to rotate in multiple planes of the object when the mouse is dragged on the currently viewable image layer 200 in different directions, where each direction corresponds to a different plane of rotation.

For 2-D images, the interactive functions desirably include one or more of the following interactive functions: (1) panning or moving an image layer from place to place on a display; (2) measuring one or more physical dimensions of an object depicted in the currently viewable image layer; (3) zooming into or zooming out on the currently viewable image layer; and (4) a resetting function which resets the tool bar layer, the transparent layer(s) and the image layers to the form in which the appeared at the time the set of images 14 was delivered to the user.

In an alternative embodiment according to the system 10 of the invention, only one image layer 200 might be created for a given set of images 14, whereby the currently viewable image layer 200, e.g., the predetermined or selected one of the images 12 made viewable upon delivery of the web page to the user, or whichever one of the images 12 is made viewable during the performance of an interactive function, is swapped in and out of a single image layer 200. In still other alternative embodiments according to the system 10 of the invention, the tool bar layer 202 and/or the transparent layers 204, 206 might be optional.

Still further embodiments of the system 10 according to the present invention will now be described with reference to FIGS. 17-40.

Multiple Interactive Images on One Webpage

In one presently preferred embodiment of the system 10 according to the invention, the software 20 is configured to allow a user to view and carry out interactive functions with respect to multiple sets of images 14 on a webpage that is downloaded onto a user's display in response to a user's request 60 for the webpage. Preferably, the user views and interacts with multiple sets of images 14 via common image layers 200 and, if appropriate or applicable, a common tool bar layer 202, common first and second transparent layers 204, 206, and other layers such as are described below.

The example in FIG. 17 illustrates a user's display after a user has requested and received a webpage using the system 10 according to the invention. In this example, the user has the ability to view and interact with four different sets of images 14, however, the maximum number of sets of images 14 that can be provided is limited only by the capacity of the webpage and perhaps by the physical parameters (e.g., the memory and processor capacity of the user's computer) of a user's display. One of the sets of images 14 is designated in the software 20 as a primary set of images 1010 such that, upon delivery of the webpage to the user, an image layer 200 is created for each of the images 12 comprising the primary set of images 1010, one of which image layers 200 will be provided to the viewer as the currently viewable image layer 200. In addition to the image layers 200, a tool bar layer 202, and either a first transparent layer 204 or a second transparent layer 206 or both, will be provided, depending upon the number and kind of interactive functions that are enabled for the multiple sets of images 14.

The sets of images 14 other than the primary set of images 1010, can be represented on the webpage by an identifying symbol 1012, which may be a representation of a photograph of the object(s) 16 or scene 17 or of a drawing or picture of the object 16 or scene 17. Alternatively, the symbol can comprise text or any graphic construct that simply serves to identify the area on the user's display that must be clicked on or otherwise targeted by the user in order to enable interactive function(s) with respect to the set of images 14 corresponding to the symbol 1012. In the case where the symbol is a photograph, the symbol can also constitute one of the images 12 in the set of images 14 that corresponds to or is associated with the symbol 1012.

In a presently preferred embodiment, where the system 10 according to the invention is implemented with software 20 written in DHTML, the partitioning on the user's display to accommodate the symbols 1012 is also accomplished using the layering feature of the DHTML programming language. However, in the case of the symbols 1012, the layers are provided side by side on the user's display, i.e., in the x/y plane or along the x- and y-axes of the user's display, as opposed to one behind another, i.e., in the z-plane or along the z-axis of the user's display, as typically is used in the implementation of other interactive functions.

In addition to being associated with a set of images 14, each symbol 1012 can be associated with parameters that will be useful or necessary in carrying out one or more of the available interactive functions with respect to that set of images 14, such as a zoom factor, z, and variables the definition of which correspond to the physical dimensions of the object 16 depicted in the set of images 14. In the example where there are four symbols 1012 provided to a user on the user's display, four different sets of parameters can be provided for those four symbols 1012.

Whichever interactive functions are enabled in the software 20 for the primary set of images 1010 will be available to the user upon delivery of the webpage. If the user would rather carry out one or more interactive functions with a set of images 14 other than the primary set of images 1010, i.e., a set of images 14 that is associated with one of the symbols 1012, the user need only click on or otherwise identify to the system 10 the coordinates on the user's display that correspond to the selected symbol 1012 with which interactivity is desired. When the user takes this action, the system 10 causes the primary set of images 1010 to be swapped out of the image layers 200, in favor of the set of images 14 that are associated with the selected symbol 1012. The tool bar 100 in the tool bar layer 202 associated with the primary set of images 1010 may or may not be reconfigured for the set of images 14 associated with the selected symbol 1012, depending on whether the number and kind of interactive functions that are available with respect to the primary set of images 1010 and the set of images 14 corresponding to the selected symbol 1012 are the same or different. After the image layers 200 are swapped out, a symbol 1012 associated with the primary set of images 1010 is provided on the display to indicate that the primary set of images 1010, while not currently selected by the user, is still available for interactive functions.

Alternatively, all of the sets of images 14 available for viewing and interactivity via a given webpage can be represented by identifying symbols 1012 at the time of delivery of the webpage, such that there is no primary set of images 1010, and the user can simply choose whichever one of the set of images 14 associated with the symbols 1012 that he or she wishes to view and interact with first. The image layers 200 (e.g., image layers 200a-200p where a set of images 14 has sixteen images) are then created, together with the tool bar layer 202 and the first and second transparent layers 204, 206, and one of the images in the set of images 14 is displayed to the user in the currently viewable image layer 200.

This preferred embodiment of the system 10 according to the invention provides a user with the capacity to carry out a variety of interactive functions with respect to multiple sets of images much more easily and rapidly than would be the case if the software (e.g., HTML or XML code) for enabling the interactivity were separately and distinctly associated with each set of images. If this embodiment of the system 10 is used to display items to a user in an on-line shopping or "e-tailing" application, users can transport themselves quickly and seamlessly from one offered item to another offered item, and be able to almost instantly carry out whatever interactive functions are enabled for each item.

In a preferred embodiment, the multiple interactive images can also be provided with or interspersed among text on the webpage.

The afore-described embodiment of the system can also be used in a gallery page on a website containing multiple images giving the user of the website to interact very quickly with any image on that webpage using any of the interactive functions such as the focus zoom interactive function or measuring interactive function without ever leaving the webpage. The tool bar layer in this application can move from symbol to symbol or remain at a specific location on the webpage or can be placed anywhere and moved anywhere at any time.

Width-Adjust, Focus Zoom, and Supplemental Information Interactive Functions In a still further aspect of the invention, interactive functions are enabled and carried out according to the software 20 of the system 10 that are implemented, in part, by repositioning images during an interactive function so that at the end of an interactive function, the currently viewable image layer 200 is oriented in a predefined or predetermined way with respect to the x- and y-axes of the user's display. An interactive function involving similar repositioning was described above with respect to the standard zoom interactive function, namely, where the position along the x- and y-axes of a zoomed-in-on image is adjusted after the zoom operation so that the zoomed-in-on image appears to increase in size in all directions equally or proportionately. With reference to these interactive functions that involve repositioning, the following preliminary descriptions and definitions will be useful.

"Actual Images," "Default Images," "Pre-Zoom Images," and "Zoomed-in-on Images"

At the point in time when the images in a set of images are delivered via a webpage to a user in response to a user's request, each image 12 can be characterized by two conditions or states. One of these states is the image's actual state, also referred to as the "actual image" 1050, and a default state, also referred to as the "default image" 1060.

Figure 18:
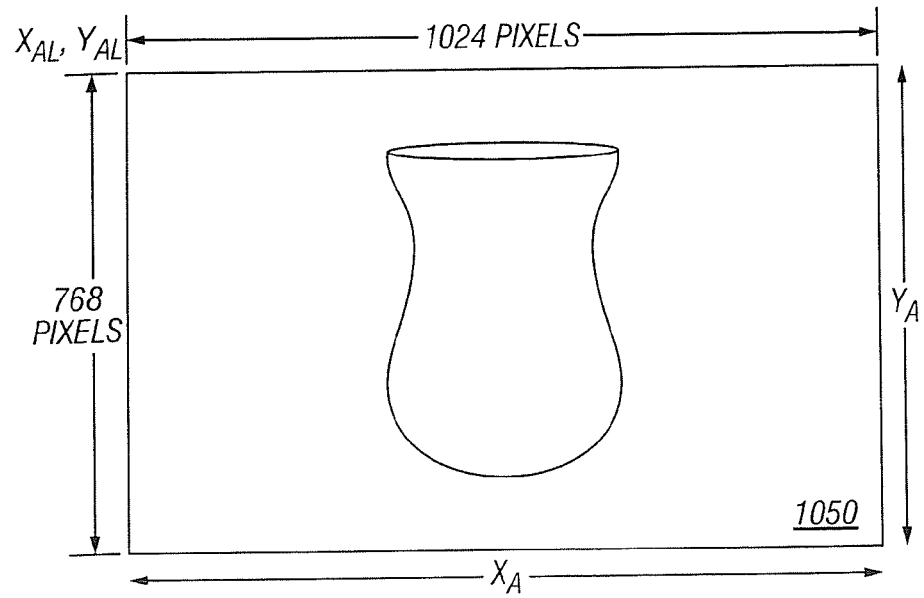
FIG. 18 is a schematic illustration of an actual image according to the invention.

The term "actual image" is used herein to refer to the dimensions along the x- and y-axis of the maximum resolution of any given image 12 in a set of images 14. For example, and with reference to FIG. 18, given set of images 14 may comprise sixteen images 12. The size of each of the images 12 might be 1024×768 pixels. When any one of these images 12 is configured by the software 20 to be displayed to the user, before, after or during performance of an interactive function, the image might be displayed with various resolutions that reflected sized other than 1024×768 pixels, e.g., an image 12 for which a zoom interactive function is enabled will be initially displayed at a resolution less than that which is theoretically possible or available by reason of carrying out the zoom. Since there is an actual image 1050 for every image 12 in a set of images 14, and the size of that image is known to the system 10, the width of the actual image and the height of the actual image can always be used by the system 10 as points of reference, e.g., in repositioning an image relative to particular locations along the x- and y-axes. The width and height of the actual image 1050 can be referred to as $x_A$ and $y_A$, respectively. The coordinates of the upper left-hand corner of the actual image 1050 may be referred to as $x_{AL}$ and $y_{AL}$, respectively. As will be appreciated by one with skill in the art, the units of measurement of a digitally-rendered image are commonly expressed in pixels.

Figure 19:
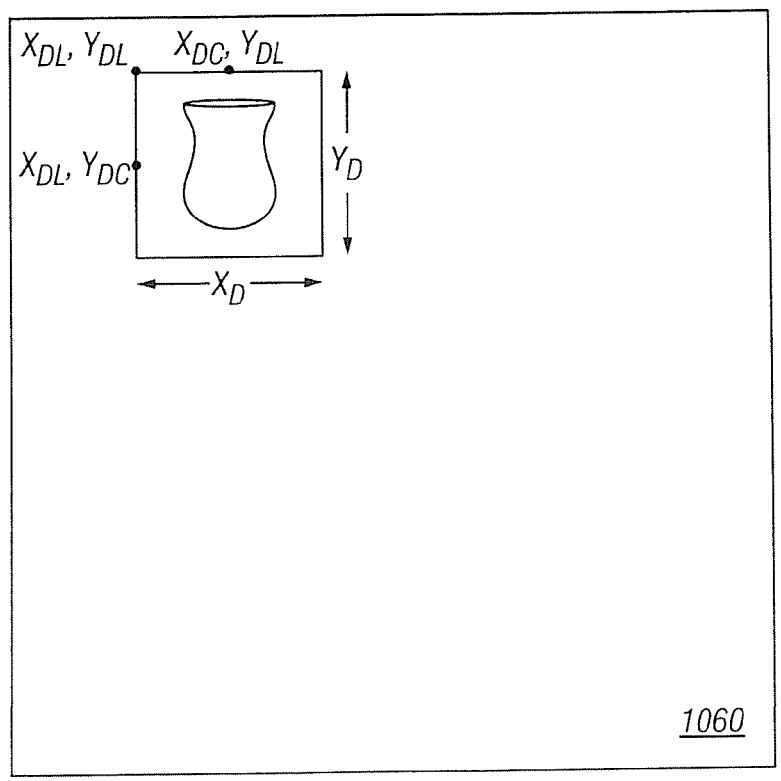
FIG. 19 is a schematic illustration of a default image according to the invention.

The default image 1060 has a height and a width relative to the x- and y-axes that are predefined or predetermined in the software 20 associated with each image. In a given application, the default image 1060 may be positioned in the upper left-hand corner of a user's display upon delivery of a webpage to a user, as is illustrated in FIG. 19, or may be otherwise oriented along the x- and y-axis according to any desired set of predefined x- and y-coordinates. The width of the default image along the x-axis may be referred to as $x_D$, the height of the default image along the y-axis as $y_D$, the position of the upper left-hand corner of the default image as $x_{DL}$, $y_{DL}$, and the mid-point or center points of the default image along the x- and y-axes can be referred to, respectively, as $x_{DC}$ and $y_{DC}$.

Figure 20:
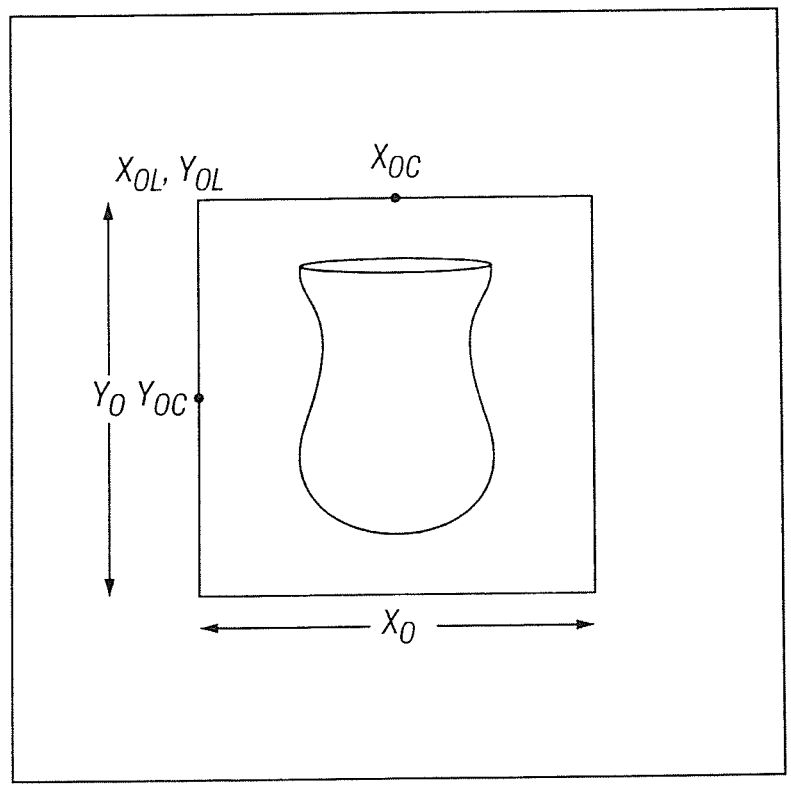
FIG. 20 is a schematic illustration of an original or pre-zoom image according to the invention.

Referring now to FIG. 20, the state of an image before a zoom operation is carried out is, for the sake of convenience, is referred to herein as the original or pre-zoom image 1070, even though it will be appreciated by one with skill in the art that in accordance with the invention, more than one zoom interactive function may have previously been carried out with respect to a currently viewable image layer 200, such that the original or pre-zoom image 1070 might well already have been zoomed in on one or more times. The width of the original or pre-zoom image along the x-axis may be referred to as $x_O$, and the height of the original or pre-zoom image along the y-axis can be referred to as $y_O$, the position of the upper left-hand corner of the original or pre-zoom image can be referred to as $x_{OL}$, $y_{OL}$, and the mid-point or center points of the original or pre-zoom image along the x- and y-axes can be referred to, respectively, as $x_{OC}$ and $y_{OC}$.

Figure 21:
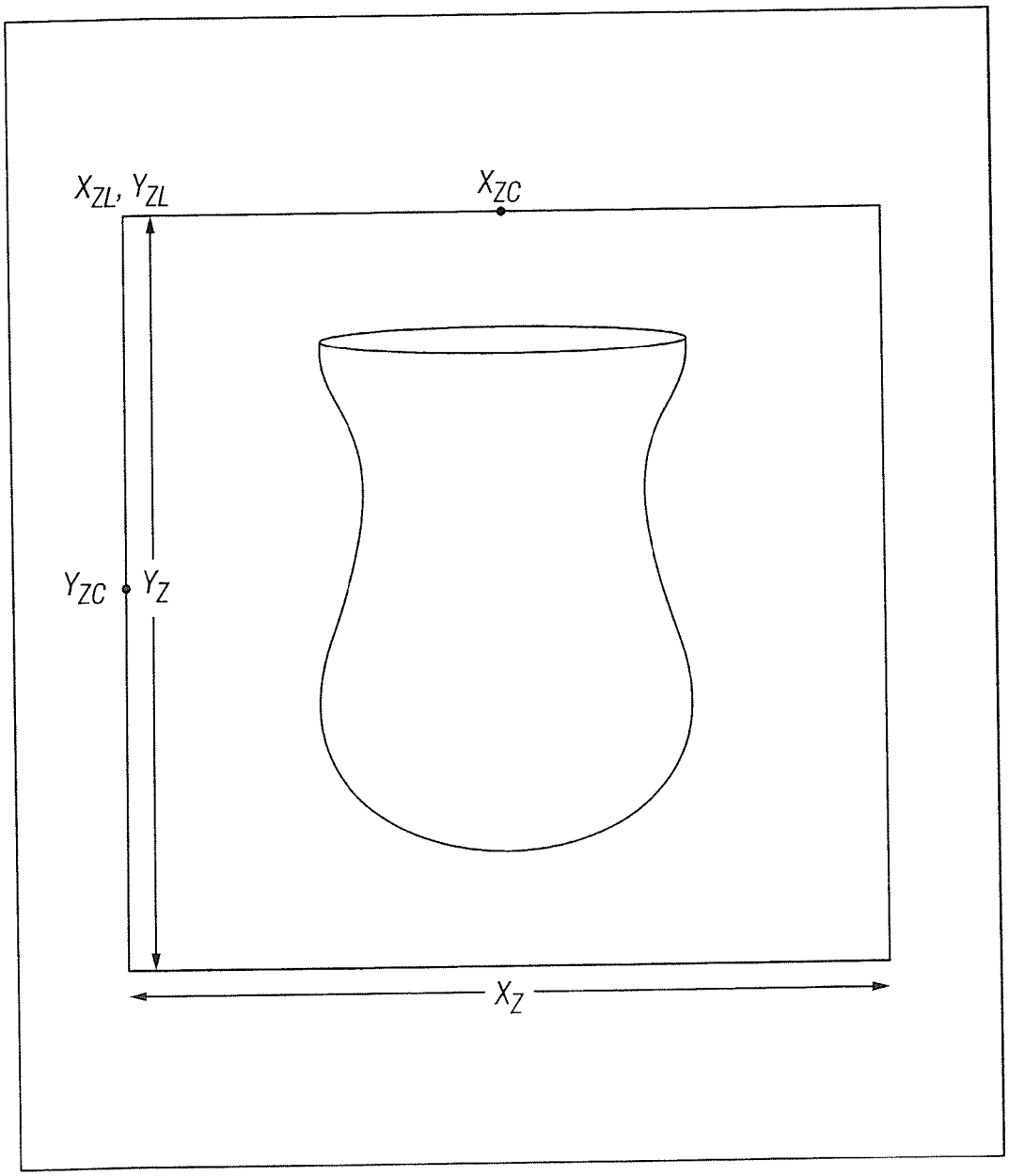
FIG. 21 is a schematic illustration of a zoomed-in-on image according to the invention.

After a zoom operation is carried out, and with reference to FIG. 21, the width of the zoomed-in-on image 1080 along the x-axis may be referred to as $x_Z$, the height of an image along the y-axis may be referred to as $y_Z$, and the upper left-hand corner of the zoomed-in-on image may be referred to as $x_{ZL}$, $y_{ZL}$, and the mid-points or center points of the zoomed-in-on image along the x- and y-axes may be referred to as $x_{ZC}$ and $y_{ZC}$.

With the foregoing definitions and points of reference in mind, the width-adjust zoom interactive function, the focus zoom interactive function, and the supplemental information or "hot spot" interactive function will now be described with reference to the Figures.

Image Dimensions and Image Layer Dimensions

Each image 12 in a set of images 14 typically comprises a digitized photograph or other digitized representation of an object 16, objects 16 or a scene 17. The image 12 typically has a height, measurable along the x-axis, and a width measurable along the y-axis.

If, as in the preferred embodiments of the system 10 according to the invention, the various interactive functions for sets of images 14 are enabled and carried out via layer constructs, such as via the layers available in DHTML, the dimensions of an image layer created to hold and/or make an image currently viewable to a user generally correspond to or are coextensive with the dimensions of the image by virtue of the code used to create the layers.

One way of accomplishing in DHTML is to use the style option known as "zoom," or by setting the width of the image to be one hundred percent of the layer's width and/or height. For example, with the style option in HTML, if the actual width $x_A$ or height $y_A$ is known of the image, and the width $x_O$ of the layer is known, then the style zoom of the image can be set to $x_O$ divided by $x_A$, or can be set to $y_O$ divided by $y_A$, and that will give the proportion of the actual image size to which the image should be zoomed to in order to match the width of the layer. Thus, the proportion of the width to height of the layer will always match the proportion of the width to the height in the actual image, unless the height and width of the default layer are not proportional.

An advantage of using the style zoom in HTML for sizing images is that it can be used in conjunction with the filter style such as the alpha filter, and that allows for more than the typical 256 palette of colors to be displayed on a webpage, which allows colored images to be displayed more accurately with the transitions between edges in an image being much smoother and not having jagged edges, this process is known as anti-aliasing.

Figure 22:
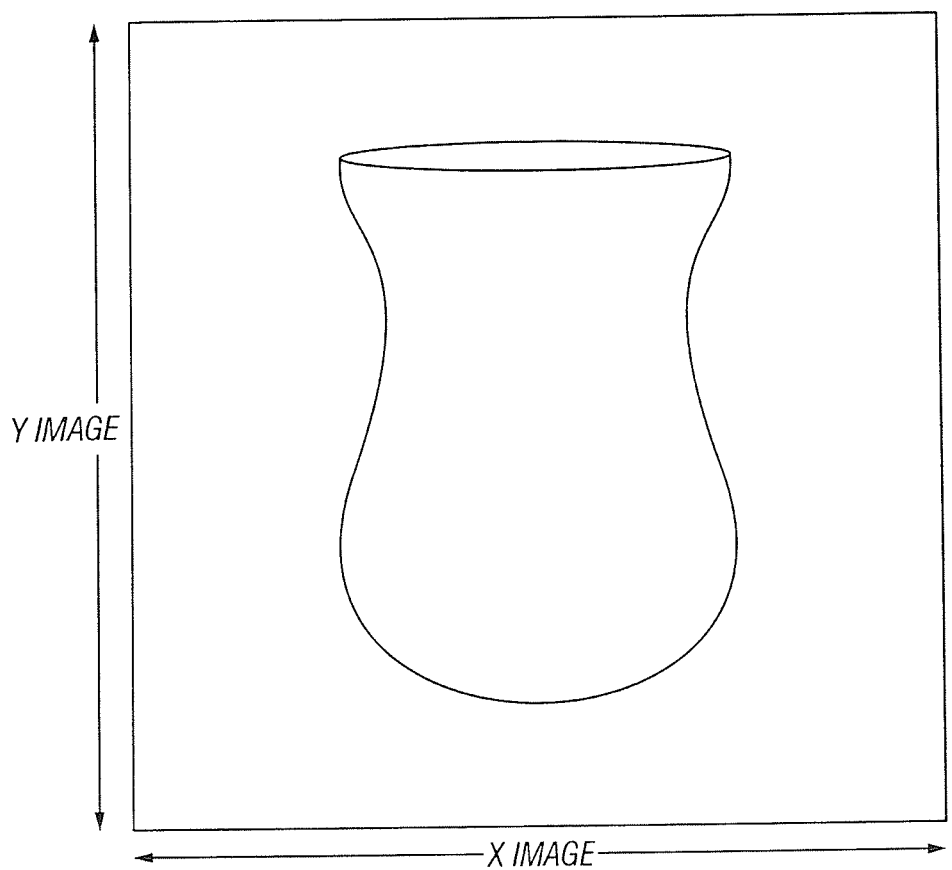
FIG. 22 is a schematic illustration of the height and width of an image in an image layer according to the invention.
Figure 23:
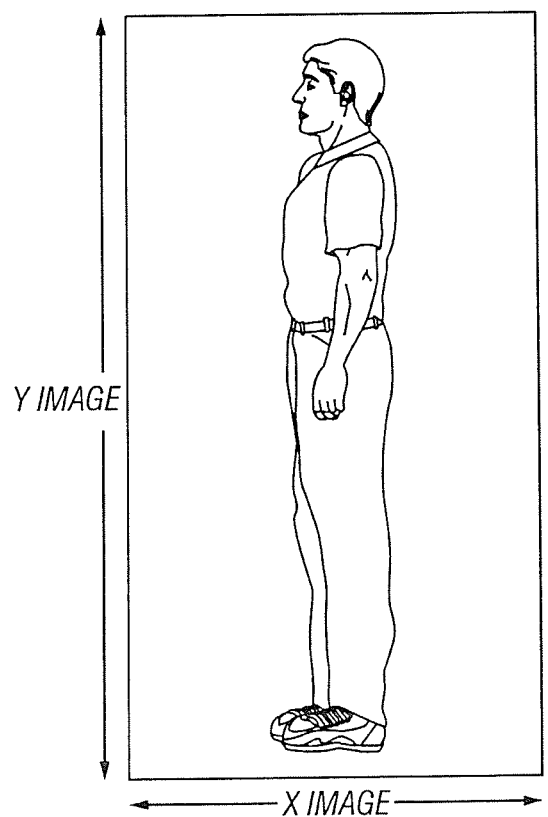
FIG. 23 is a schematic illustration of an image having a height greater than its width.
Figure 24:
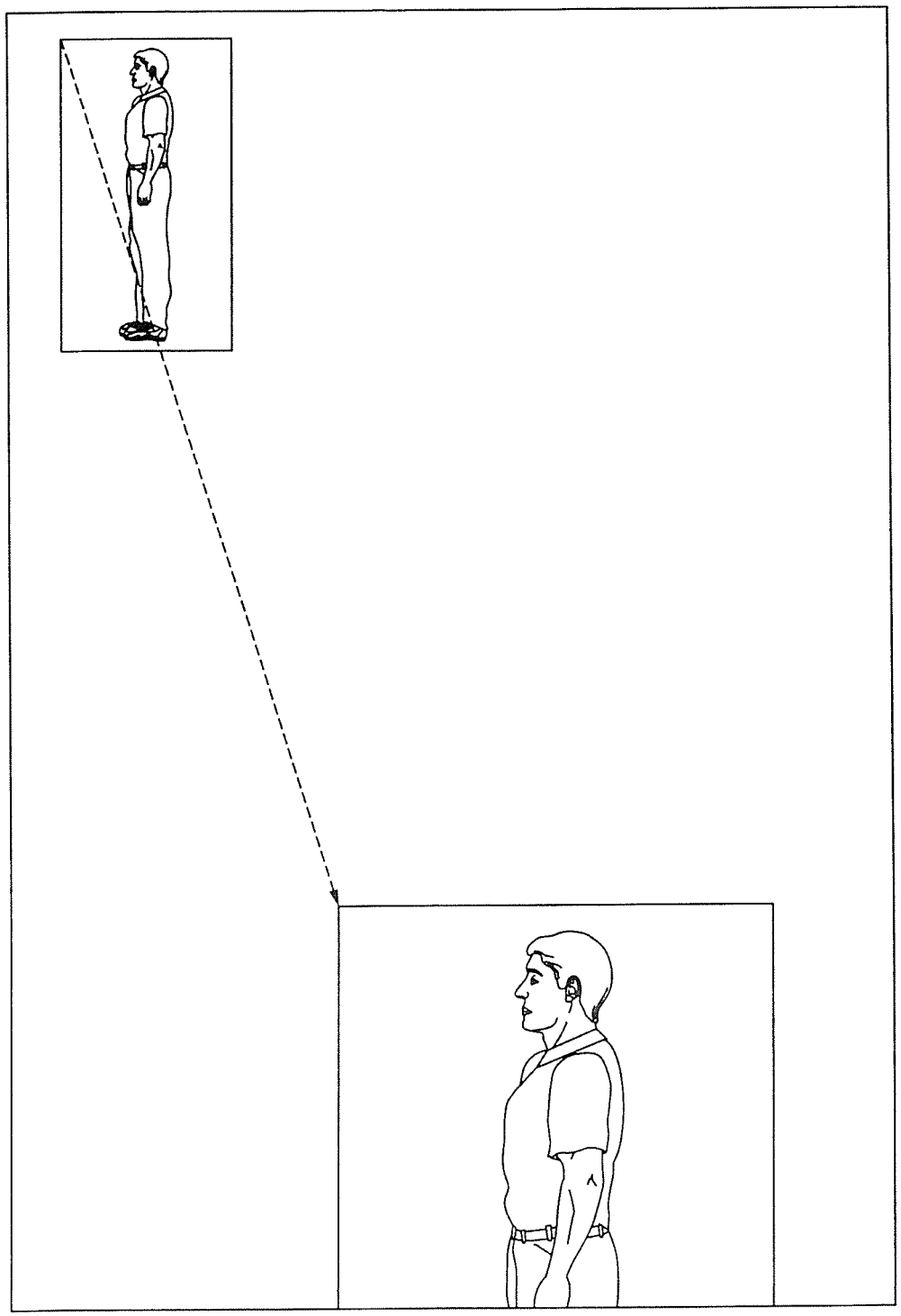
FIG. 24 is a perspective view of a display of a system in which the position of a zoomed-in on image shifts off the display when the height of the image is greater than the width.
Figure 25:
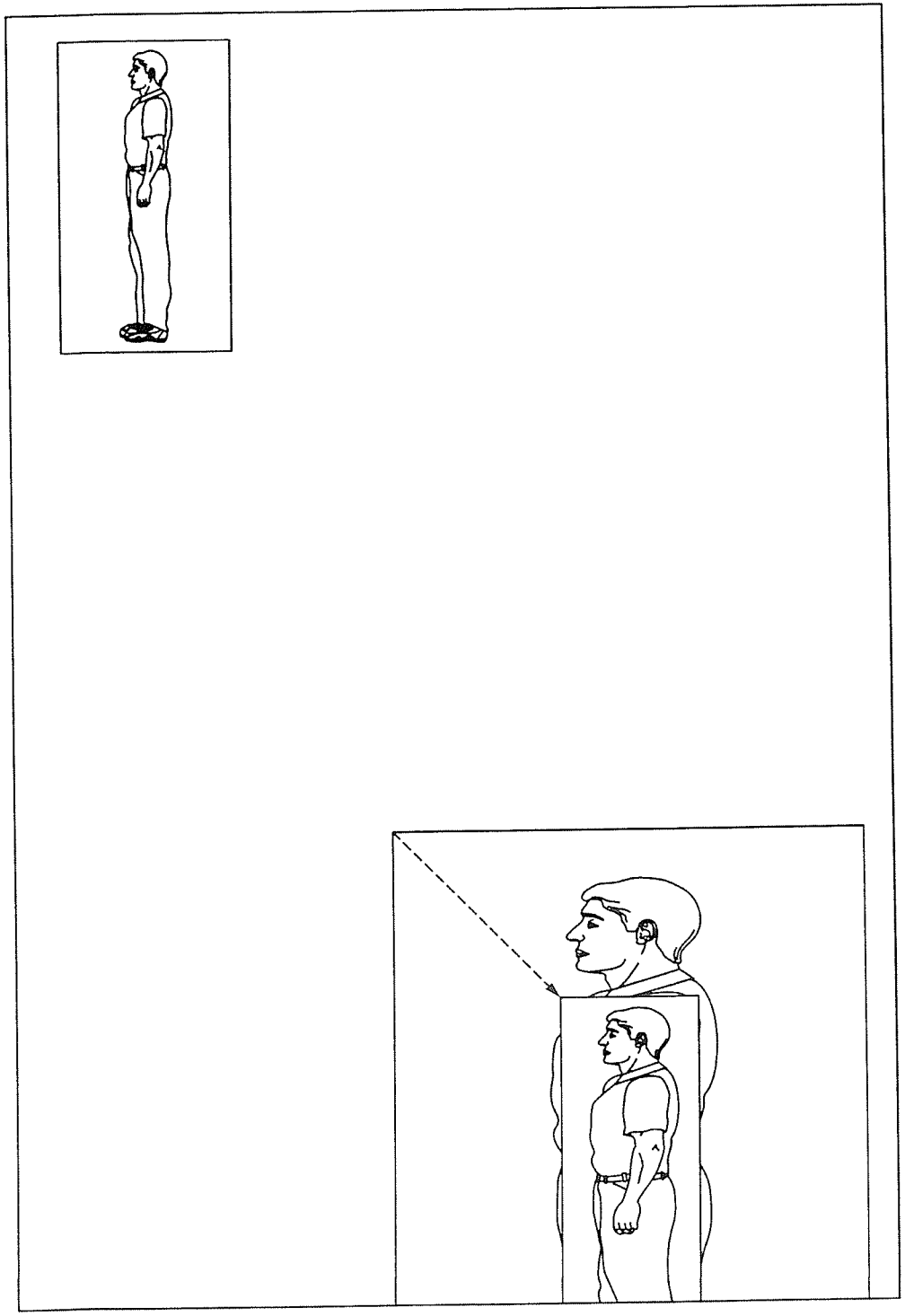

Hence, and with reference to FIG. 22, the height of the image, $y_{image}$, generally will be equal to the height of the image layer in which the image is held or provided. Similarly, the width of the image, $x_{image}$, and the width of the image layer will be equivalent. Since the height of an image and the height of the image layer in which it is displayed and the width of an image and the width of the image layer in which it is displayed are generally the same, the terms "image" and "image layer" may be used interchangeably herein with respect to the positions of either an image or image layer along the x- and y-axes of a user's display.

Width-Adjust Interactive Function

With reference to FIGS. 23-28, one of the interactive functions that employs repositioning is referred to as the width-adjust zoom interactive function. This interactive function is provided to keep a zoomed-out-of image or a zoomed-in-on image proportionately within the user's field of view whenever the height of the object 16 in a set of images 14 is greater than the width of the object 16. In the system 10 according to the invention, the width of an image layer 200 when measured along the x-axis and the height of an image layer 200 when measured along the y-axis substantially correspond to the width and height of whichever object(s) 16 or scene 17 that is being depicted in the set of images 14. When, for example, the object 16 is a person wearing a particular item of clothing, the height of the object, and hence, the height of the image layer 200 will be greater than the width of the object and the width of the image layer 200. Normally, and with reference to FIGS. 24 and 25, when an zoomed-in-on image having a height greater than its width is zoomed back out of, for example, to return the image to its default state, the zoomed-back-out-of image may move out of the user's field of view entirely, or partially, e.g., cutting off a person's head or feet, even though there is additional space on the viewable area on the user's display in which to display the zoomed-in on image.

In the system 10 according to the present invention, the position of the currently viewable image layer 200 containing the image 12 in a set of images 14 that is zoomed in on is adjusted so that the object(s) 16 or scene 17 depicted in the image is not cut off from the user's field of view when a zoom-out or a zoom-in operation is carried out.

Figure 26:
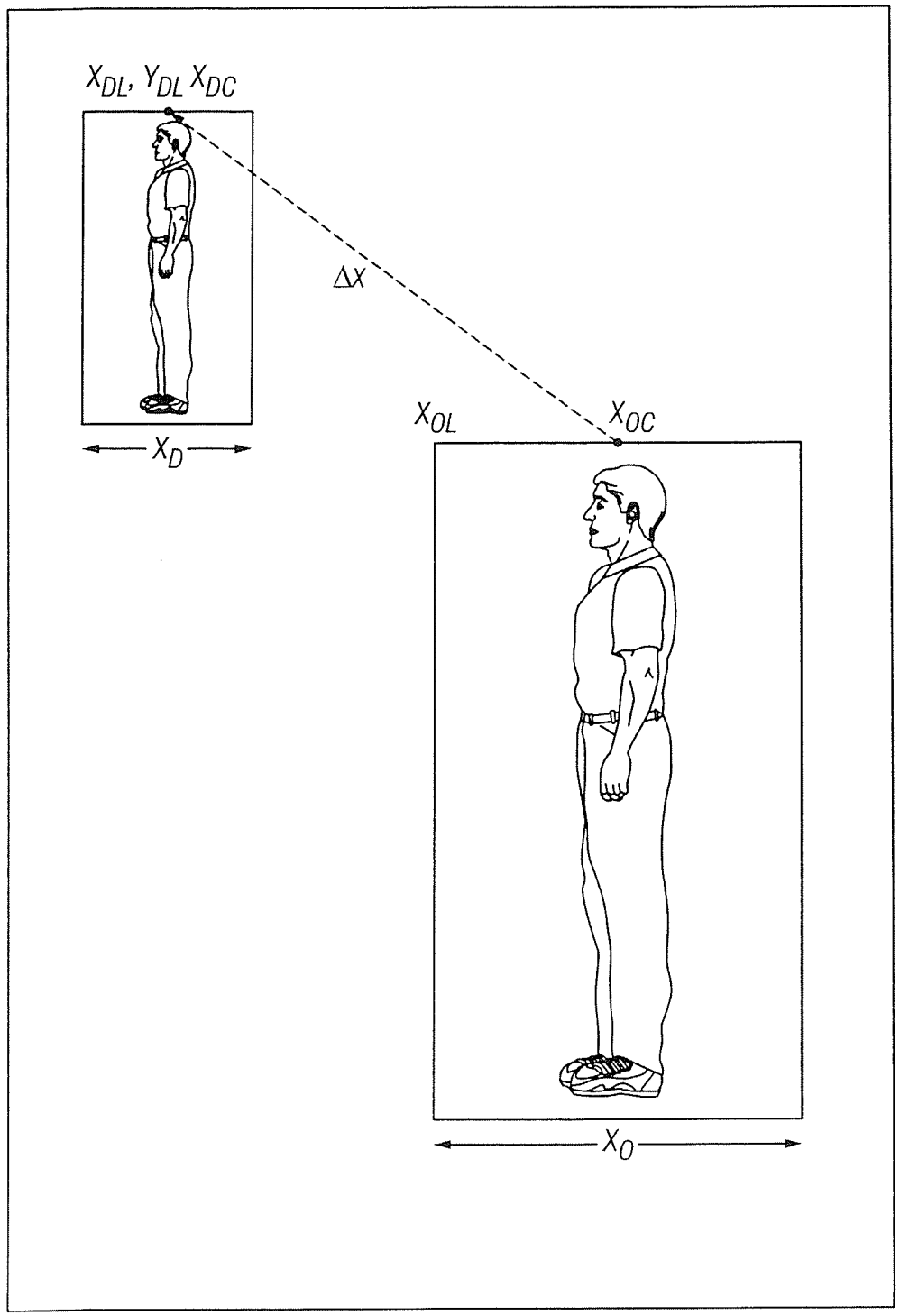
FIG. 26 is a perspective view of a display of the system according to one embodiment of the invention wherein an original or pre-zoom image is moved to a position that coincides with the center point of the default image.
Figure 27:
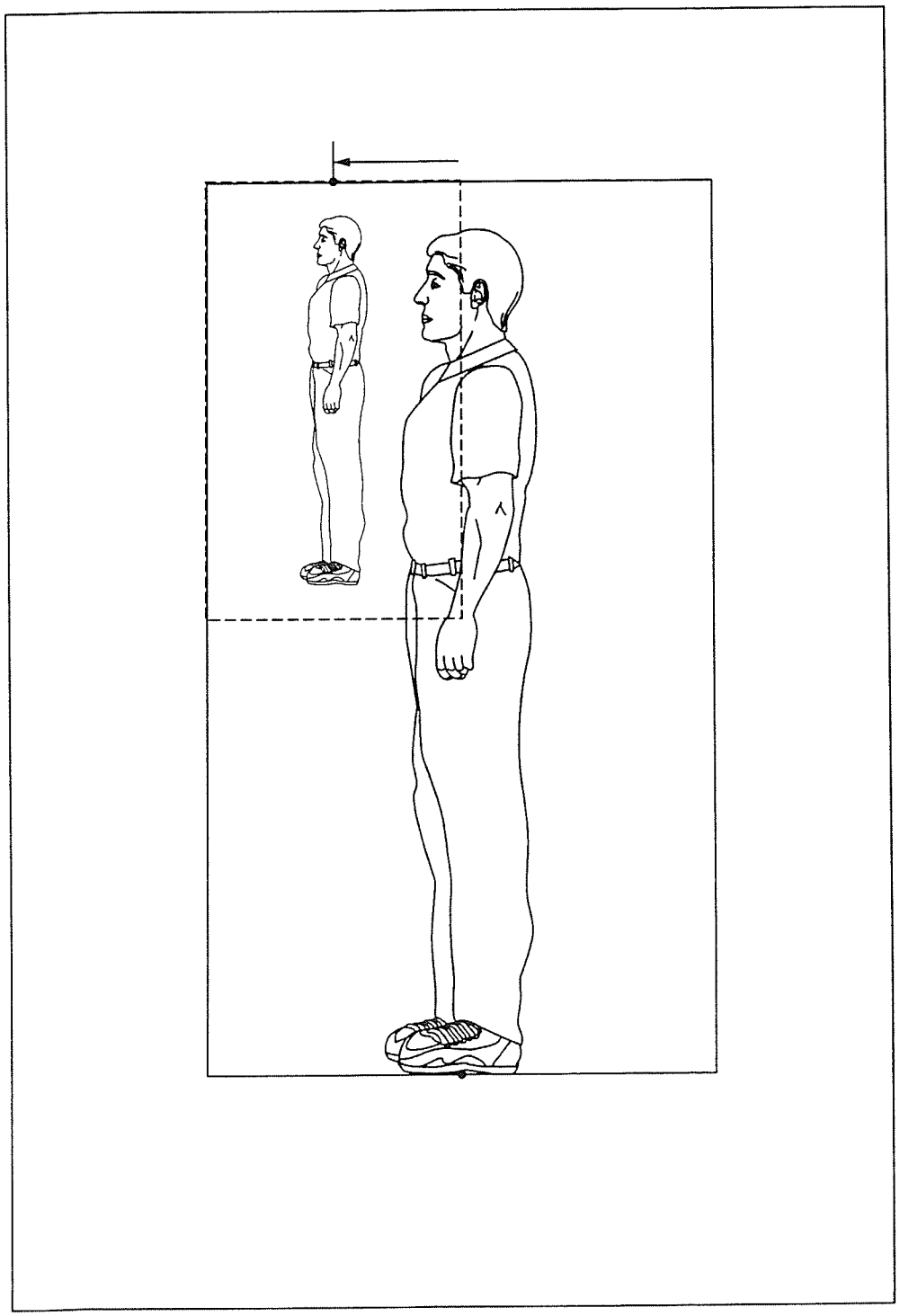
FIG. 27 is a perspective view of a display of the system of FIG. 26 wherein an original or pre-zoom image is enlarged according to the zoom factor, z.
Figure 28:
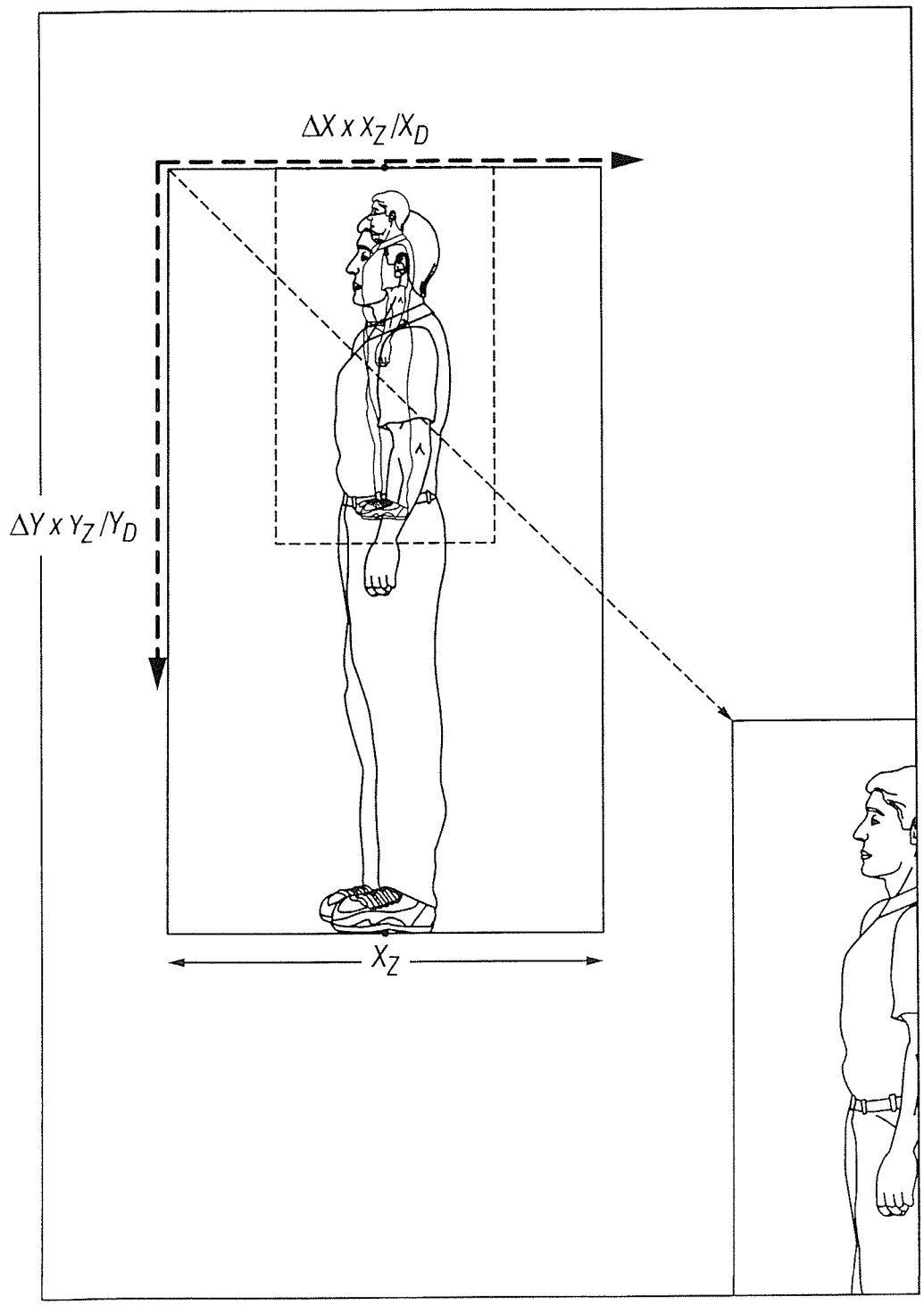
FIG. 28 is a perspective view of a display of the system of FIG. 26 wherein the center point of the zoomed-in-on image is repositioned along the x- and y-axes to keep the image within the user's display.

One method of repositioning a zoomed-in-on image 1080, for example, during a zoom-out operation, will now be described with reference to FIGS. 26-28 and the variables described below. The upper left-hand corner of the default image has a known position along the x-axis relative to the user's display, i.e., $x_{DL}$, as does the mid-point or center point of the default image, i.e., $x_{DC}$. When a zoom interactive function is carried out, and as is described hereinabove, the image in the pre-zoom image layer is enlarged and more of the available pixels are displayed to the user in amount determined by the zoom factor, z, and the number of pixels corresponding to the distance the thumb 106 has been moved along the track 108 on the zoom tool bar button 104 from the zero position. Accordingly, the width of the zoomed-in-on image along the x-axis, $x_Z$, is known; as is the position of the upper left-hand corner of the zoomed-in-on image along the x-axis, which might be called $x_{ZL}$, and the position of the mid-point or center point of the zoomed-in-on image along the x-axis, which might be called $x_{ZC}$.

Given those known coordinates, the image is positioned as follows. With reference to FIG. 26, the center point of the pre-zoom image, $x_{OC}$, is moved along the x-axis by an amount, $\Delta x$, to a position that coincides with the center point of the default image layer, $x_{DC}(\Delta x = x_{DL} - x_{OL} + (x_D/2 - x_L/2))$. Then, and with reference to FIG. 27, the image is enlarged according to the zoom factor, z, and the position of the thumb 106 along the track 108. Next, and with reference to FIG. 28, the center point of the zoomed-in-on image, $x_{ZC}$, is repositioned along the x-axis by an amount equal to half the difference in width between the zoomed-in-on image and the pre-zoom image. Finally, the zoomed-in-on image is further adjusted by moving the center point of the zoomed-in-on image, $x_{ZC}$, along the x-axis by an amount equal to the amount $\Delta x$, that the pre-zoom image was moved multiplied by the ratio of the width of the zoomed-in-on image to the width of the default image ($\Delta x \times x_Z/x_D$).

The same process occurs on the y-axis. First, the center point of the pre-zoom image along the x-axis, $y_{OC}$, is moved along the x-axis by an amount, $\Delta y$, to a position that coincides with the center point of the default image layer along the y-axis, $y_{DC}((\Delta y = y_{OL} - y_{DL} + (y_{OL}/2 - y_D/2))$.

Then, the image is enlarged according to the zoom factor, z, and the position of the thumb 106 along the track 108. Next, the center point of the zoomed-in-on image, $y_{ZC}$, is repositioned along the x-axis by an amount equal to half the difference in height between the zoomed-in-on image and the pre-zoom image. Finally, the zoomed-in-on image is further adjusted by moving the center point of the zoomed-in-on image, $y_{ZC}$, along the y-axis by an amount equal to the amount $\Delta y$, that the pre-zoom image was moved multiplied by the ratio of the height of the zoomed-in-on image to the height of the default image ($\Delta y \times y_Z/y_D$).

Focus Zoom Interactive Function

In still a further embodiment of the system 10 according to the invention, a different, enhanced zoom interactive feature is available with respect to certain sets of images 14 that allows a user to choose a specific area 1100 on a particular image that will become the focus of the zoom. The focus zoom interactive function allows a user to define an area on a currently viewable image layer that he or she wants to enlarge, and to perceive the enlarged image at a particular location relative to the user's display, for example, at a location corresponding to center of the area defined by the user on the pre-zoom image, at a location corresponding to the center of the viewable area of the user's display, or any other location. In a preferred embodiment, the focus zoom interactive function is implemented by the user drawing a line across the area on the image the user wants to focus in on, the system drawing a polygon (e.g., a rectangle) corresponding to the beginning and ending points of the user-drawn line, enlarging the image, and repositioning the image so that the point corresponding to the center of the polygon on the enlarged image ends up at the desired location relative to the user's display (e.g., at the center of the line drawn by the user). As will be appreciated by one skilled in the art, the focus zoom interactive function may be implemented in a variety of different ways. One method is described below.

Figure 29:
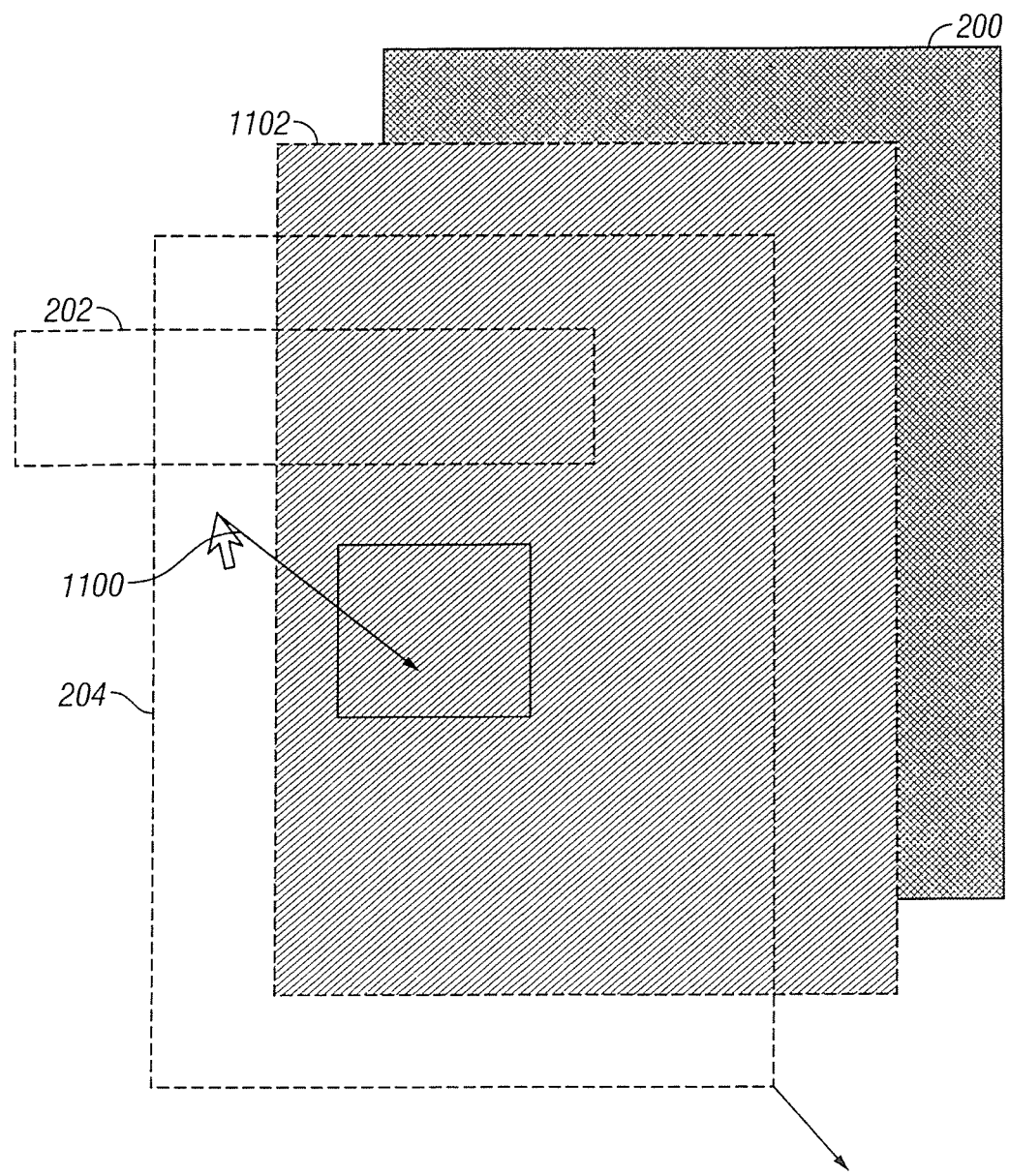
FIG. 29 is a schematic view of the layers used in implementing the focus zoom interactive function according to one embodiment of the system of the invention.

In a presently preferred embodiment of the invention, and with reference to FIG. 29, the focus zoom interactive function is implemented with an image layer 200, a tool bar layer 202, a first transparent layer 204, and, optionally, a third transparent layer 1102 that is similar in purpose and function to the second transparent layer 206 described above in connection with the measuring interactive function. Indeed, in the case where both the measuring interactive function and the focus zoom interactive function are both available to a user with respect to a particular set of images 14, the third transparent layer 1102 and the measuring interactive function second transparent layer 206 are one in the same.

Generally, the focus zoom interactive function is implemented as follows: (1) the user defines an area on the currently viewable image layer 200 using the mouse crosshairs as to which a focus zoom operation is desired to be carried out; (2) the software 20 causes a polygon to be drawn around the area selected by the user where the polygon is calculated based upon the distance and coordinates corresponding to the user's degree of drag; (3) the image in the currently viewable image layer, which we are referring to for the purposes of this description as the original or pre-zoom image, is repositioned so that the upper left-hand corner of the original or pre-zoom image overlies the coordinates corresponding to the upper left-hand corner of the default image; (4) the original or pre-zoom image is zoomed in on according to a focus zoom factor, $z_F$, which can be calculated based on either the x-coordinates of the user-defined polygon and the width of the original or pre-zoom image or the y-coordinates of the user-defined polygon and the height of the original or pre-zoom image; (5) optionally, the zoomed-in-on image is further repositioned to any desired x- and y-coordinates, e.g., so that the point corresponding to the center of the polygon on the zoomed-in image coincides with the center of the default image, so that the point corresponding to the center of the polygon on the zoomed-in-on image coincides with the center of the viewable area of the user's display, or so that the point corresponding to the center of the polygon on the zoomed-in-image is positioned at any other desired location relative to the user's display; and (6) a polygon is drawn around the point corresponding to the center of the polygon on the zoomed-in-on image that proportionately corresponds to the dimensions of the user-defined polygon.

Figure 30A:
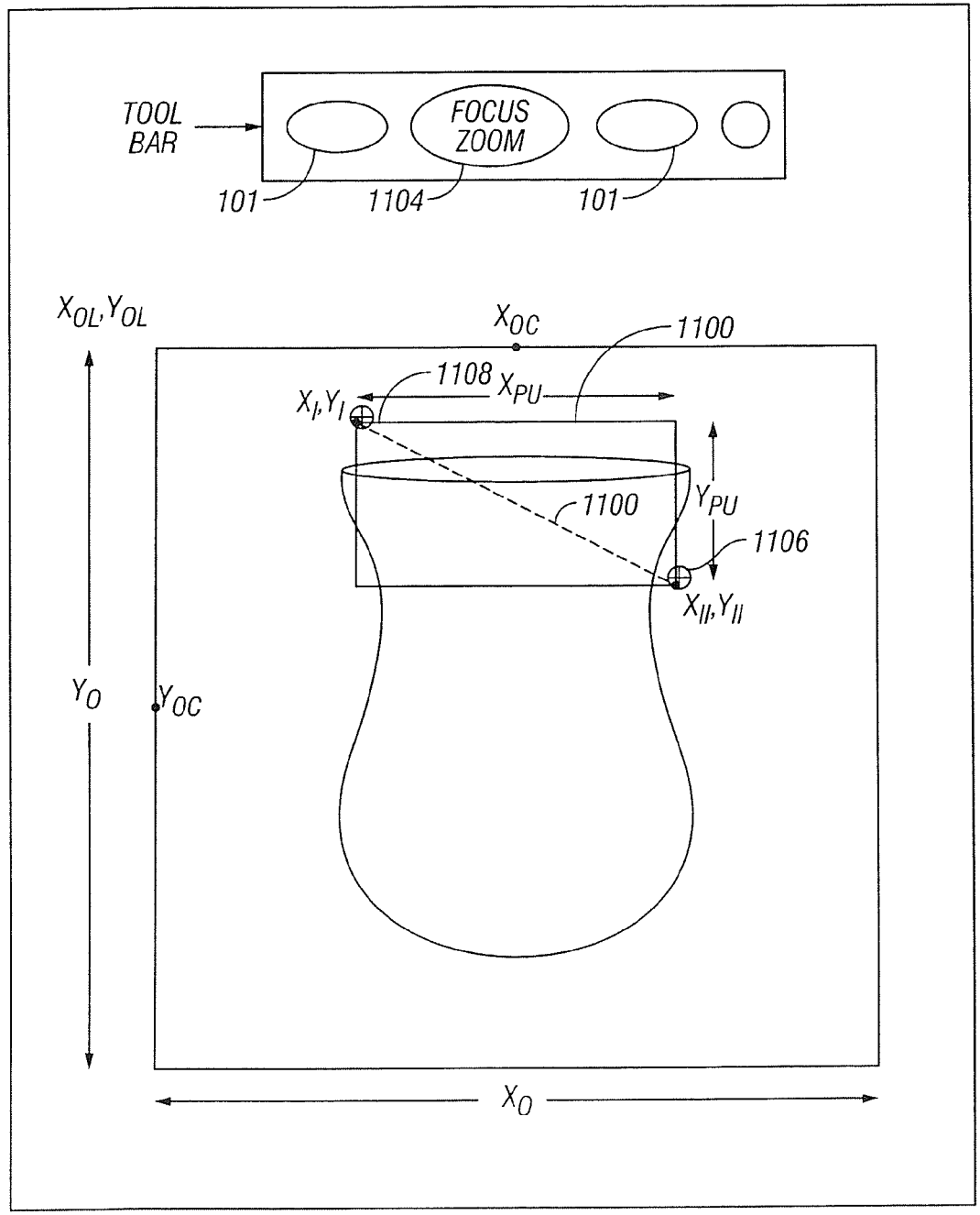
FIG. 30a is a perspective view of a display of the system of one preferred embodiment of the invention illustrating the user-defined polygon of the focus zoom interactive function.

Preferably, and with reference to FIG. 30a, a user can invoke this specialized zoom interactive function by clicking with a mouse on a focus zoom button 1104 on the tool bar 100. The focus zoom button 1104 may include the text "Focus Zoom" or alternatively may comprise a graphic, such as a representation of a magnifying glass. When a graphic is used, the words "Focus Zoom" or perhaps a more comprehensive description of the interactive function that corresponds to the button will appear or "pop up" when a user moves a mouse over the button.

When a user clicks on the focus zoom button 1104, the system 10 is put into focus zoom mode by, for example, setting a predefined variable to a particular value, such as "0" or "1."

In a presently preferred embodiment, the movement of the mouse while the system 10 is in focus zoom mode is tracked on the user's display with crosshairs 1106. In order to identify the specific area 1100, on an image on which the user wants to focus with the focus zoom interactive function, in a preferred embodiment, the user positions the crosshairs in the vicinity of the area by manipulating the mouse, and holds down the mouse button and drags the mouse across the specific area to define it for the system 10. The x- and y-coordinates of the mouse at the onset of the dragging action, either in relation to the screen or in relation to the focus zoom transparent layer 1102, are recorded by the software 20, for example, as $x_I$ and $y_I$. As the mouse is dragged in any direction across the object 16 depicted in the currently viewable image layer 200, the x- and y-coordinates of the mouse position during the drag are recorded. When the user stops dragging, the x- and y-coordinates of the mouse are recorded by the software 20, for example, as $x_{II}$ and $y_{II}$.

A polygon 1108, preferably a rectangle or a square is drawn on the user's display where the sides of the polygon are drawn based on the difference between $x_{II}$ and $x_I$ and the difference between $y_{II}$ and $y_I$. If the optional focus zoom transparent layer 1102 is used, then the polygon 1108 is drawn by the software on that layer.

When the user is satisfied with the specific area 1100 he or she has defined by the mouse dragging action, the user releases the mouse button. The user's release triggers an algorithm in the software 20 that determines the area on the currently viewable image layer 200 that corresponds to the area defined by the polygon 1108.

Figure 30B:
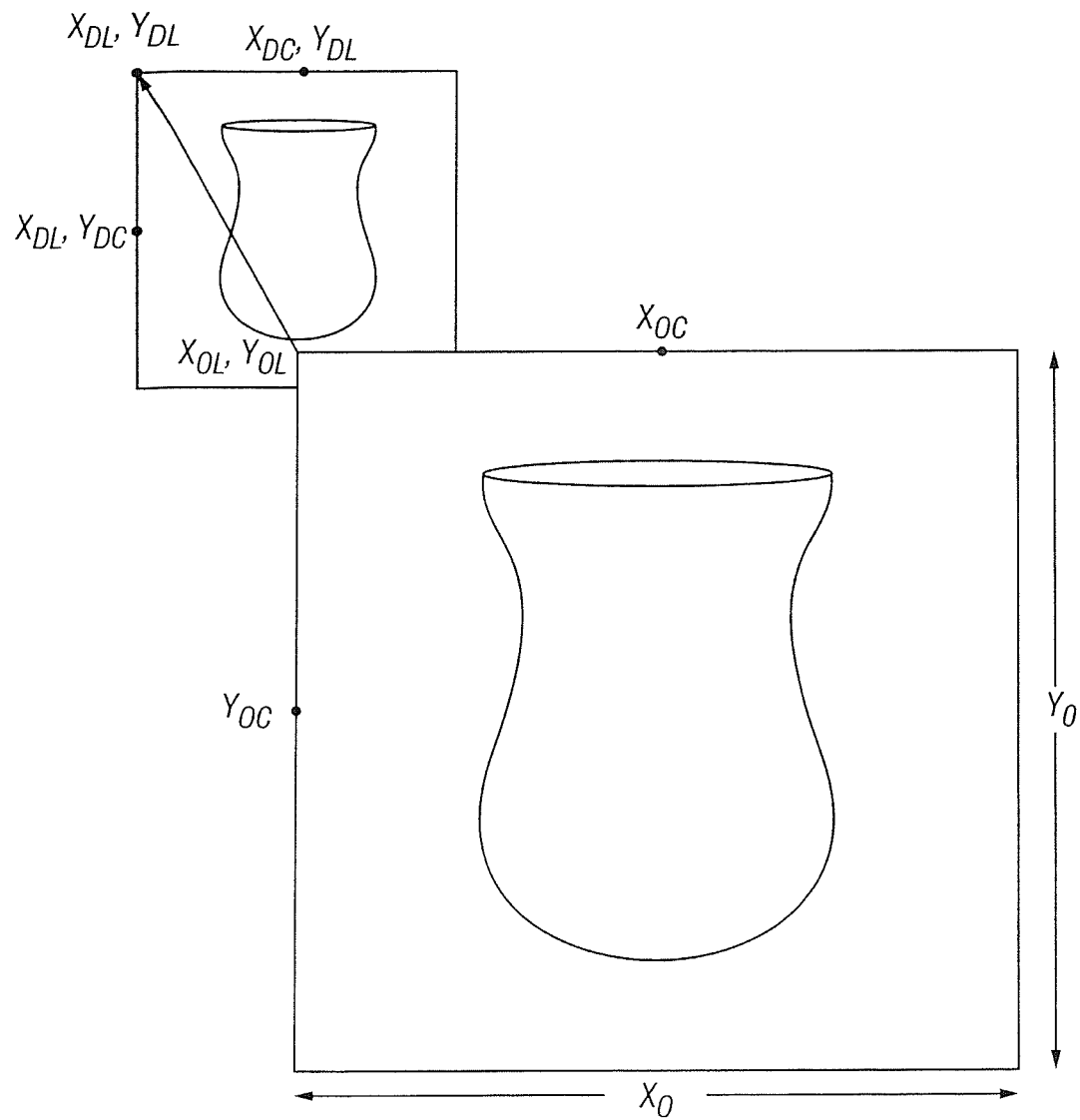
FIG. 30b is a schematic view of a display of the system of one preferred embodiment of the invention illustrating the repositioning of the pre-zoom image to the upper left-hand corner of the default image in connection with the focus zoom interactive function.
Figure 30C:
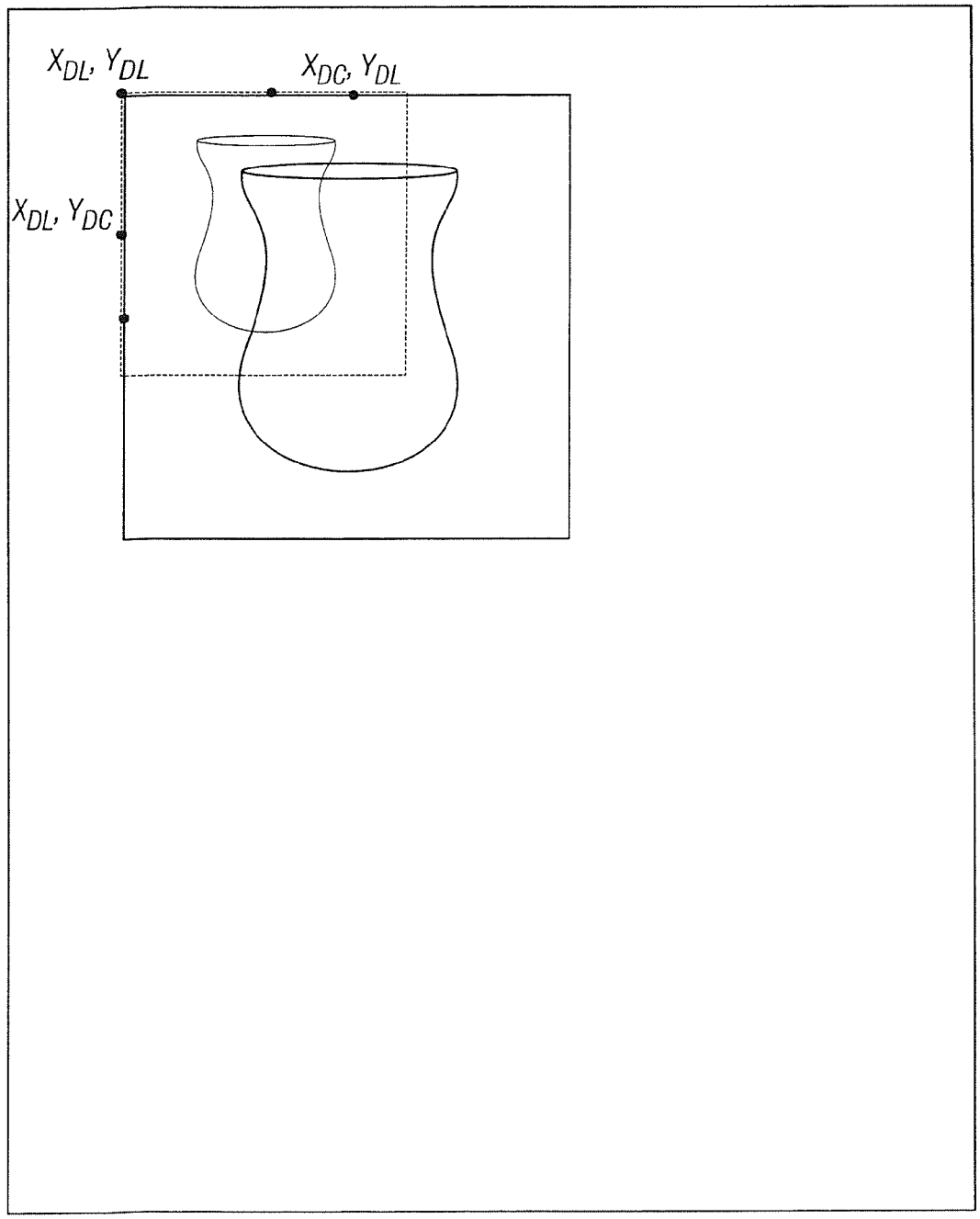
FIG. 30c is a schematic view of the display of FIG. 30b, after the pre-zoom image has been repositioned to the upper left-hand corner of the default image.
Figure 30D:
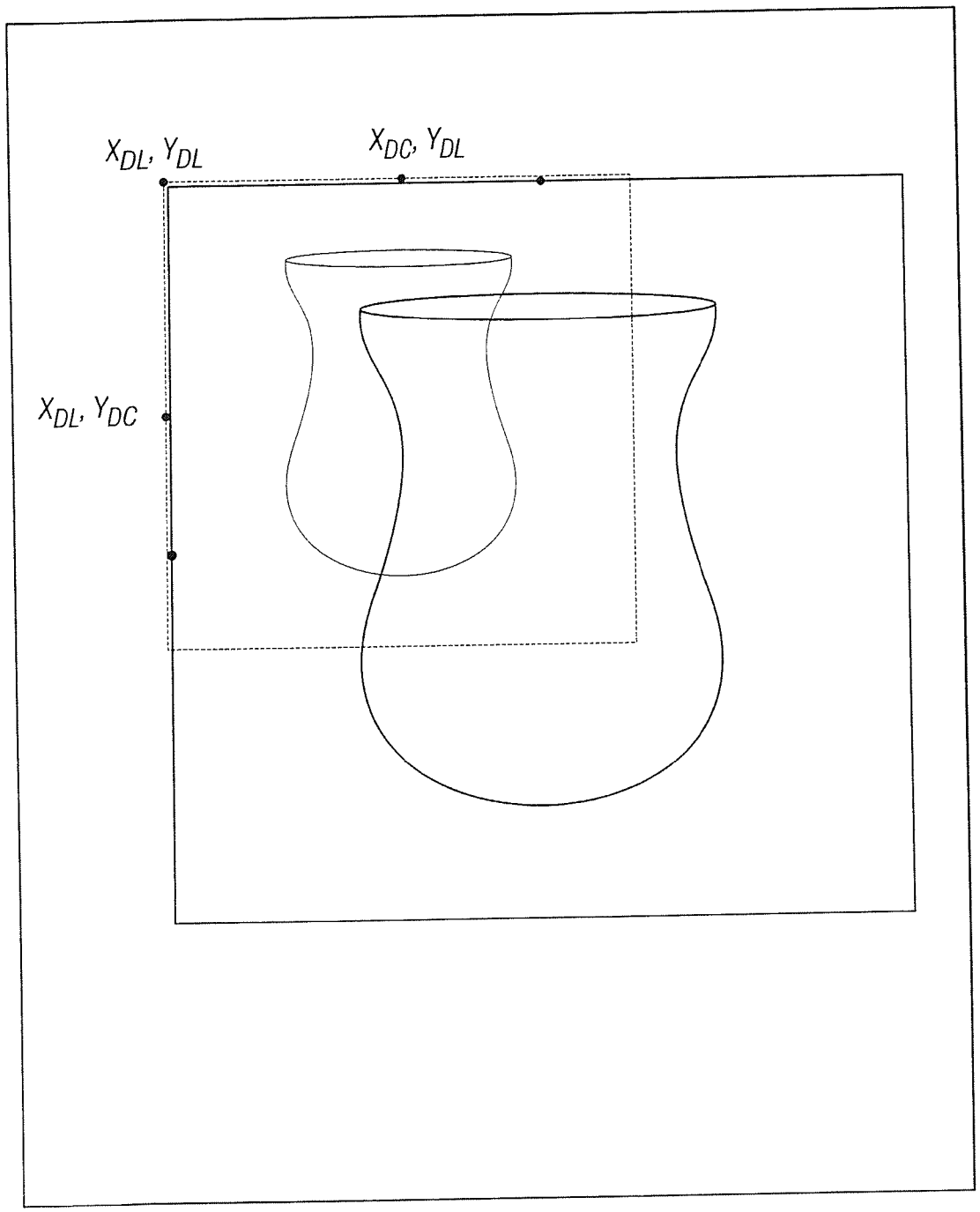
FIG. 30d is a schematic view of the display of FIG. 30c, after the pre-zoom image has been enlarged by the focus zoom factor.

Next, and with reference to FIGS. 30b-30d, the image is repositioned according to the following. First, the upper left-hand corner of the pre-zoom image, $x_{OL}$ and $y_{OL}$, is moved to the position corresponding to the upper left-hand corner of the default image, $x_{DL}$ and $y_{DL}$.

The degree of the focus zoom is determined by a focus zoom factor, $z_F$. More specifically, the focus zoom factor, $z_F$, is determined by dividing either the width of the pre-zoomed image or the height of the pre-zoomed image, by the length of a side of the polygon 1108, either a side along the x-axis, e.g., $x_{pu}$, or a side along the y-axis, e.g., $y_{pu}$. For example, if the length of the side of the polygon 1108 along the x-axis is used, the focus zoom factor, $z_F$, would be determined as $x_O/(x_{II}-x_I)$. Alternatively, if the length of the side of the polygon 1108 along the y-axis is used, the focus zoom factor, $z_F$, would be determined as $y_O/(y_{II}-y_I)$.

Then the pre-zoom image is enlarged by multiplying the width $x_O$ and the height $y_O$ by the focus zoom factor, $z_F$, to get the zoomed-in on image width and height.

Figure 30E:
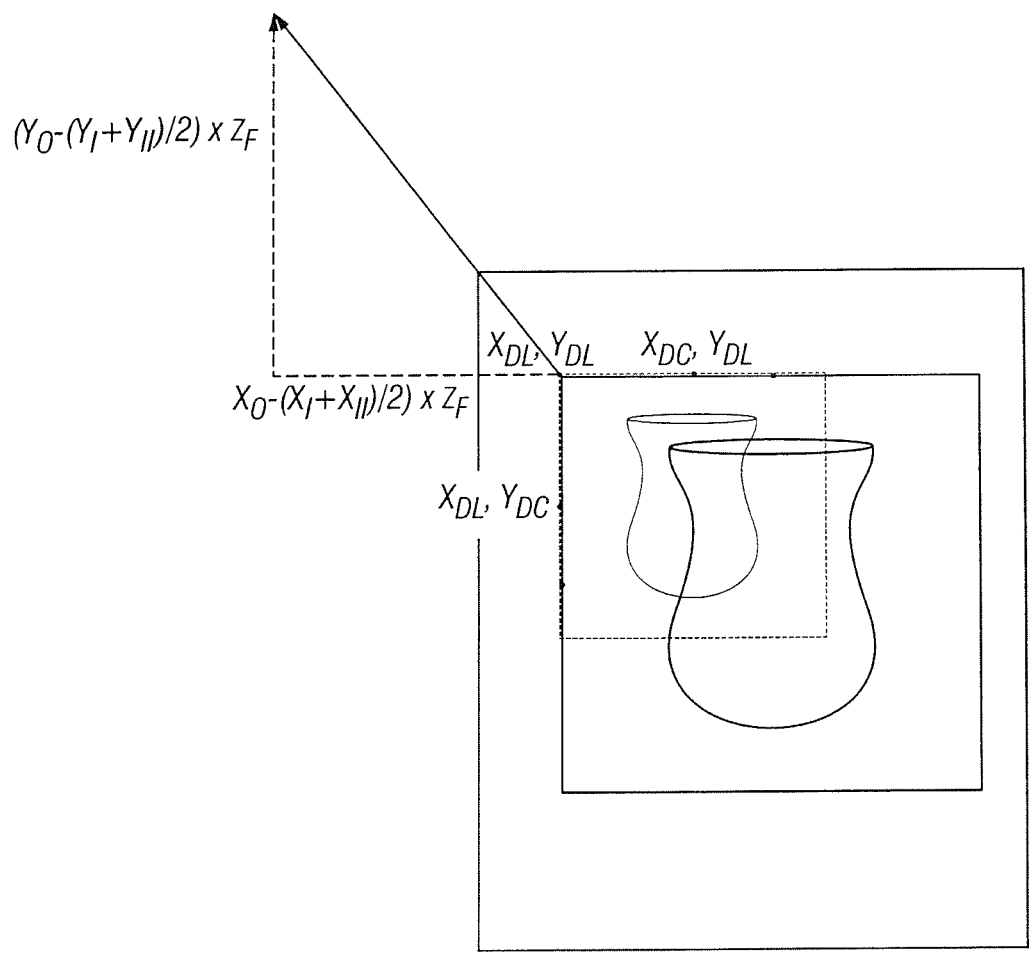
FIG. 30e is a schematic view of the display of FIG. 30d, illustrating a repositioning of the zoomed-in-on image.

With reference to FIG. 30e, then the zoomed-in-on image is repositioned in a negative direction on the x-axis (i.e., to the left) with respect to the point to which the upper left-hand corner of the image layer is moved, by an amount equal to the sum of the first and second positions along the x-axis that were used to define the polygon, $x_I$ and $x_{II}$, divided by two, multiplied by the focus zoom factor, $z_F$ (i.e., $x_O-(x_I+x_{II})/2 \times z_F$) and in a negative direction on the y-axis with respect to the point to which the upper left-hand corner of the image layer is moved, by an amount equal to the sum of the first and second positions along the y-axis that were used to define the polygon, $y_I$ and $x_{II}$, divided by two, multiplied by the focus zoom factor, $z_F$ (i.e., $y_O-(y_I+y_{II})/2 \times z_F$)).

The same result as is obtained by the calculations $(x_O-(x_I+x_{II})/2) \times z_F$ and $(y_O-(x_{II}-y_I))/2) \times z_F$ can also be achieved by the following $(x_O-(x_{II}+x_I)/2) \times z_F$ and $(y_O-(y_{II}-y_I))/2) \times z_F$.

Figure 30F:
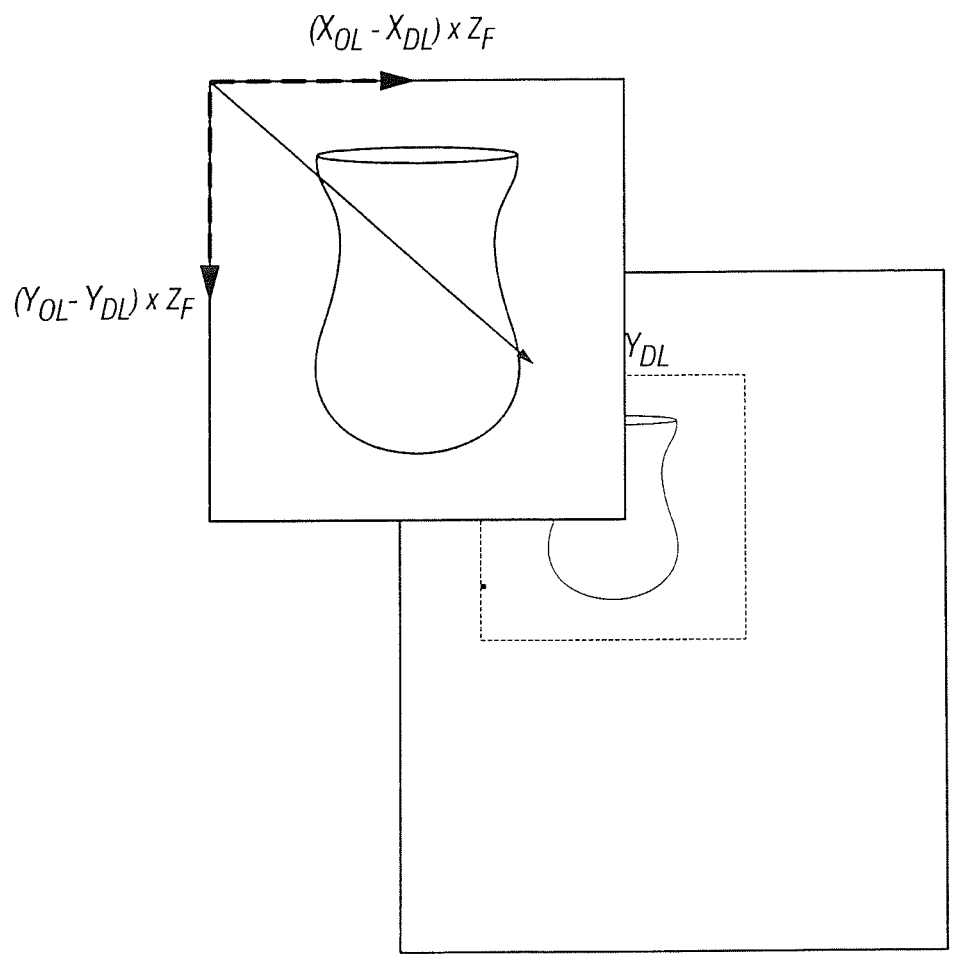
FIG. 30f is a schematic view of the display of FIG. 30e, illustrating a further repositioning of the zoomed-in-on image.

Next, and with reference to FIG. 30f, the zoomed-in on image 1080 is then moved in the opposite direction by an amount corresponding to the distance between the x-coordinate of the upper left hand corner of the default image, $x_D$, and the x-coordinate corresponding to the upper left-hand corner of the pre-zoom image, $x_{OL}$, multiplied by the focus zoom factor, $z_F$, and an amount corresponding to the distance between the y-coordinate of the upper left hand corner of the default image, $y_D$, and the y-coordinate corresponding to the upper left-hand corner of the pre-zoom image, $y_{OL}$, multiplied by the focus zoom factor, $z_F$.

Although only one method of implementing the focus zoom interactive function is described above, it will be readily appreciated by one with skill in the art, there are alternate ways of carrying out the focus zoom interactive function in the software 20 in accordance with the invention. For example, in determining the height along the y-axis of the zoomed-in-on image, $y_Z$, an alternative to using a focus zoom factor, $z_F$, would be to use the width of the zoomed-in-on image along the x-axis, $x_Z$. That is, the height of the zoomed-in-on image, $y_Z$, can be determined by taking the width of the zoomed-in-on image, $x_Z$, dividing the width of the zoomed-in-on image by the width of the pre-zoom image, $x_O$, and multiplying it by the height along the y-axis of the pre-zoom image, $y_O$.

Once the afore-described positional adjustments have been made, the software 20 can be further configured to move the zoomed-in-on image so that the point corresponding to the center of the user-defined polygon on the pre-zoomed-on image is positioned to any other position relative to the viewable area on the user's display, such as the center of the polygon 1108, the center of the viewable area on the user's display or any other position on the user's display.

For example, to move the point corresponding to the center of the user-defined polygon 1108 on the zoomed-in-on image 1080 to the point corresponding to the center of the default image 1060, the zoomed-in-on image is moved in along the x-axis by an amount corresponding to half the width of the default image 1060 ($x_D/2$) of the currently viewable image layer 200 and moved along the y-axis by an amount corresponding to half the height of the default image 1060 ($y_D/2$). This action centers the point corresponding to approximately the center of the polygon 1108 on the zoomed-in-on image 1080 on the user's display 1114 in an area corresponding to approximately the center of the default image 1060.

Figure 30G:
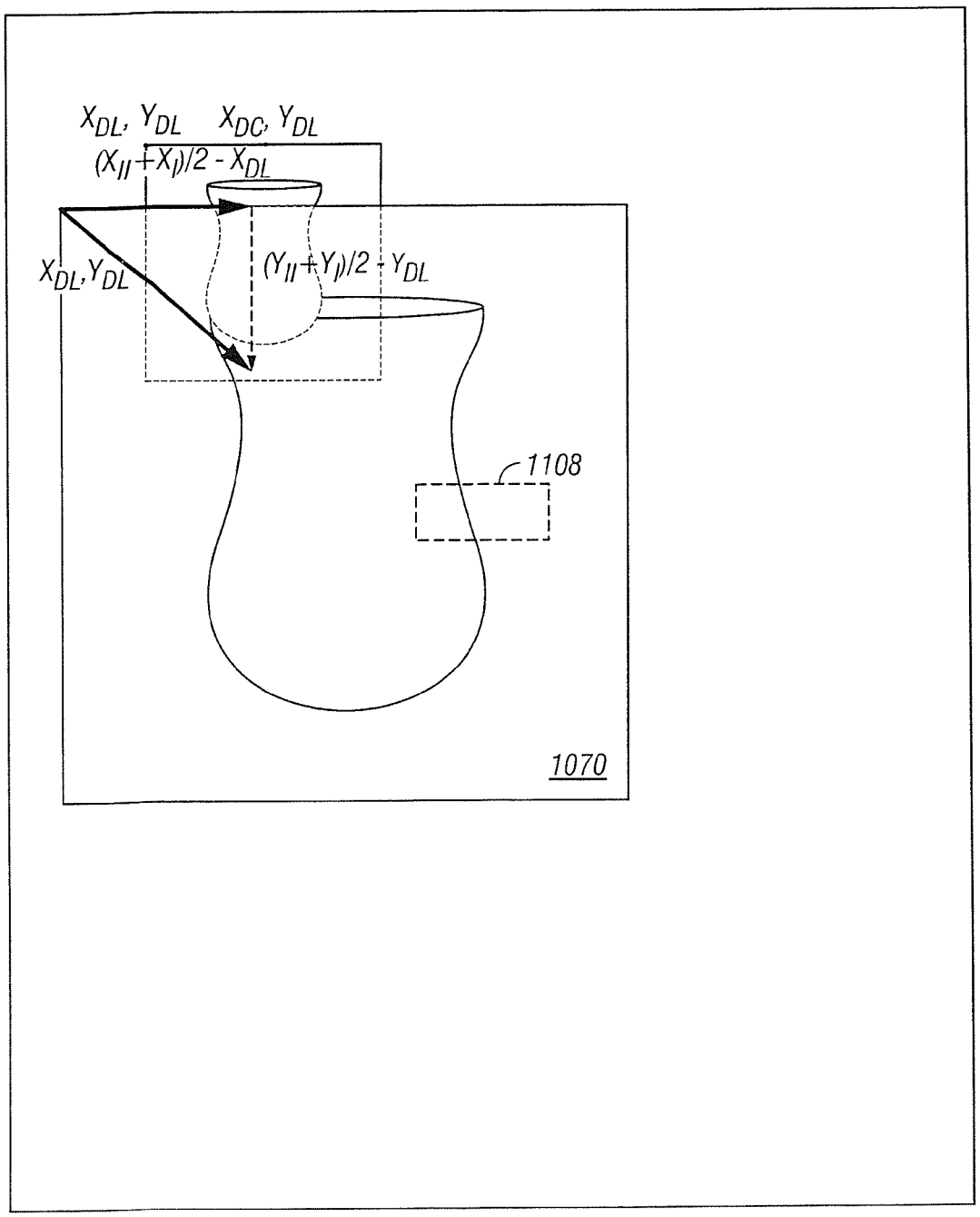
FIG. 30g is a schematic view of the display of FIG. 30f, illustrating another repositioning of the zoomed-in-on image.
Figure 30H:
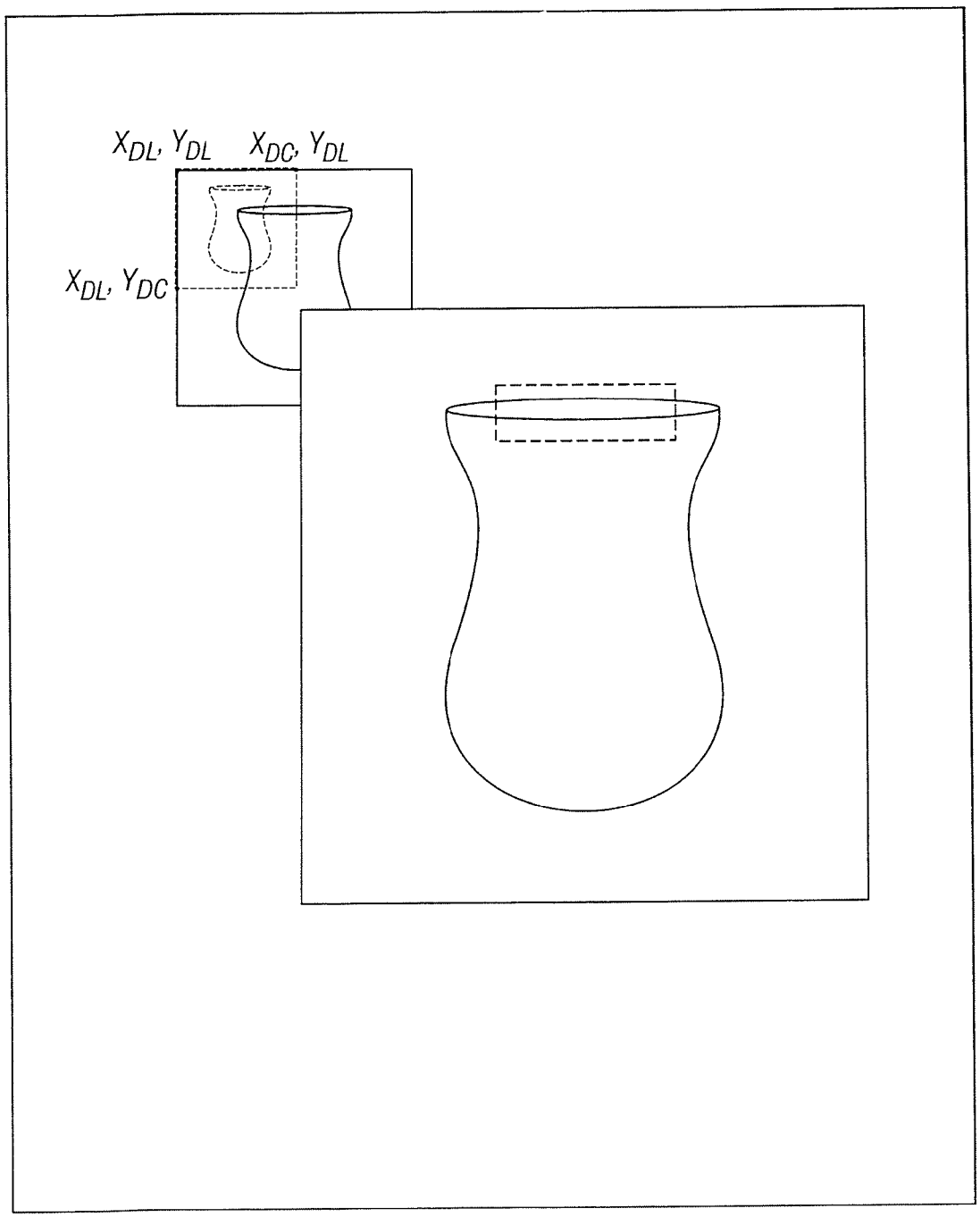
FIG. 30h is a schematic view of the display of FIG. 30g, after the repositioning of the zoomed-in-on image has been accomplished.

In another example, and with reference to FIGS. 30g and 30h, to move the point corresponding to the center of the user-defined polygon 1108 on the zoomed-in-on image 1080 to the point corresponding to the center of the user-defined polygon 1108 on the pre-zoom image 1070, the zoomed-in-on image 1080 is moved along the x-axis by an amount corresponding to the distance from the upper left hand corner $x_{DL}$, $y_{DL}$ of the default image 1060 to the center of the user-defined polygon 1108 on the pre-zoom image 1070. The currently viewable image layer 200 is then moved $(x_{//}+x_{/})/2$ subtracted from $x_{DL}$ in the x-axis, and $(y_{//}+y_{/})/2$ subtracted from $y_{DL}$ in the y-axis. This action centers the point corresponding to approximately the center of the polygon 1108 on the zoomed-in-on image 1080 on the user's display 1114 in an area corresponding to the point corresponding to the center of the polygon 1108.

Similarly, the point corresponding to the center of the polygon 1108 on the zoomed-in-on image 1080 can be moved to any other desired location along the x- and y-axes. This is the case because the system 10 will always be able to calculate the distance between the upper left-hand corner of the default image 1060 to any other x, y point. Thus, for example, if it is desired to position the zoomed-in-on image 1080 in the center of the user's display instead at a point corresponding to the center of the user-defined polygon 1108, the zoomed-in-on image 1080 will be moved along the x-axis to an x-coordinate that is a distance equal to the difference between the x-coordinate of the center of the user's display and $x_a$ and the zoomed-in-on image 1080 will be moved along the y-axis to a y-coordinate that is a distance equal to the difference between the y-coordinate of the center of the user's display and $y_{DL}$.

Figure 30I:
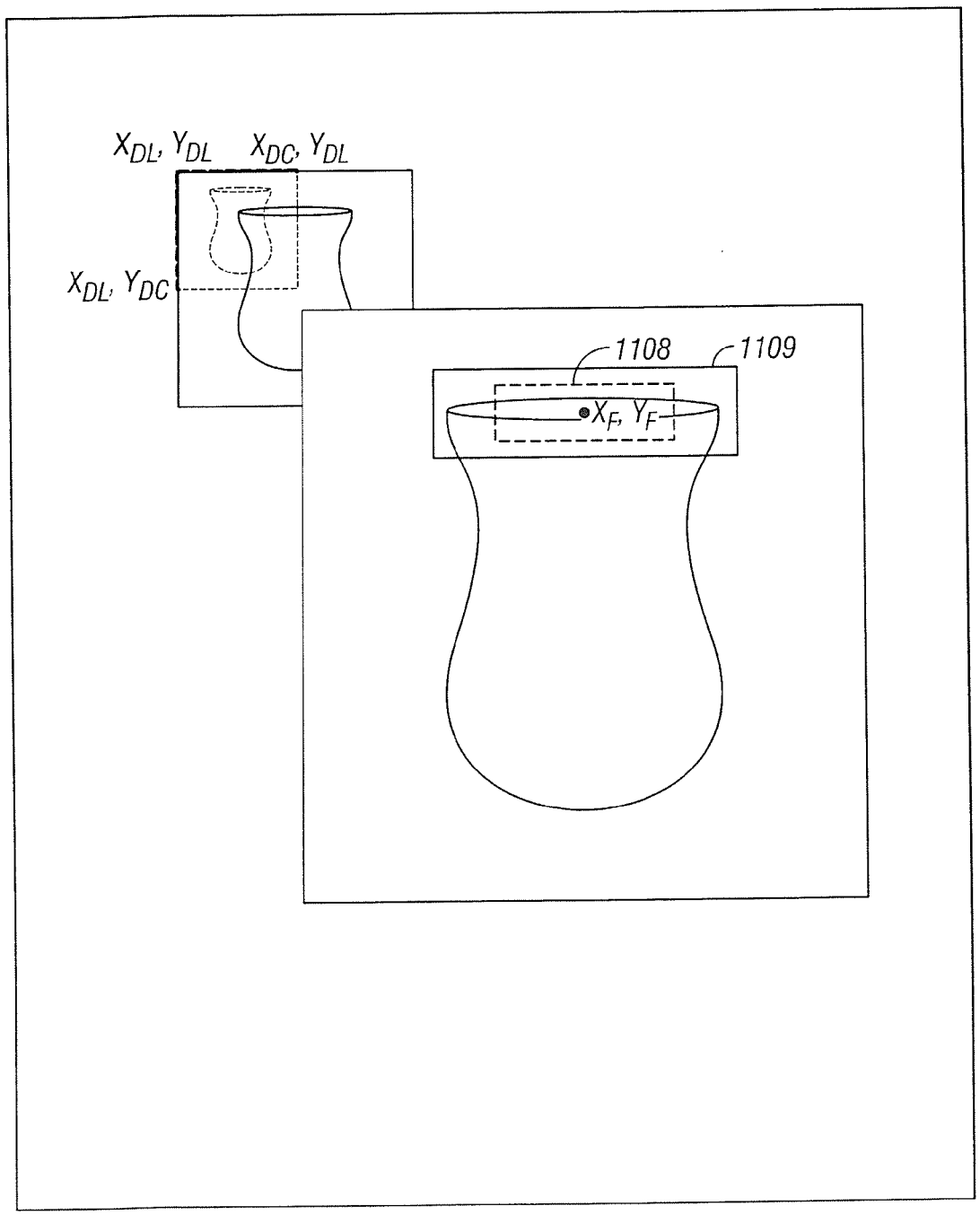
FIG. 30i is a schematic view of the display of FIG. 30h, illustrating a scaled polygon being drawn on the zoomed-in-on image.
Figure 30J:
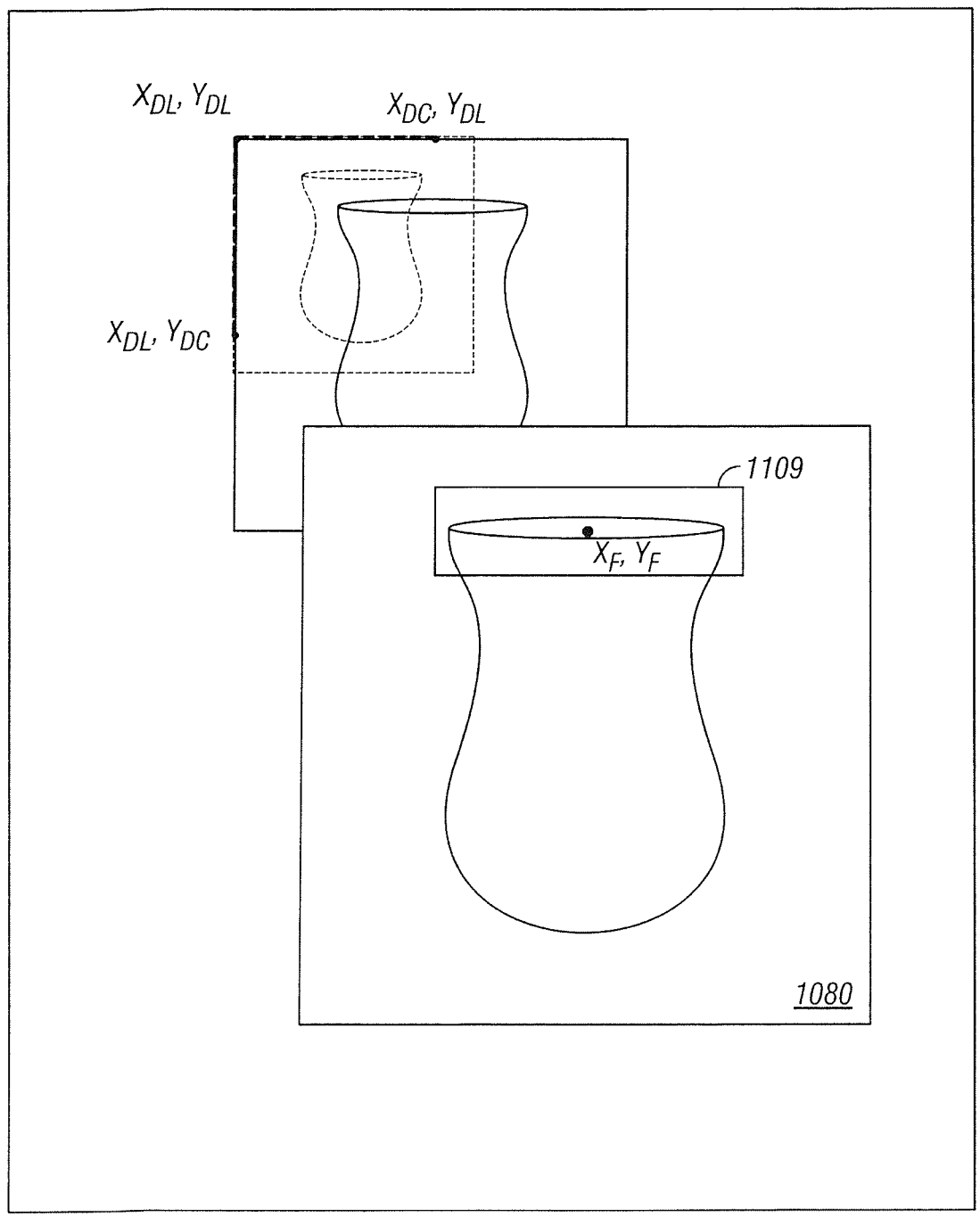
FIG. 30j is a schematic view of a display of FIG. 30i, illustrating the repositioning of the zoomed-in-on image to the center of the user's display.
Figure 30K:
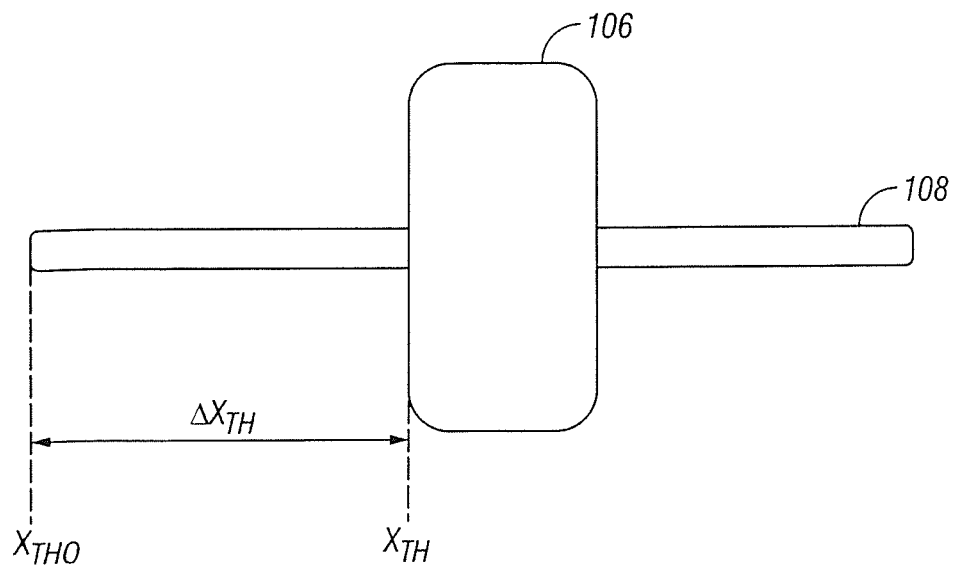
FIG. 30k is a schematic view of the thumb and track of the tool bar button for the standard zoom interactive function, during an adjustment of the position of the thumb along the track in connection with a focus zoom interactive function.

With reference to FIGS. 30i and 30j, the x- and y-coordinates on the zoomed-in-on image 1080 of the point which corresponds to the point that was at the center of the polygon 1108 before the image was enlarged is then used by the system 10 to draw a proportionately-sized new polygon 1109 on the zoomed-in-on image 1080 to define the focused in on area. One method of defining the location of the new polygon 1109 is to take half the distance between $x_{//}$ and $x_{/}$ on the x-axis and multiply it by the focus zoom factor, $z_F$, and to take half the distance between $y_{/}$ and $y_{/}$ on the y-axis and multiplying it by the focus zoom factor, $z_F$. By subtracting and adding this distance to $x_F$ and $y_F$, the four points of a polygon can be determined, and, thus, the new polygon 1109 can be drawn.

In a presently preferred embodiment, when the focus zoom interactive function is enabled for a set of images 14 and the standard or regular zoom interactive function described previously is also available for that set of images 14 and indicated on the tool bar 100 by the thumb 106 and track 108, it is desirable to correlate the position of the thumb 106 along the track 108 to the degree of zoom that is carried out in a focus zoom. That is, a regular zoom interactive function is initiated by the user when the user causes the thumb 106 to move along the track 108 on the button 104 on the tool bar 100 that is disposed in the tool bar layer 202. The image in the currently viewable image layer 200 is enlarged by exposing more pixels of the image. The degree to which the image is enlarged is determined by using the regular or standard zoom factor, z, and the number of pixels corresponding to the distance the thumb 106 has moved along the track 108. For purposes of this description and with reference now to FIG. 30k, the position of the thumb 106 along the track at any given point in time can be referred to as $x_{TH}$, the position of the thumb 106 at the far left of the track 108, i.e., the zero position corresponding to a non-zoomed image, can be referred to as $x_{TH0}$, and the position of the thumb 106 at the far right of the track 108, i.e., the maximum position corresponding to the maximum possible zoom when the regular zoom interactive function is carried out, can be referred to as $x_{THmax}$. The number of pixels corresponding to the difference between the position of the thumb 106 during a regular zoom interactive function, $x_{TH}$, i.e., the distance a user has caused the thumb to move along the track 108 can be defined as $\Delta x_{TH} = x_{TH} - x_{TH0}$.

When the focus zoom interactive function is desired, the user causes it to be carried out not by causing the thumb 106 to move along the track 108, but rather by using the crosshairs 1106 to define a polygon 1108 to select the area on which to focus the zoom. Once the focus zoom has been carried out, it is desirable for the position of the thumb 106 along the track 108 to reflect the degree to which the image in the currently viewable image layer 200 has been enlarged. For example, if the user wants to implement a regular zoom function with respect to an image that has been enlarged by reason of carrying out a focus zoom, such as zooming in further on the image or zooming back out on it, the user would use the thumb 106. In this case, then, the position of the thumb 106 along the track 108 would have to correspond to the degree to which the image has been enlarged by reason of the focus zoom. Thus, in a presently preferred embodiment of the system 10 according to the invention, the width of the zoomed-in-on image, $x_Z$, and the regular zoom factor, z, are used to calculate the appropriate thumb position, $x_{TH}$, along the track 108. More specifically, the focus zoom factor, $z_F$, is determined by dividing the width of the zoomed-in-on image, $x_Z$, by half the distance between the first position of the mouse when the focus zoom mouse dragging action commences, $x_{/}$, and the ending position of the mouse after the dragging action is completed by the user, $x_{//}$, i.e., $x_Z/((x_{//}-x_{/})/2)$. If the result of this calculation is not a whole number, the number preferably is rounded to the nearest whole integer. The regular or standard zoom factor, z, which is used in implementing a standard zoom interactive function as described herein above, is determined prior to loading the webpage and may be arbitrary. For example, the maximum degree to which an image can be zoomed in on can be predefined for any image 12. One way of determining the zoom factor, z, is to take the width of the image corresponding to the state when the image is at the desired maximum degree of zoom, dividing it by $x_D$ and multiplying it by 100 divided by $x_{THmax}$.

The position of the thumb along the track, $x_{TH}$, is then determined as follows: The width of the zoomed-in-on image, $x_Z$, minus the default width, $x_D$, is multiplied by the ratio of 100 over the zoom factor, z multiplied by the default width, $x_D$ (i.e., $x_{TH} = (xZ\_x_D) \times 100 / z \times x_D$). If the result of this calculation is greater than the maximum possible position for the thumb along the track, $x_{THmax}$, then $x_{TH}$ is set to $x_{THmax}$, and the thumb 106 accordingly is moved to the end or far right of the track 108. As will be apparent to those skilled in the art, various other methods may be used to calculate the distance by which the thumb 106 ought to be moved along the track 108 to reflect the degree to which an image in a currently viewable image layer 200 has been zoomed in on.

Supplemental Information Interactive Function

Figure 31:
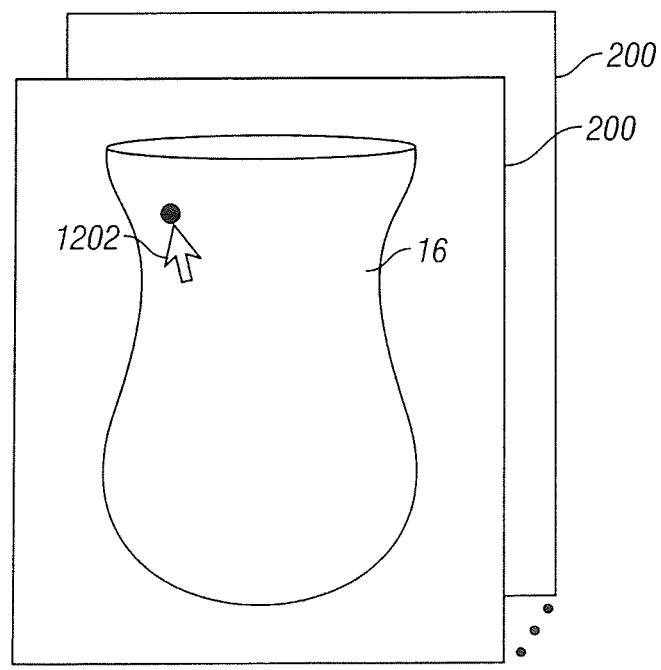
FIG. 31 is a perspective view of a display of the system of one preferred embodiment of the invention illustrating the supplemental information interactive function.
Figure 32:
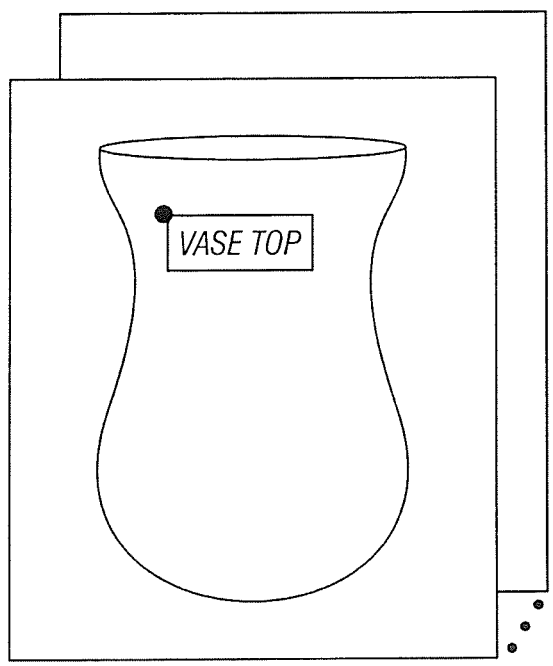
FIG. 32 is another perspective view of the display of the system of FIG. 31 after a highlighted area has been selected and supplemental information corresponding to the highlighted area is displayed.
Figure 33:
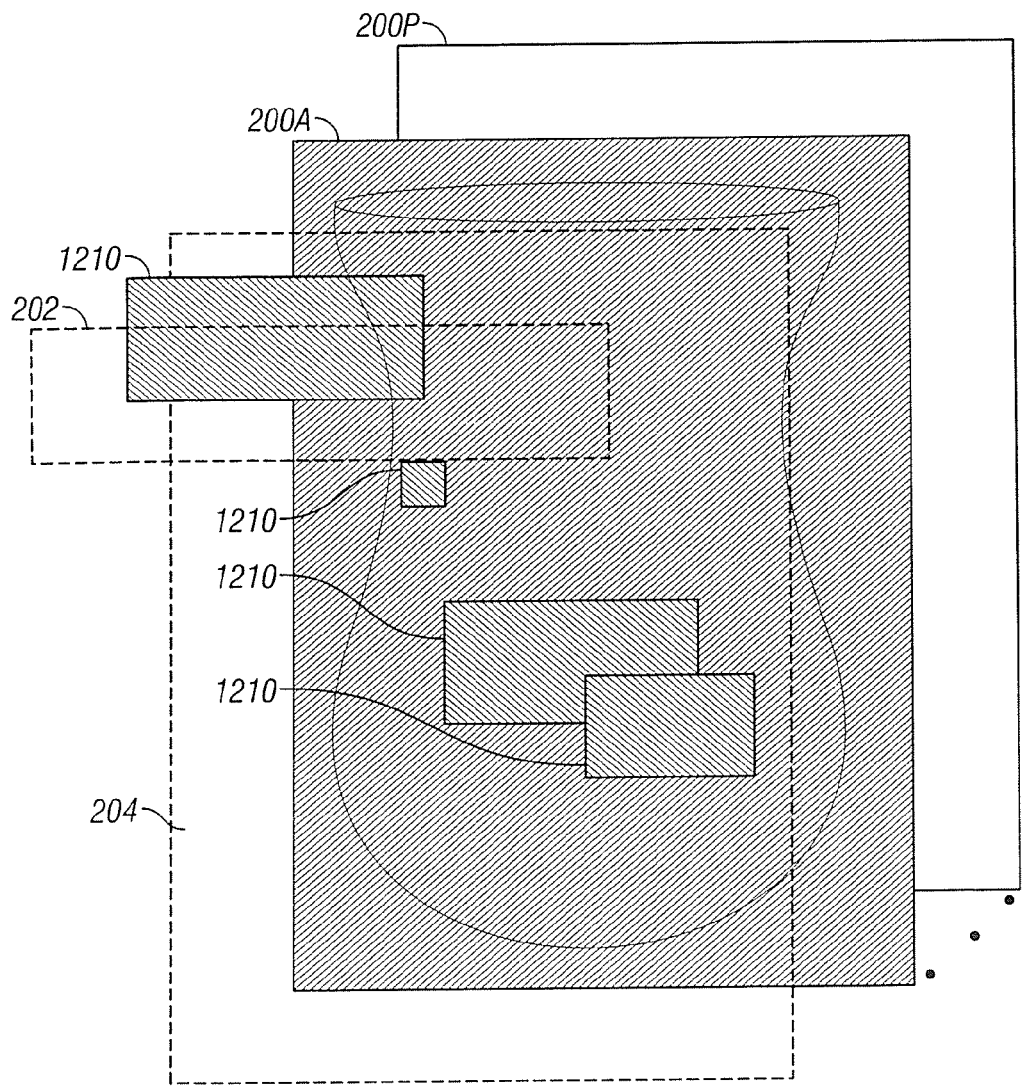
FIG. 33 is a schematic view of a display of the system of one preferred embodiment of the invention illustrating the some of the layers used in implementing the supplemental information interactive function.

In accordance with yet another preferred embodiment of the present invention, and with reference to FIGS. 31-33, the software 20 of the system 10 allows a user to retrieve and view supplemental information 1200 corresponding to particular areas of an image 12 in a set of images 14 displayed to a user in a currently viewable image layer 200. This supplemental information 1200 may include software for executing other functions, text, graphics, other images, links to other websites or webpages, jpeg files or other HTML files having video or audio content, or any combination of these. Particular areas of an image 12 in the currently viewable image layer 200 are identified to the user by some appropriate means designed to stand out to the user, such as by highlighted areas 1202, which can be colors, symbols or any other appropriate designator. In the example shown in FIG. 31, the object 16 is a vase, and only one highlighted area 1202 is shown as a colored symbol or circle. Each highlighted area 1202 is associated in the software with a set of supplemental information 1206. With reference to FIG. 32, the set of supplemental information 1206 associated with any given highlighted area 1202 can be retrieved and viewed by a user when the user takes some pre-defined action with respect to the highlighted areas 1202, for example, moving the mouse over the highlighted area 1202 or clicking with the mouse on the highlighted areas 1202. Alternatively, a tool bar button 101 can be provided for user to invoke the supplemental information interactive function, such that when the user thereafter moves a mouse over a highlighted area 1202, the associated set of supplemental information 1206 will be displayed.

Preferably, points along the x-axis and points along the y-axis that correspond to the location of each highlighted area 1202 are recorded in the software 20. These x- and y-coordinates can correspond to points on the user's display, or points on a particular layer, such as a dedicated layer on which the highlighted areas 1202 for an image 12 in a currently viewable image layer 200 are provided as described below. Preferably, information is recorded in the software 20 with respect to each highlighted area that permits the system 10 to calculate and update the desired position of the highlighted areas 1202 relative to the image 12 to which the highlighted area 1202 pertain, so that regardless of which other interactive functions might be carried out with respect to a given image 12 (e.g., a zoom operation, a move interactive function, etc.), the relative position of the highlighted areas 1202 with respect to the image 12 will appear to remain constant from the perspective of the user.

When the user positions the mouse anywhere within the x- and y-coordinates that correspond to the location of a highlighted area 1202 on the user's display, the system 10 correlates the position of the user's mouse with the known position of corresponding highlighted area 1202, and then correlates the particular highlighted area 1202 with the supplemental information 1206 that is intended to be associated with the highlighted area 1202. The system 10 will then display to the user the appropriate set of supplemental information 1206 that is associated with that particular highlighted area 1202. The display of the supplemental information 1206 desirably occurs by revealing a previously hidden layer or portion of a layer in which the supplemental information 1206 is provided. In a presently preferred embodiment, the supplemental information 1206 is provided in the same designated layer as the highlighted area 1202 that is associated with the supplemental information 1206, but the portion of the dedicated layer in which the supplemental information is provided remains hidden unless and until a user mouses over or clicks on the pertinent highlighted area 1202. When a user mouses over or clicks on the pertinent highlighted area 1202, the portion of the dedicated layer containing the supplemental information 1206 is unhidden and revealed to the user. Preferably, the system 10 will display the retrieved set of supplemental information 1206 in a form similar to that of a pop-up window, which is a form well known to those with skill in the art.

The sets of supplemental information 1206 might include such things as details about the materials from which the vase is constructed, information as to whether the vase is available constructed of different materials, sizes, or colors, information about the nature, origin, or creator of a certain design on the vase, a video clip of the vase in a home or museum, an audio clip from a customer who bought the vase and is enjoying it, a link to a website on which other decorative items having patterns matching that of the vase are available, etc. As will be appreciated by one with skill in the art, the nature of the content of the sets of supplemental information 1206 can vary widely, depending upon the nature of the object(s) 16 or scene(s) 17 depicted in the set of images 14 from which the image 12 in the currently viewable image 200 derives.

In a presently preferred embodiment of the system 10 according to the invention, the location(s) for a given image 12 in a set of images 14 that will be designated with highlighted areas 1202 and associated with sets of supplemental information 1206 are determined at the time the images 12 in a set of images 14 is configured in the system 10 to be made available for users to download via a webpage in response to the user's request for the webpage. Alternatively, the identification of the highlighted areas 1202 and the corresponding sets of supplemental information 1206 can be provided to the system 10 sometime after a given set of images 14 has been configured for downloading to a user and enabled for various interactive functions.

Further, and as mentioned above, in a presently preferred embodiment of the system 10 according to the invention, the location of a highlighted area 1202 relative to a particular area on an image 12 displayed in a currently viewable image layer 200 will remain the same even if other interactive functions are carried out with respect to the image 12, such as a move interactive function or a zoom interactive function. As will be appreciated by one with skill in the art, the supplemental information interactive function can be enabled and implemented in the software 20 of the system 10 in a variety of different ways. Two of these possible ways are described below.

In a presently preferred method of enabling and carrying out the supplemental information interactive function, there is a predefined number of highlighted areas 1202 or "hot spots" for each image 12 in a set of images 14. Associated with each highlighted area is a set of parameters including an image identifier, which identifies to the system 10 the particular image 12 in a set of images 14 with respect to which the highlighted area 1202 is to be displayed, position identifiers, which identify to the system 10 the position of each highlighted area 1202 relative to the x- and y-axis of the actual image (e.g., the actual image having width $x_A$ and height $y_A$ as described above), and a content identifier, which identifies to the system 10 the HTML code or other content that comprises the supplemental information 1206 for that particular highlighted area 1202, e.g., text, an audio clip, a video clip, a link to another website, etc.

With reference to FIG. 33, when a set of images 14 is downloaded on a webpage in response to a user's request, the set of parameters associated with the set of highlighted areas 1202 for that set of images 14 is also downloaded. A dedicated layer 1210 is created for each highlighted area 1202 and its associated supplemental information 1206. The dedicated layers 1210 are configured so that the supplemental information 1206 provided therein will remain hidden unless and until the user moves over the associated highlighted area 1202 with a mouse or clicks on the associated highlighted area 1202 with a mouse. Each dedicated layer 1210 is coupled with the pertinent set of parameters, i.e., the image identifier, the position identifiers, and the content identifier. Preferably, the dedicated layers 1210 are provided between the tool bar layer 202 and the currently viewable image layer 200. DHTML layers can be coded so that the layers or portions of the layers can be toggled between a hidden state and a non-hidden state when they are perceptible by a user. Whenever a layer is hidden, it will not interfere with things that are happening with respect to any other layers, for example, moving a mouse across a first transparent layer to accomplish move of all of the image layers, drawing a line on a second transparent layer, etc. The dedicated layers 1210 desirably each have a portion that can be hidden, i.e., the portion in which the set of supplemental information 1206 for the associated highlighted area 1202 is provided. The non-hidden portion of the dedicated layers 1210 is sized to approximate the size of the symbol, text, other graphic, etc., that is used to designate the highlighted areas 1202. For example, if colored circles are used to designate the highlighted areas 1202, the non-hidden portion of each dedicated layer 1210 will have approximately the same dimensions as the circles. Thus, the present of the dedicated layers 1202 between the currently viewable image layer 200 and the tool bar layer 202 will not substantially impede a user's ability to carry out other interactive functions with respect to the currently viewable image layer 200, e.g., a move interactive function, or a manual rotate interactive function. If the suite of interactive functions available for a given set of images 14 associated with one or more sets of supplemental information 1206 include interactive functions that use one or more transparent layers, e.g., transparent layers 204, 206 as can be provided in connection with the measuring interactive function, the dedicated layers 1210 preferably are provided between the tool bar layer 202 and the transparent layers 204, 206. In addition, and because it is preferable to give the user the perception that the relative position of the highlighted areas 1202 to an image 12 remains the same, regardless of whether some other interactive function is carried out with respect to the image, e.g., a zoom function, it is desirable to configure the dedicated layers 1210 so that they cannot be dragged if a user tries to use his or her mouse to drag, for example, the highlighted area 1202 provided in a dedicated layer 1210 from one location on the user's display to another.

At the point a webpage is downloaded, whichever image 12 in a set of images 14 that has been designated as the default image will be displayed to the user in the currently viewable image layer 200. Based on the known dimensions of height and width of the default image, and the known position of each highlighted area 1202 relative to the actual image corresponding to the default image 12, the system 10 calculates the appropriate position of each highlighted area 1202 that is associated with the default image 12.

One way in which this calculation can be accomplished is by (1) taking the ratio of the width of the actual image $x_A$ to the width of the default image, $x_D$, and multiplying that ratio by the difference stored as the x-axis position identifier for each highlighted area, e.g., on the actual image 1050, the distance between an x-coordinate of each highlighted area 1202 and the x-coordinate of the upper left-hand corner of actual image, $x_{AL}$, to get a delta distance along the x-axis, $x_{delta}$; and (2) taking the ratio of the height of the actual image $y_A$, to the width of the default image $y_A$, and multiplying it by the difference stored as the y-axis position identifier for each highlighted area, e.g., on the actual image 1050, the distance between a y-coordinate of each highlighted area 1202 and the y-coordinate of the upper left-hand corner of the actual image 1050, to get a delta distance along the y-axis, $y_{delta}$. Each highlighted area 1202 is then positioned over the default image 1060 at a distance $x_{delta}$, $y_{delta}$, measured from the coordinates of the upper left-hand corner of the pre-zoom image, $x_{OL}$, $y_{OL}$.

The location of the highlighted areas 1202 provided in the dedicated layers 1210 relative to the image 12 with which the highlighted areas 1202 are associated can be maintained in a similar fashion with respect to the currently viewable image layer 200 in any state, e.g., original or pre-zoom, zoomed-in-on after a standard zoom, or zoomed-in-on after a focus zoom, because the coordinates of the currently viewable image layer 200 along the x- and y-axes are always known to the system 10, and the x- and y-coordinates of the upper left-hand corner of the currently viewable image layer, for example, $x_{OL}$, $y_{OL}$ (for an original or pre-zoom image), $x_{ZL}$, $y_{ZL}$, (for an zoomed-in-on image), can always be used along with the known relationship of the highlighted areas 1202 to the actual image 1050 to move the highlighted areas 1202 so that the relative position of the highlighted areas 1202 to the image 12 depicted in the currently viewable image layer 200 appears to remain the same from the perspective of a user.

Menu Options Interactive Function

Figure 34A:
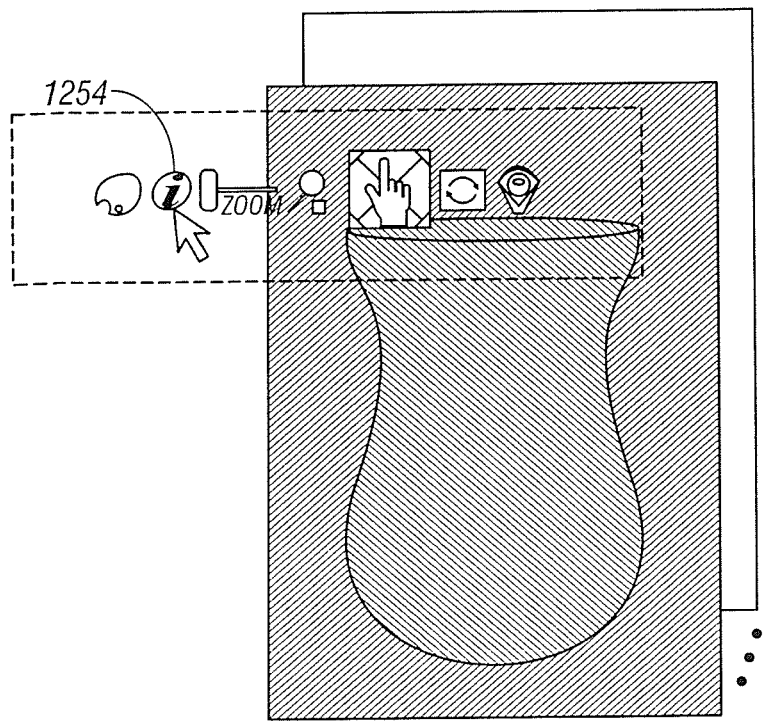
FIG. 34a is a schematic view of a display of the system of one preferred embodiment of the invention illustrating the menu options interactive function.
Figure 34B:
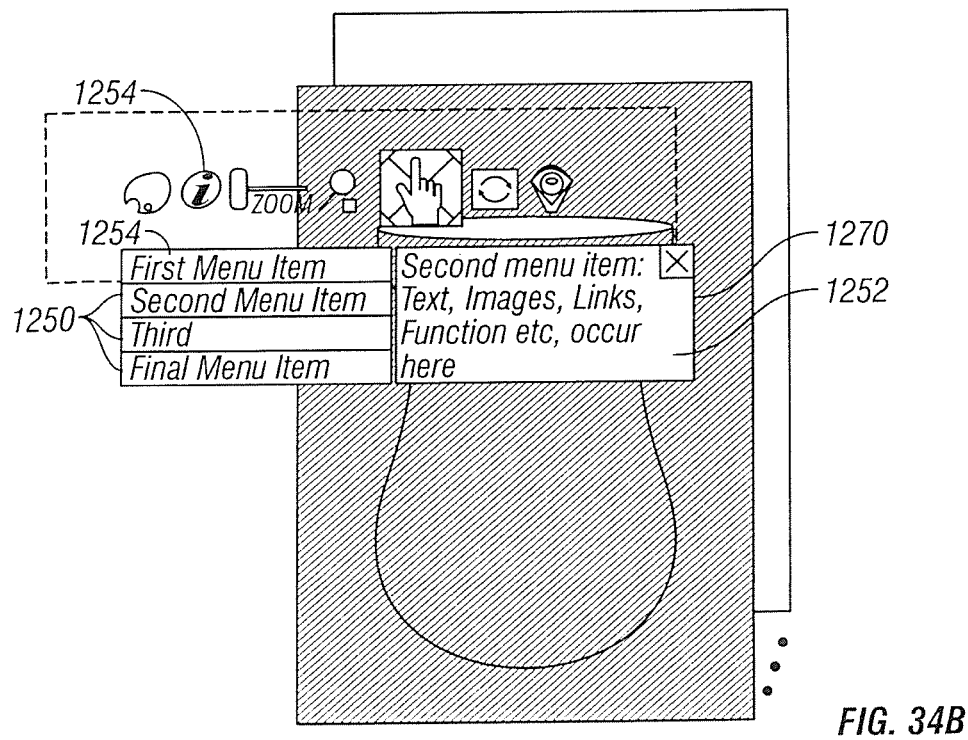

With reference to FIGS. 34a and 34b, another presently preferred embodiment of the system 10 according to the invention provides an interactive function that allows a user to choose from among several options provided in a menu with respect to an object 16 or objects 16 or scene 17 depicted in a particular set of images 14. These menu options 1250 may include a "specifications" option that allows a user to receive information 1252 about an object 16, such as text constituting technical specifications about the object, for example, for a car or a camera, a "sizes" option that allows a user to receive information about available sizes, for example, for an article of clothing, or a "price" option that allows a user to look at price information, for example, with respect to various options that are available for a vehicle (special wheels, extended warranty, etc.). The information associated with the possible menu options, however, is not limited to various types of textual information and can include virtually anything that it might be desirable to associate with an object in a given set of images 14, such as other images or graphic depictions of related objects (e.g., if the object in the set of images 14 is an article of clothing, one of the menu options might consist of images of possible accessories for the article, such as purses and jewelry or the like).

Preferably, a tool bar 100 is provided in a tool bar layer 202 that is associated with the image layers 200 for a given set of images 14 with a button or icon 1254 which, when clicked on with a mouse by a user, presents a user with menu options 1250. The system 10 can be configured so that clicking on the menu button 1254 invokes or calls up a list of the menu options 1250 (e.g., a pull-down menu or a drop-down window). The menu option interactive function preferably is enabled and implemented according to the following. When the image or images 12 in a set of images 14 are made ready for delivery by the system 10 in response to a user's request, the options to be provided for an image 12 or set of images 14 is determined. For a given set of images 14 or group of sets of images 14, a single or "universal" set of menu options 1250 might be provided including choices such as "specifications," "colors," "price," etc. Alternatively, different sets of menu options might be provided for different images 12 within a set of images 14 or for different sets of images 14 within a particular group of sets of images 14. Preferably, once the menu options 1250 have been determined, the menu options 1250 are inserted into a menu option array that the software 20 is configured to create for that particular set of images 14 or group of sets of images 14. The actual information to be provided to the user when any of the menu options is selected is put into another array, a menu content array that is correlated to the menu option array so that, when one of the menu options is selected by a user, the system 10 knows where to look in the menu content array for the information to display to the user with respect to that option. Thus, there are as many menu option arrays and menu content arrays provided as there are different menu options for each image 12, set of images 14, or group of sets of images 14.

A user can invoke the menu options interactive function by mousing over or clicking on the menu option button 1254 on the tool bar 100. When the user mouses over or clicks on the menu option button 1254, the system 10 will cause the menu options for the image 12 in the currently viewable image layer 200 to drop down in a manner similar to the manner in which a drop-down window is configured to appear on a display.

When the user selects one of the menu options 1250, the system 10 will display the appropriate information 1252 to display to the user in connection with that menu option 1250. In a preferred embodiment, the menu option interactive function is enabled and implemented according to the following. When a webpage is downloaded to a user by the system 10 in response to a user's request, all of the information 1252 corresponding to the menu options 1250 for a given image 12, set of images 14, or group of sets of images 14 are provided in menu content layers 1270. The menu content layers 1270 corresponding to the image 12 in the currently viewable image layer 200 preferably are initially provided (i.e., at the time the webpage is delivered to the user) between the tool bar layer 202 and the currently viewable image layer 200, and between the tool bar layer 202 and the first transparent layer 204, if a first transparent layer 204 is provided, although the menu content layers 1270 can be provided in other locations relative to the tool bar layer 202 and the currently viewable image layer 200. Each menu content layer 1270 is created with code in the software 20, e.g., a style parameter, that keeps the menu content layer 1270 hidden when the webpage is downloaded and the associated information 1252 is called for by a user.

When a user selects a menu option 1250, a series of links are commenced that start up a script, preferably written in the JAVASCRIPT scripting language, that calls up the appropriate menu content layer 1270 that corresponds to that menu option 1250 and toggles the parameter for the menu content layer 1270 that renders the menu content layer 1270 visible.

It is desirable to configure the menu content layers 1270 so that when one is unhidden, it is elevated along the z-axis so that it is above any other menu content layers 1270. In this configuration, in addition to viewing the information 1252 displayed in a menu content layer 1270, a user can move the menu content layers 1270 around on the viewable area of the user's display, such as by clicking on a menu content layer 1270 and dragging it to another location with a mouse. Also, if a user fails to re-hide a first menu content layer 1270 after the user has caused it to become unhidden by selecting a menu option 1250, the user can view the contents of other menu content layers 1270 corresponding to different menu options 1252 notwithstanding the fact that the first menu content layer 1270 is still visible on the user's display. When the menu content layers 1270 are implemented in DHTML, the elevation of one menu option layer 1270 over or on top of another menu option layer 1270 is accomplished by changing the z-index that is associated with each menu option layer 1270 to move the menu content layers 1270 on top of or in front of each other. Alternatively, the menu content layers 1270 can be configured so as to remain fixed relative to other layers and/or non-movable by a user.

Each menu content layer 1270 can be provided with a feature that allows a user to re-hide the menu content layer 1270 once it has been unhidden by a user, for example, an "X" might be provided in the upper right-hand corner of the menu content layers 1270 which, when clicked on with a mouse, causes the menu content layers 1270 to become hidden again.

The default position of any menu content layer 1270 can be pre-defined with respect to x- and y-coordinates corresponding to locations on the viewable area of the user's display, such as the center of the viewable area, with each menu content layer 1270 appearing directly above the last as menu options 1252 are selected by the user. Optionally, the menu content layers 1270 can be configured so as to be semi-opaque, either whenever the menu content layer 1270 is not hidden or whenever the menu content layer 1270 is not hidden and positioned on top of another non-hidden menu content layer 1270, so that the content of other layers, e.g., the currently viewable image layer 200 or previously unhidden menu content layers 1270, can still be perceived by the user.

Appearance Modifying Interactive Function

With reference now to FIGS. 35*a* and 35*b*, another interactive function can be provided in the system 10 according to the invention that is essentially a variation on the menu interactive function described above. Specifically, an interactive function can be provided that allows a user to choose from among several options to perceive the appearance of an object or objects 16 or a scene 17 depicted in a set of images 14, such as different colors or shades (e.g., red, light red, dark red, yellow, metallic yellow, etc.) or different patterns (e.g., stripes, checks, herringbone, etc.).

Preferably, the appearance modifying interactive function is configured in the system 10 so as to be capable of being invoked by a user with a mouse, such as by moving the mouse over ("mouse over"), moving the mouse over and pressing a mouse button down ("mouse down"), or moving the mouse over, pressing a mouse button down and releasing the button ("mouse click") on an appearance modifying button or icon 1280 on a tool bar 100 provided in a tool bar layer 202. The appearance modifying button 1280 may include text that suggests the appearance modifying interactive function to which it corresponds (e.g., "colors") or, the button 1280 alternatively might be indicated by a graphic that suggest the interactive function. When a graphic is used, the system 10 can be further configured so that text describing the nature of the interactive function that corresponds to appearance modifying button 1280 will appear or "pop-up" when a user moves a mouse over the button 1280.

The appearance modifying interactive functions is implemented according to the following. An appearance modifying option array is created by the software 20 when the webpage with the enabled interactive images is initially downloaded to a user. The appearance modifying option array contains all of the possible choices a user will have to modify the appearance of an object or objects 16 that are depicted in a set of images 14, such as all of the different color choices (e.g., color swatches or "red," "blue," "yellow," etc.) for a vehicle, a set of dishes, etc., or all of the different fabric swatches for an article of clothing or a window covering or an upholstered piece of furniture, etc.

As is the case with the menu options described above, the possible modifications can be the same for a given group of sets of images 14, such as a group in which each set of images 14 depicts objects in the same category, such as a particular manufacturer's new line of car models, or a manufacturer's new line of furniture groupings. Alternatively, the possible modifications to the appearance of an object or objects 16 that are depicted in a set of images 14 can be defined uniquely for each set of images 14.

In a case where the system 10 is configured to display multiple symbols 1010 that are each associated with a unique set of images 14 with which interactive functions may be carried out, the appearance modifying option array 1286 includes one or more parameters unique to each of the set of images 14 in addition to the possible modifications to the appearance. Then, a two-dimensional array is created in the software 20 of the system 10, wherein the first dimension contains parameters and/or information sufficient to identify each set of images 14 for which the appearance modifying interactive function is to be enabled, and the second dimension contains information sufficient to identify each image 12 in the sets of image 14. For example, the first dimension might contain pointers to four sets of images 14, each set of images 14 comprising sixteen images 12 in a certain color, e.g., red, blue, yellow, and green. The second dimension in the two-dimensional array would contain pointers to the images 12 (i.e., sixty-four images 12). The first dimension in the two-dimensional array would specify which of the sixty-four belong to the red set of images 14, which belong to the blue set of images 14, which belong to the yellow set of images 14, and which belong to the green set of images 14.

This configuration of the software 20 of the system 10 is such as to allow a user to invoke the appearance modifying interactive function by mousing over, mousing down or clicking on the appearance modifying button 1280 to obtain a menu of possible different appearance options, which preferably will be provided in a layer 1286 that is provided over or on top of the currently viewable image layer 200. The possible different appearance options may be shown in a text list (e.g., "red," "blue," etc.) or as swatches. The user can choose one of the appearance modifying options by using the mouse to scroll up or scroll down the list 1296. Alternatively, the action required to choose one of the appearance modifying options can be a mouse down or mouse click action. When whatever action necessary to choose an appearance modifying option has been taken by the user, the currently viewable image layer 200, together with any associated hidden image layers 200 for the corresponding set of images 14 are purged from the image layers 200 and swapped with the appropriate set of images 14 in the two-dimensional array 1288 that corresponds to the user's appearance modifying choice.

As will be appreciated by one with skill in the art, this embodiment of the invention is not limited to the appearance modifying examples given (e.g., colors, patterns, etc.), but rather can be used to swap any images in and out of the user's display, for example, images showing different objects 16 or scenes 17. Moreover, the software 20 can be configured to execute any action when the appearance modifying option is invoked by a user.

Transport Interactive Function

In another presently preferred embodiment of the system 10 according to the invention, a further interactive function is enabled with respect to one or more sets of images 14 that enables a user to be transported to a website or a particular webpage on a website that has some relationship to the set of images 14, e.g., a website via which a user can carry out and complete a transaction with respect to an object depicted in the set of images 14. This transporting interactive function is desirable where the objects depicted in a set of images 14 are being offered for sale in an e-commerce situation. Preferably, in this embodiment, the tool bar 100 disposed in the tool bar layer 202 for the set of images 14 is provided with a transporting button or icon 1310. The button may contain text describing the transporting function it enables or, alternatively, may be designated by a graphic, such as shopping cart or the fulfillment website owner's trade name, such as the trade name PAYPAL used by the EBAY company. Alternatively, the transport interactive function might be invoked by something other than a tool bar button, such as by a choice on a menu or drop-down menu, or by some other icon located anywhere on a user's display.

While in this embodiment has been described with reference to transporting a user to a website or webpage on which e-commerce transactions may be carried out, the website or webpage to which a user is transported can be of any type, and are by no means limited to websites or webpages through which e-commerce can be transacted. This transporting interactive function can be described as follows. The website or website to which a user is transported upon clicking on the transport button 1310 that is associated with a given set of images 14 is identified to the system 10 along with the variables and corresponding values for the variables that are required by that location, i.e., the variables needed by the target website home page or some other webpage, such as variables that define each item a user wants to purchase, the color or size the user wants, etc.

The variables are associated with a set of images 14 at the time the set of images 14 is put into a form in which it can be delivered to a user's computer in response to a user's request. An algorithm that will effect a link from the webpage on which the currently viewable image layer is being displayed to another website/webpage is defined in the software 20 and is invoked when a user clicks on the transporting button 1310. When the user clicks on the transporting button 1310, the system 20 inserts the variables and corresponding values that are stored with the set of images 14 into the algorithm, and when the algorithm is executed, the user is transported to the appropriate other website/webpage.

Although the foregoing preferred embodiment of the invention is described with reference to transporting the user to a different website or webpage, the same methodology can be used to transport the user to any other location. For example, the user might be transported to an email address, or any other types of HTML and/or JAVASCRIPT supporting digital devices, such as a cell phone.

Transact Interactive Function

In accordance with still another preferred embodiment of the present invention, a transact interactive function is provided which permits a user to undertake and complete, at least from the perspective of the user, a transaction without the user ever having to leave the webpage that was first downloaded to the user upon the user's request. Preferably, the transport interactive function is enabled and implemented by providing a transact layer which is designated to provide information concerning any variables and corresponding values for the variables that are related to or relevant to a transaction concerning an image 12 or a set of images 14. For example, the transact variables might include price, shipping options, quantity, etc. and the corresponding transact values might be dollar amounts, ground or air, the numbers one through ten, respectively. The software 20 of the system 10 can be configured to carry out various transact operations with respect to the transact variables and transact values, such as computing total costs based on quantities, price and shipping costs. The presentation and style of the information in the transact layer can be in any format. For example, the format may be such that it contains columns of items and prices, with a totaling line underneath.

The appearance of the transact layer preferably is partially determined by variables that are defined at the time the webpages are downloaded to a user in response to a user's request, such as variables define how tables or columns will appear and what descriptive headings they might have. However, the appearance of the transact layer also desirably changes dynamically, based on variables the values of which are supplied while the user is interacting with the webpage, such as variables identifying items selected for purchase, color choices, sizes, quantities, etc.

In a preferred embodiment, when a user invokes the transact interactive function, the transact layer containing the transact variables and transact values for a given set of images 14 is provided above all of the other layers, e.g., on top of or in front of the tool bar layer 202. The user is provided with the ability to close the transact layer, for example, by clicking on an "X" disposed in the upper right-hand corner of the transact layer. When a user clicks on the "X," all of the transact variables and the corresponding values as of that moment are stored by the system 10 in memory, so that the transact layer can be recreated at any time, for example by a user's clicking again on the transact button. The transact variables and their corresponding values at the time the user clicks on the "X," can be passed from the webpage with which a user is currently interacting to any other webpage, so the transact layer can be recreated with information from previous pages whenever the transact interactive function is invoked by a user with respect to a given set of images 14.

Although the transact interactive function has been described with reference to completing a transaction with respect to a set of images 14, the transact interactive function can be configured for any application in which it is desirable to collect information related to a user's interaction with a set of images 14, to manage and manipulate such information, e.g., to tally it, and to present such information in a concise and easily understood format.

Enhanced Tool Bar

According to still another preferred embodiment of the system 10 according to the invention, and with reference now to FIG. 37, the tool bar 100 that can be provided in a tool bar layer 202 or otherwise displayed to the user, for example, directly with the currently viewable image such as in the currently viewable image layer 200, has a feature that allows a user to perceive the various tool bar buttons (e.g., the move tool bar button 102, the zoom button (standard zoom) 104, the focus zoom button 1104, the reset button, 110, the measure or measuring tool button 112, the pan or move button 114, the rotate right button 116, the rotate left button 120, the manual rotate button 118, the transport button 1310, the menu option button 1254, and the appearance modification button 1280, etc.) in an aesthetically pleasing manner, whereby when a user moves a mouse over a particular tool bar button ("mouse over"), that tool bar button is both highlighted (i.e., to convey to the user that the system 10 has acknowledged the user's mouse over) and to pop up a window containing information relevant to the function that is invoked by the tool bar button (e.g., a textual label defining the function (for example, "focus zoom"), instructions as to how to implement the function (e.g., click on the object and drag right to rotate right, etc.). More specifically, whenever a user mouses over a tool bar button, the corresponding pop up window is presented more smoothly than would be the case without the enhancement.

In a preferred embodiment, the enhanced tool bar function is enabled and implement according to the following. Tool bar buttons 101 are provided in a tool bar button table 1362 and the information 1364 to be displayed for the tool bar buttons 101 is provided in a separate tool bar information table 1366. When a user mouses over a tool bar button 101, the corresponding tool bar information 1364 also pops, up. Because the tool bar buttons 101 and the tool bar information 1364 are kept in separate tables, there is a noticeable smoothness to the flow of the pop up windows that is not present when only a single table is used to hold both the tool bar buttons 101 and the corresponding tool bar information 1364 to be displayed when a given tool bar button 101 is moused over.

Emailing

According to still another preferred embodiment of the invention, a feature is made available whereby webpages that are enabled for one or more of the various interactive functions described above can be easily emailed to user's email address in response to a request for an enabled webpage or in response to a command to the system 10 to email an enabled webpage. This feature of the invention preferably is enabled as follows. There are three principle ways of emailing, namely, emailing from a webpage, emailing from a webpage with frames, and emailing without using an external server. Upon receipt of a request to send a webpage containing a set of images 14 or sets of images 14 enabled for interactivity according to the invention via email, the system 10 can cause an HTML page to be created containing the pertinent content necessary to interact with a given set of images 14 or sets of images 14 and the pertinent scripting language (e.g., JAVASCRIPT) that is necessary to carry out the interactive functions. This method results in an HTML page that is devoid of any content that is likely to be recognized by firewalls as being content the delivery of which via email should be blocked. Alternatively, the JAVASCRIPT on the HTML page can be incorporated with links to js files but, when this approach is used, delivery of any email with which the HTML page is sent is more likely to be blocked by firewalls.

Any image to be delivered with the HTML page can be embedded into the HTML pages with <img> tags, and the width and height of the <img> can be set to 1, so the images appear as tiny dots on the page. The images nevertheless will be available for use by the JAVASCRIPT scripts without any pathing restrictions, i.e., because the image will be in a local directory, and the possibility that the image(s) called for is at a location that cannot be reached by the email recipient is eliminated. The emailed HTML having to point to a webpage or other source to get the image files. Because they are sourced locally, e.g. <img src="name of image file.jpg">, this restriction is removed.

Options for Enabling Images with Interactivity

Moreover, and although one presently preferred embodiment of the system 10 according to the invention is directed towards applications with third party website providers, other applications are contemplated and are within the scope of the invention, as will be apparent to those skilled in the art. For example, a user may acquire one or more images of an object on their own, such as by taking multiple digital photographs of an object from different angles in a particular 360-degree plane. The user then might upload the acquired images to the website of a provider of the system 10 according to the invention, whereupon the system provider would associate the software 20 with the user's set of images to enable various possible interactive functions, perhaps as selected by the user from among a menu of available interactive functions. The system provider would then deliver the interactivity-enabled set of images back to the user via any suitable means, such as via web pages or on a CD-ROM or other storage device. The user could then use his or her own processor to implement the software 20 and carry out the available interactive functions, for example, in the course of a presentation using the POWERPOINT program available from Microsoft Corporation.

Similarly, a user may be able to obtain the software 20 and associate his or her images with the software 20 directly, using the processor of his or her computer to implement the software 20, so as to enable the images for interactivity. For a more sophisticated user, the software 20 might include prompts for the user to enter certain parameters to tailor the available interactive functions for different sets of images. For a less sophisticated user, the software might include prompts for information that are simpler to follow, such as "upload image #1," "upload image #2," "enter the height of the object in inches," etc.

Additionally, the software 20 can be associated with a set of images 14 that are intended to be delivered to, and interacted with by, users who request the sets of images 14 over an intranet, or who download the sets of images 14 and the software 20 to temporary or permanent memory on their personal computers, PDAs ("Personal Data Assistants"), cell phones or other devices suitably equipped to accept the delivered sets of images 14 and to implement the software 20 with an appropriate processor.

Graphical User Interface ("GUI")

In one presently preferred embodiment of the system 10 according to the invention, and with reference to FIGS. 38-40, a graphical user interface or "GUI" is provided to enable a user to associate his or her images with the software directly, so as to enable the images for interactivity. More specifically, the GUI 1800 according to the invention is provided with one or more features that allow a user to simply and easily transform their images in whatever starting format, e.g., compressed image file format such as in a "jpeg" file or in a graphics file format such as in a "tif" or "tiff" file, into images with which a user can enable various interactive functions such as those described herein. In the example shown in FIG. 38, the GUI 1800 has a "File" menu option a user can use to open the user's image files. When an image file 1802 is open, the GUI 1800 presents a window 1804 on the user's display that contains certain information about the file, such as the dimensions of the image in pixels. The user can select the image 1806 associated with the open image file as one to use with the system 10 and therefore as one for which interactive functions will be enabled, for example by clicking with a mouse on the image 1806. Other methods of having the user identify and select the images to render interactive with the system 10 will be apparent to one with skill in the art. The images selected by the user in part will determine the nature and kind of interactive functions that can be enabled for an image 12 or a set of images 14. For example, if a user wishes to achieve a virtual 3-D effect for an object 16 or a scene 17, then the user would need to select images 1806 that show the object 16 at different angles acquired at different increments in a plane, q, of the object 16 or scene 17. In contrast, if a user wishes to enable only a zoom interactive function for an object 16 or scene 17, then the user can select as few as one image 1806 for that purpose.

Once the user has selected images 1806, the system 10 causes the images 1806 to appear in the GUI display area 1808. Various features of the GUI 1800 prompt the user to enter information with respect to an image or images 1806 so that the software 20 that is necessary to enable and implement different interactive functions can be created and coupled with the image or images 1806 so as to be made ready for delivery, for example, over a webpage or to a browser, via a banner advertisement, or in an email. The GUI 1800 also provides the user with the option of skipping over a selected image or images 1806. Some examples of the types of information the GUI 1800 according to the invention might prompt the user to enter are as follows:

(1) Image Specifications: The user may be prompted to enter information comprising specifications about the size of an image 1806, i.e., the height and width of an image 1806 in pixels, when the image is in the desired default state, i.e., the user identifies the dimensions the user wants the default image 1060 to have.

(2) Measuring Specifications: The user may be prompted to enter information comprising the actual physical dimensions of an object or objects 16 or scene 17 that is depicted in an image or images 1806, for example, when the user wishes to enable the measuring interactive function for an image or images 1806. In a presently preferred embodiment, and with reference to FIG. 39, a user is prompted to draw a line 1807 corresponding to any dimension on an object 16 in an image 1806, for example, corresponding to the width of an object. Preferably, the user accomplishes the drawing of the line 1807 using a mouse, although it will be apparent to one with skill in the art that other methods are possible. The user is then prompted to input a physical dimension that is to be associated with the dimension indicated by the drawn line and the units of measurement for that physical dimension, e.g., 3.2 inches, 5 centimeters, etc. For example, the user might be prompted to draw a line, and the GUI 1800 will display to the user the number of pixels to which the selected dimension corresponds. The GUI 1800 will then prompt the user to enter the physical dimension to which the line corresponds in units and units of measurement. The system 10 can use this information to calculate a pixel factor, px, that can be used in enabling and carrying out the measuring interactive function, whereby any dimension in pixels of an object 16 depicted in a set of images 14 can be defined and selected by a user to be measured, and the system 10 will use the pixel factor, px, to translate the selected dimension into the corresponding physical dimensions units of measurement.

(3) Zoom Factor: The user is prompted to zoom in and out of an image 1806 displayed in the GUI, and to select the degree to which the user desires the image 1806 to be zoomed in on when a zoom interactive function is carried out. In a preferred embodiment, the GUI 1800 will display a thumb 1810 disposed along a track 1812, which is similar to the thumb 106 and track 108 that constitute the standard zoom button 104 on the tool bar 100. When the user moves the GUI thumb 1810 along the GUI track 1812, the image 1802 will be expanded and contracted according to the position of the GUI thumb 1810 along the GUI track 1812, to expose and conceal, respectively, pixels to change the resolution of the image 1802. The maximum position on the GUI track 1812, i.e., the right-most position in the example shown in FIG. 38, corresponds to the maximum resolution or maximum desired possible zoom for an image 1806. The zero position on the GUI track 1812, i.e., the left-most position in the example shown in FIG. 38, corresponds to the default image 1060. Positions of the GUI thumb 1810 on the GUI track 1812 in between the zero position and the maximum position correspond to various degrees of resolution of the image or various degrees of zoom. The system 10 equates an arbitrary number with each of the possible degrees of zoom, and displays those arbitrary numbers to the user as the user moves the GUI thumb 1810 along the GUI track 1812 (i.e., the default image 1060). For example, the resolution of the image 1806 when the GUI thumb 1810 is at the zero position along the GUI track 1812 might be associated with a zoom factor of 1, the resolution of the image 1806 when the GUI thumb 1810 is at the mid-point along the GUI track 1812 might be associated with a zoom factor of 10, the resolution of the image 1806 when the GUI thumb 1810 is at the end point on the track might be associated with a zoom factor of 20, etc. When the user decides upon a maximum possible resolution of the image 1806, the user stops moving the GUI thumb 1810 along the GUI track 1812. The position of the GUI thumb 1810 where the user stopped tells the system 10 to what degree the image is to be maximally zoomed, in that way the zoom factor, z, can be determined.

(4) Colors: The user may be prompted to select from among several available color choices with respect to a given image 1806, so that one of the interactive functions to be enabled with respect to the image 1806 is to allow a user to perceive an object 16 depicted in the image 1806 in different colors. In a preferred embodiment, as illustrated in FIG. 38, an icon or menu item 1814 is provided on the GUI 1800 that corresponds to the option of selecting color choices. When the icon or menu item 1814 is clicked on with a mouse or otherwise chosen, a pop-up window 1811 will be presented to the user, as shown in FIG. 40, that contains a text box 1813 and two buttons, an image-selecting button 1815 and an output button 1817. In the text box 1813, the user is prompted to enter a color choice, either by entering a word description of the color, e.g., "black," or, alternatively, by entering the HTML code that identifies the path to the image having the desired color. Then the user is prompted to click on the image-selecting button 1815, which allows the user to identify to which images 12 or sets of images 14 the color choice is to apply. Finally, the user is prompted to click on the output button 1817, and the system 10 will integrate the user's choices in the GUI 1800 into a format that is used when the interactive webpage containing the image(s) 12 is created.

Alternatively, when the icon or menu item 1814 is clicked on with a mouse or otherwise chosen, a list of possible colors 1816 is presented to the user. The list of possible colors 1816 may comprise actual swatches of colors 1818 that approximate the hue and brightness with which the color will appear when enabled for an image 12 and/or the list of possible colors may comprise the names of the colors, e.g., "brick red," "navy blue," etc. The user can select colors from the list of possible colors 1816 in a variety of other ways, such as by the user selecting colors by clicking on a possible color on the list with a mouse.

(5) Supplemental Information: The user may be prompted to input information into the GUI 1800 concerning an image 1806 that will identify the locations at which highlighted areas 1202 will be displayed with an image 12 to a user and the supplemental information 1206 that will be displayed to a user when a user mouses over or clicks on each highlighted area 1202. In a preferred embodiment, a supplemental information icon or menu item is provided on the GUI display 1808. When a user selects the supplemental information icon, the image will be displayed at its actual size, i.e., the actual image 1050 will be displayed. The user can position the mouse at different locations on the image 1806 at which the user wishes a highlighted area 1202 to appear in the interactive-function-enabled form of the image 1806. If the user clicks with the mouse at a particular location, a small colored symbols such as a circle, will appear on the image and a text box or window will become enabled. The GUI 1800 will then prompt the user to specify what supplemental information 1206 to display when the highlighted area 1202 is moused over or clicked on for the enabled image 12. For example, if the supplemental information 1206 comprises textual information, the user will be prompted to input the text into the window.

In addition to the foregoing examples, the GUI 1800 can be configured to prompt a user for information that will be useful in enabling and implementing the transport interactive function and the menu options interactive function. In a preferred embodiment, if a user, for example, makes an error while inputting information in response to a prompt from the GUI 1800, or changes his or her mind about some information that has already been input, e.g., changes his or her mind about the degree of zoom to select, the GUI 1800 has a "reset" option that will allow the user to make changes to information that already has been input. This reset option may be invoked for all of the information about an image 1806 the GUI 1800 prompts a user to input. Alternatively, it may be capable of being invoked separately for each type of information the GUI 1800 prompts a user to input, e.g., the information input for the zoom factor might be erased independently of any information that already has been input at that point for the measuring interactive function. The reset option preferably is invoked by the user's clicking on a "reset" button that is provided on the GUI display 1808.

In addition to allowing a user to select images 1806 and to input information useful for enabling and carrying out interactive functions with respect to those images, the GUI 1800 also permits a user to specify the output format to which the enabled sets of images 14 are to be output. For example, the user might select a temporary file, a database format, or any other data storage format. Alternatively, the user might be able to send the output directly into a specified database. In addition, the GUI 1800 might permit a user to select from among different image compression formats for the output.

While the foregoing description of the GUI 1800 according to the invention has been described with reference to particular interactive functions, it will be apparent to one with skill in the art that the GUI 1800 can be configured to allow a user to enable virtually any interactive function with respect to an image or images 1806. For example, a user could use the GUI 1800 according to the invention to configure a menu option interactive function, or any other interactive active function that might be indicated for a given set of images 14.

In still other embodiments of the system 10 according to the invention, the same basic principles for the delivery of images and the enabling of interactive functions with respect to those images can be applied, with or without the use of the software 20, to render images on various forms of printed media, such as lenticular sheets, sets of images 14 with which a user can interact so as to perceive the illusion of 2-D or 3-D motion.

Accordingly, it will be appreciated that the invention provides a system for providing images to a user in a manner that the user perceives as enabling some form of interactivity with respect to the images, including but not limited to interactivity that results in the user perceiving the illusion of 2-D or 3-D motion of an object or objects depicted in the images. As will be readily apparent to a person of ordinary skill in the art and having the benefit of this disclosure, there will be a large number of possible ways of capturing the images described and subsequently processing the images captured in a manner that allows the images to be interacted with in some fashion when displayed, for example, in digital or analog form, or when rendered in printed form. All such applications are contemplated by the present invention, and may be used while staying within the inventive nature of the present disclosure. For example, the invention would have application in the fields of medicine (e.g., for diagnosis), security (e.g., for identification), education (e.g., for allowing a student to manipulate an object), entertainment (e.g., by studios for television and film projects), advertising (e.g., for product display), and so on and so forth. In addition, there are many more modifications than are mentioned above which are possible without departing from the inventive concepts contained herein. Thus, although the description above contains much specificity, the description should not be construed as limiting the scope of the invention; the descriptions given are merely providing an illustration of the embodiments of the invention. The scope of the invention is determined by the appended claims and their legal equivalents.

What is claimed:

1. An apparatus, comprising:
    a computing device and a memory, wherein the memory stores a set of computer instructions that, in response to being executed by the computing device, cause the computing device to perform operations comprising:
    defining at least one first layer for spatial perception,
    defining at least one second layer for at least partial spatial perception relative to the at least one first layer,
    causing a first item to be associated with one of the at least one first layer,
    pursuant to a select action, dynamically causing a second item to be associated with another of the at least one first layer,
    making the first item and the second item perceptible in sequence, with only one of the first and second items perceptible at a time, so that at least one object in a set of items including the first and second items is perceptible as moving, and
    creating an imperceptible layer associated with a currently-perceptible one of the first and second items.

2. The apparatus of claim 1,
    wherein the set of items includes a set of images stored in the memory which set the first and second items as first and second images, respectively, the first image depicting the at least one object viewed from a different perspective than the other images of the set of images; and
    wherein the computer instructions include a set of DHTML computer instructions stored in the memory that, in response to being executed by the computing device in connection with accessing a web page, cause the computing device to perform operations comprising:
    the defining of the at least one first layer,
    the defining of the at least one second layer,
    the causing of the first item as the first image to be associated with one of the at least one first layer, and
    the dynamically causing the second item as the second image to be associated with the another of the at least one first layer.

3. The apparatus of claim 1, wherein the computer instructions, in response to being executed by the computing device, further cause the computing device to output the one of the at least one first layer associated with the first item as the currently-perceptible layer with the first item being set for perception, and to swap out the first item with the second item set for perception.

4. The apparatus of claim 1, wherein the computer instructions, in response to being executed by the computing device, further cause the computing device to enable at least one interactive function to control a degree to which the moving is perceived.

5. The apparatus of claim 1, wherein the computer instructions, in response to being executed by the computing device, further cause the computing device to enable at least one interactive function to control at least one of a degree to which and the speed with which the moving is perceived.

6. The apparatus of claim 1,
    wherein the set of items includes a set of images stored in the memory which respectively set the first and second items as first and second images and the one of the at least one first layer and the another of the at least one first layer as first and second image layers, the first image depicting the at least one object viewed from a different perspective than the other images of the set of images; and
    wherein the computer instructions, in response to being executed by the computing device, further cause the computing device to simulate, as the moving, a rotation of the at least one object through three dimensions, including displaying and hiding each of the first and second image layers in at least one sequence.

7. A computer-readable non-transitory storage medium containing:
    a set of items, each representing at least one object viewed from a different perspective than other members of the set of items; and
    a set of DHTML computer instructions that, in response to being executed by a computing device, causes the computing device to perform operations comprising:
    defining at least one first layer for spatial perception,
    defining at least one second layer for at least partial spatial perception relative to the at least one first layer,
    causing a first item to be associated with one of the at least one first layer,
    pursuant to a select action, dynamically causing a second item to be associated with another of the at least one first layer,
    making the first item and the second item perceptible in sequence, with only one of the first and second items perceptible at a time, so that the at least one object in the set of items including the first and second items is perceptible as moving, and
    creating an imperceptible layer associated with a currently-perceptible one of the first and second items.

8. The computer-readable non-transitory storage medium of claim 7, wherein the set of items includes a set of images which set the first and second items as first and second images, respectively, the first image depicting the at least one object viewed from a different perspective than the other images of the set of images.

9. The computer-readable non-transitory storage medium of claim 7, wherein the set of DHTML computer instructions, in response to being executed by the computing device, further cause the computing device to output the one of the at least one first layer associated with the first item as the currently-perceptible layer with the first item being set for perception, and to swap out the first item with the second item set for perception.

10. The computer-readable non-transitory storage medium of claim 7, wherein the set of DHTML computer instructions, in response to being executed by the computing device, further cause the computing device to enable at least one interactive function to control a degree to which the moving is perceived.

11. The computer-readable non-transitory storage medium of claim 7, wherein the set of DHTML computer instructions, in response to being executed by the computing device, further cause the computing device to enable at least one interactive function to control at least one of a degree to which and the speed with which the moving is perceived.

12. The computer-readable non-transitory storage medium of claim 7,
    wherein the set of items includes a set of images which respectively set the first and second items as first and second images and the one of the at least one first layer and the another of the at least one first layer as first and second image layers, the first image depicting the at least one object viewed from a different perspective than the other images of the set of images; and wherein the set of DHTML computer instructions, in response to being executed by the computing device, further cause the computing device to simulate, as the moving, a rotation of the at least one object through three dimensions, including displaying and hiding each of the first and second image layers in at least one sequence.

13. A method for presentation of items with a device comprising a computing device and a memory, comprising:
executing, by the computing device, a set of DHTML computer instructions to perform operations comprising:
defining at least one first layer for spatial perception,
defining at least one second layer for at least partial spatial perception relative to the at least one first layer,
causing a first item to be associated with one of the at least one first layer,
pursuant to a select action, dynamically causing a second item to be associated with another of the at least one first layer,
making the first item and the second item perceptible in sequence, with only one of the first and second items perceptible at a time, so that at least one object in a set of items including the first and second items is perceptible as moving, and
creating an imperceptible layer associated with a currently-perceptible one of the st and second items.

14. The method of claim 13, further comprising, with the computing device, executing the set of DHTML computer instructions further to perform operations comprising outputting the one of the at least one first layer associated with the first item as the currently-perceptible layer with the first item being set for perception, and swapping out the first item with the second item set for perception.

15. The method of claim 13, further comprising, with the computing device, executing the set of DHTML computer instructions further to perform operations comprising enabling at least one interactive function to control a degree to which the moving is perceived.

16. The method of claim 13, further comprising, with the computing device, executing the set of DHTML computer instructions further to perform operations comprising enabling at least one interactive function to control at least one of a degree to which and the speed with which the moving is perceived.

17. The method of claim 13,
wherein the set of items includes a set of images stored in the memory which respectively set the first and second items as first and second images and the one of the at least one first layer and the another of the at least one first layer as first and second image layers, the first image depicting the at least one object viewed from a different perspective than the other images of the set of images; and
wherein the method further comprises, with the computing device, executing the set of DHTML computer instructions further to perform operations comprising simulating, as the moving, a rotation of the at least one object through three dimensions, including displaying and hiding each of the first and second image layers in at least one sequence.

* * * * *